Jan. 7, 1958 H. F. SHOFFSTALL 2,819,354

SIGNALING TRANSMISSION TEST AND CONTROL CIRCUIT

Filed July 16, 1956 33 Sheets-Sheet 1

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 2

INVENTOR
H. F. SHOFFSTALL
BY Charles Baraff
AGENT

Jan. 7, 1958 H. F. SHOFFSTALL 2,819,354

SIGNALING TRANSMISSION TEST AND CONTROL CIRCUIT

Filed July 16, 1956 33 Sheets-Sheet 3

INVENTOR
H. F. SHOFFSTALL
BY Charles Baraff
AGENT

Jan. 7, 1958 H. F. SHOFFSTALL 2,819,354

SIGNALING TRANSMISSION TEST AND CONTROL CIRCUIT

Filed July 16, 1956 33 Sheets-Sheet 4

INVENTOR
H. F. SHOFFSTALL
BY Charles Baraff
AGENT

INVENTOR
H.F. SHOFFSTALL
BY Charles Baraff
AGENT

SIGNALING TRANSMISSION TEST AND CONTROL CIRCUIT

Filed July 16, 1956 33 Sheets-Sheet 6

INVENTOR
H. F. SHOFFSTALL
BY Charles Baroff
AGENT

SIGNALING TRANSMISSION TEST AND CONTROL CIRCUIT

Filed July 16, 1956 33 Sheets-Sheet 7

INVENTOR
H. F. SHOFFSTALL
BY Charles Baraff
AGENT

INVENTOR
H. F. SHOFFSTALL
BY Charles Baraff
AGENT

INVENTOR
H. F. SHOFFSTALL
BY Charles Baraff
AGENT

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 11

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 12

INVENTOR
H. F. SHOFFSTALL
BY Charles Baraff
AGENT

SIGNALING TRANSMISSION TEST AND CONTROL CIRCUIT

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 14

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 15

INVENTOR
H. F. SHOFFSTALL
BY Charles Baraff
AGENT

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 17

INVENTOR
H. F. SHOFFSTALL
BY Charles Baraff
AGENT

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 19

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 20

INVENTOR
H. F. SHOFFSTALL
BY Charles Baraff
AGENT

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 22

INVENTOR
H. F. SHOFFSTALL
BY Charles Baraff
AGENT

Jan. 7, 1958 H. F. SHOFFSTALL 2,819,354

SIGNALING TRANSMISSION TEST AND CONTROL CIRCUIT

Filed July 16, 1956 33 Sheets-Sheet 23

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 24

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 25

INVENTOR
H. F. SHOFFSTALL
BY Charles Baraff
AGENT

INVENTOR
H. F. SHOFFSTALL
BY Charles Baraff
AGENT

INVENTOR
H. F. SHOFFSTALL
BY Charles Baraff
AGENT

INVENTOR
H. F. SHOFFSTALL
BY Charles Baraff
AGENT

SIGNALING TRANSMISSION TEST AND CONTROL CIRCUIT

Filed July 16, 1956 33 Sheets-Sheet 29

INVENTOR
H.F. SHOFFSTALL
BY Charles Baraff
AGENT

SIGNALING TRANSMISSION TEST AND CONTROL CIRCUIT

Filed July 16, 1956

33 Sheets-Sheet 30

INVENTOR
H.F. SHOFFSTALL
BY Charles Baraff
AGENT

INVENTOR
H. F. SHOFFSTALL
BY Charles Baraff
AGENT

INVENTOR
H. F. SHOFFSTALL
BY Charles Baraff
AGENT

INVENTOR
H. F. SHOFFSTALL
BY Charles Baraff
AGENT 2,819,354

SIGNALING TRANSMISSION TEST AND CONTROL CIRCUIT

Hugh F. Shoffstall, Maplewood, N. J., assignor to Bell Telephone Laboratories, Incorporated, New York, N. Y., a corporation of New York Application July 16, 1956, Serial No. 597,913

14 Claims. (Cl. 179—175.3)

This invention relates to a system for automatic transmission testing of intertoll signaling trunks, and more specifically to a system for the automatic transmission testing of each direction of signaling transmission on each trunk of a group of two-way intertoll signaling trunks interconnecting a plurality of pairs of geographically spaced terminals therefor.

In order to maintain proper operating conditions on intertoll trunks which connect intercity telephone switching systems, it is necessary to measure transmission loss and noise levels accurately and frequently and with a minimum interruption of service. Moreover, since transmission losses and noise levels in one signaling direction are generally not the same as those in the opposite signaling direction on the same trunk, transmission loss and noise measurements must be made in one or in both signaling directions on each trunk. This is so because the signaling path between terminal switching stations, in which the circuit appears as a two-wire transmission path, may include, for example, four-wire systems, carrier or noncarrier systems, radio relay links and the like, with repeaters therein for each direction of signaling transmission.

This invention is an improvement over and further supplements the transmission testing system disclosed in the United States Patent No. 2,721,235, issued October 18, 1955, to B. McKim and T. H. Neely, and includes the intertoll trunk testing system disclosed in the United States Patent No. 2,719,886, issued October 4, 1955, to H. F. Shoffstall, which disclosures are herein incorporated as to pertinent subject matter.

A principal object of the present invention in making transmission loss measurements on a group of intertoll trunks is to automatically compute the deviation loss of each direction of signaling transmission on each of such trunks from a specified predetermined reference loss therefor.

Another object of the invention in making two-way transmission loss measurements on a group of intertoll trunks, namely in the near-far and far-near directions, is to transfer the measurements to one terminal at which they will be available for the deviation loss calculations in an automatic computer.

In accordance with the present invention, transmission loss measurements are made in each of two opposite signaling directions on each trunk of a group of intertoll trunks by means of the selective interposition of attenuator pads and the detector action of an amplifier-rectifier relay circuit. The values of transmission loss so determined are locked up and held on relays, and thence transferred to an automatic bi-quinary relay computor in which a specified predetermined transmission loss is subtracted from the measured transmission loss for each signaling direction on each of the intertoll trunks to yield the amount and sign of the deviation between such losses. Such deviation loss derived by the computer may be printed on a teletypewriter with the proper amount and sign.

A feature of the invention is the provision of amplifiers, near-far attenuation pads and far-near attenuation pads to provide overall zero gain in transferring loss measurements to the one terminal for use in the automatic computer.

A feature of the invention resides in the use of a plurality of telephone message registers controlled by the automatic computer for totalizing the number of computed deviations substantially equal to one of a preselected group of equal steps of deviation loss above and below each of the specified predetermined losses for the two opposite directions of signaling transmission on a selected group of intertoll trunks; or for totalizing such computed deviations for one signaling direction on such group of intertoll trunks.

Another feature involves an arrangement in the computer and message registers whereby computed deviations lying with certain limits of one of the equal steps of deviation loss are counted for such one step.

Another feature relates to a circuit device for enabling the immediate identification of the direction of signaling transmission on each intertoll trunk having noise and/or transmission loss in excess of certain amounts.

Another feature involves a net loop test for both signaling directions on each intertoll trunk for checking the representations of the loss measurements for the respective signaling directions for each intertoll trunk.

Another feature is that the computer is controlled to initially compute the deviation losses for one signaling direction on all intertoll trunks and then for the opposite signaling direction thereon.

Another feature involves the use of a teletypewriter controlled by the computer for providing a printed record of the identification of each intertoll trunk and the amount and sign of the deviation loss for each signaling direction thereon.

Another feature is that the teletypewriter may be controlled by the computer to print the deviation losses for one signaling direction on all intertoll trunks and then for the opposite signaling direction thereon.

Other objects, features and advantages of the invention will be apparent from the following description.

The invention will be more clearly understood from the following detailed description when read together with the accompanying drawing in which.

The advent of nationwide dialing has presented additional problems in the maintenance of intertoll trunks.

Transmission requirements are more strict, the intertoll trunk circuits are more complex and defects in the distance dialing network are difficult to detect. As a result additional tests and more frequent testing are needed to insure that the intertoll trunks are kept in good working order. Accordingly, automatic test equipment has been provided capable of testing the operational features of intertoll trunks and of making two-way transmission loss measurements from which the specified standard loss of the trunk is subtracted by a computer to give the deviation loss. The test results and deviations may be recorded at the control end by means of a teletypewriter.

GENERAL DESCRIPTION

*1. Basic scheme of measurement for transmission tests*

Figure 1:
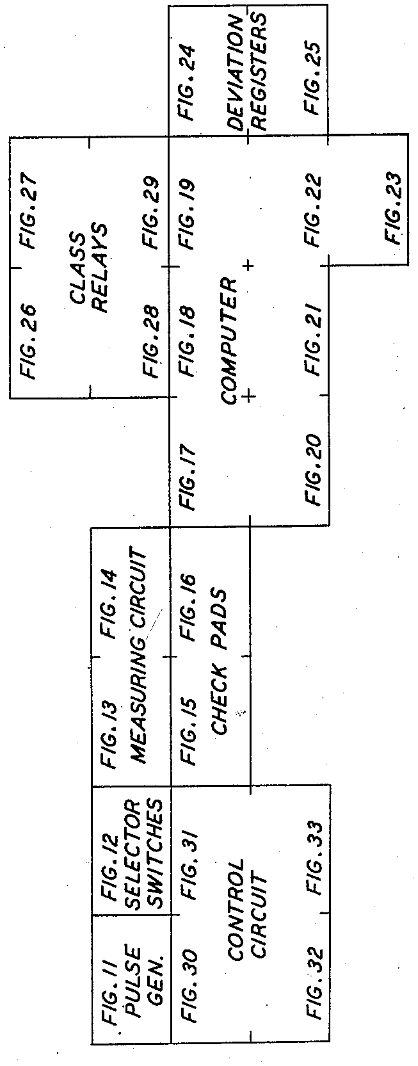
Figs. 1, 1A and 1B show arrangements of the sheets for the illustrative circuits and schematics of the present invention.
Figure 1B:
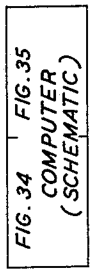
Figure 1A:
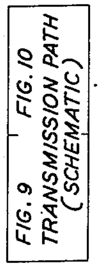
Figures 2, 3:
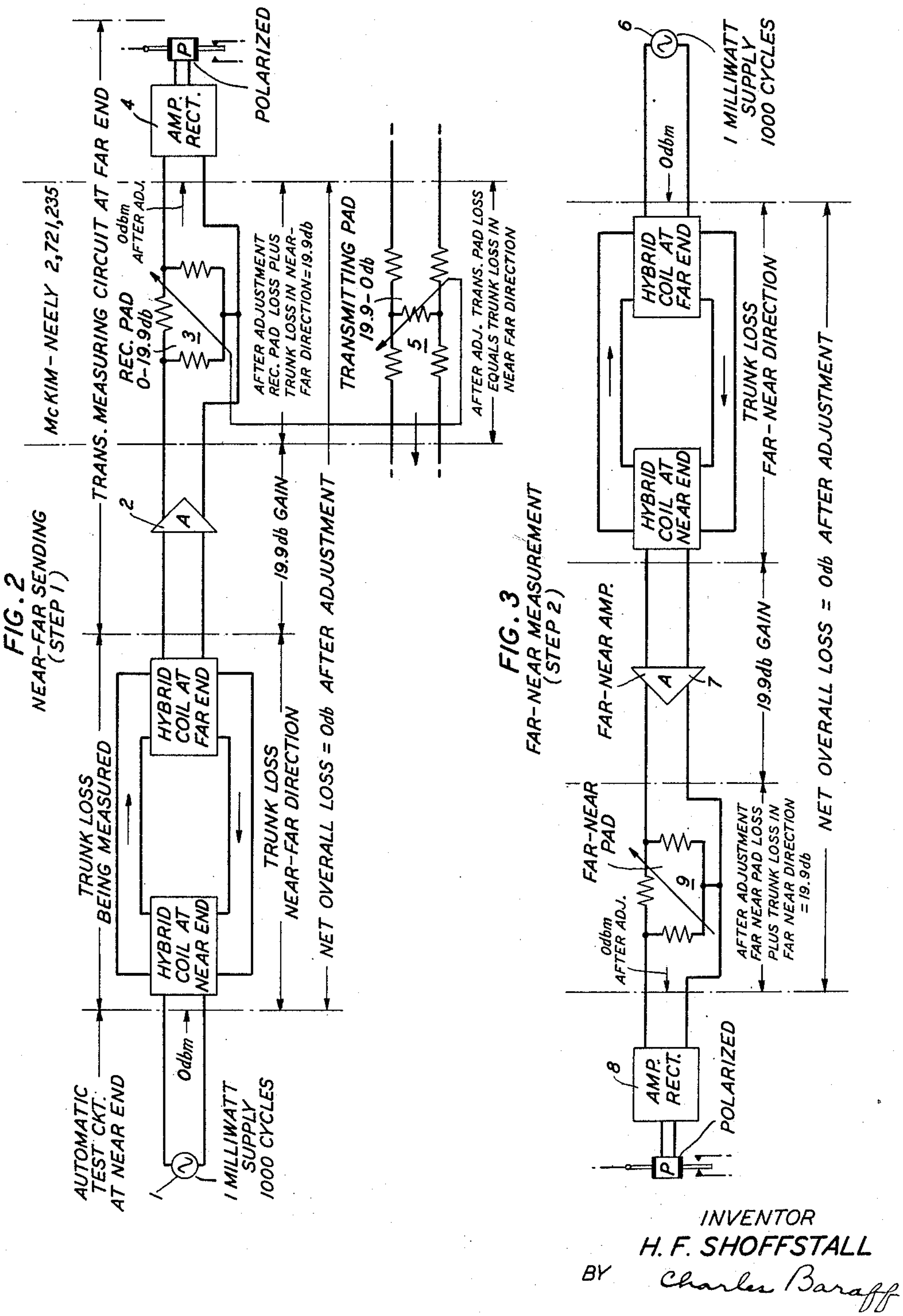
Figs. 2, 3, 4 and 5 show simplified schematics of the various measuring steps.

An automatic transmission loss measurement consists essentially of adjusting the loss of a pad at the receiving end of the trunk to bring the test power level at the pad output to a fixed value. A schematic diagram of such an arrangement is shown in Fig. 2.

A standard one milliwatt source of test power 1 is used at the sending end. The receiving end includes an amplifier 2, a set of adjustable resistance pads 3 which are relay controlled and an amplifier-rectifier 4 with a measuring relay P in its output circuit. Relay P is a polarized relay of a type widely used in the telephone plant.

Figure 21:
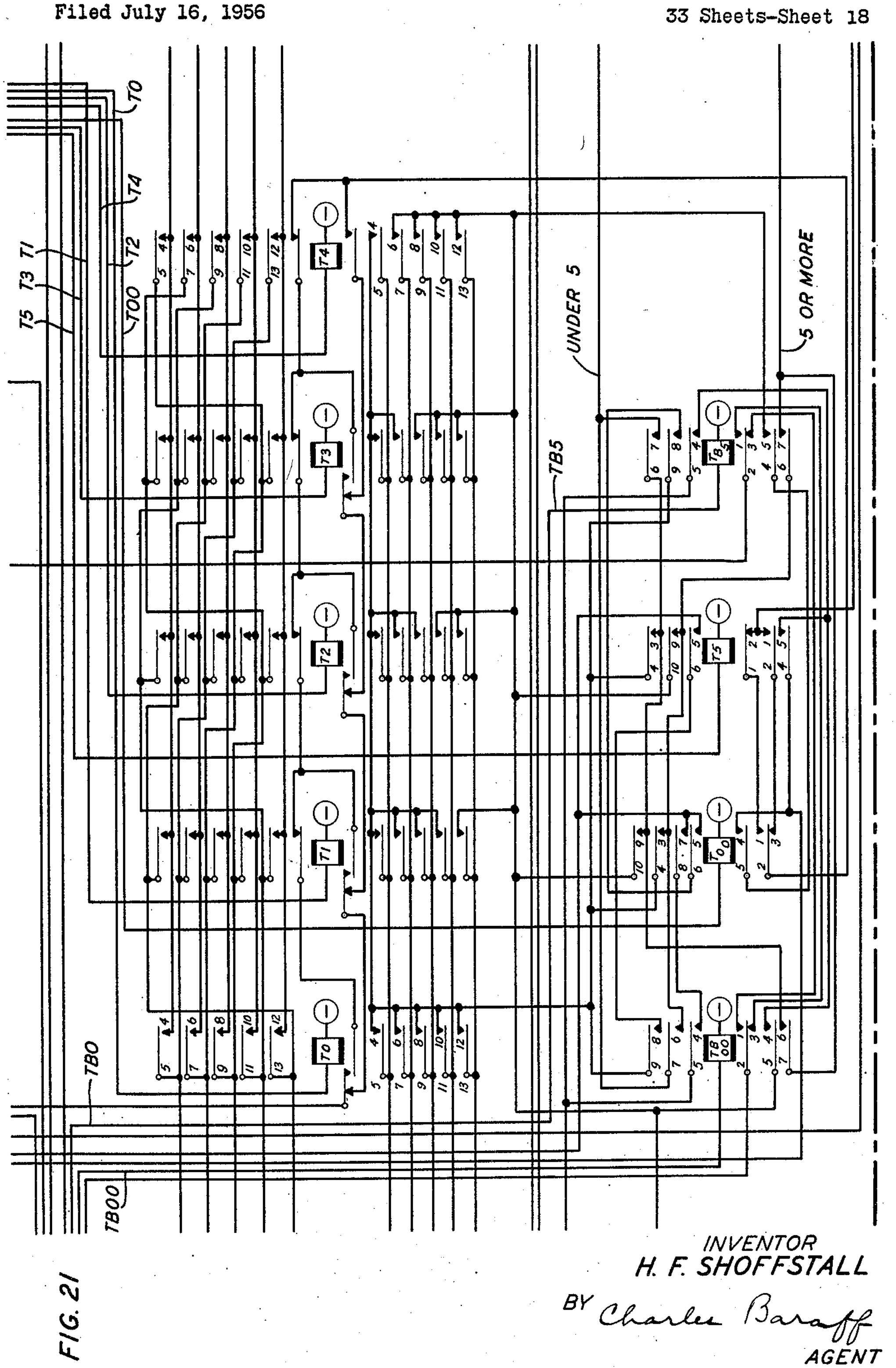

The amplifier 2 disclosed more fully in Fig. 21 of the McKim-Neely Patent No. 2,721,235, is set to a gain of 19.9 decibels and it includes considerable negative feedback so that its gain is constant. The pad components are precision resistors to insure accuracy.

Figure 26:
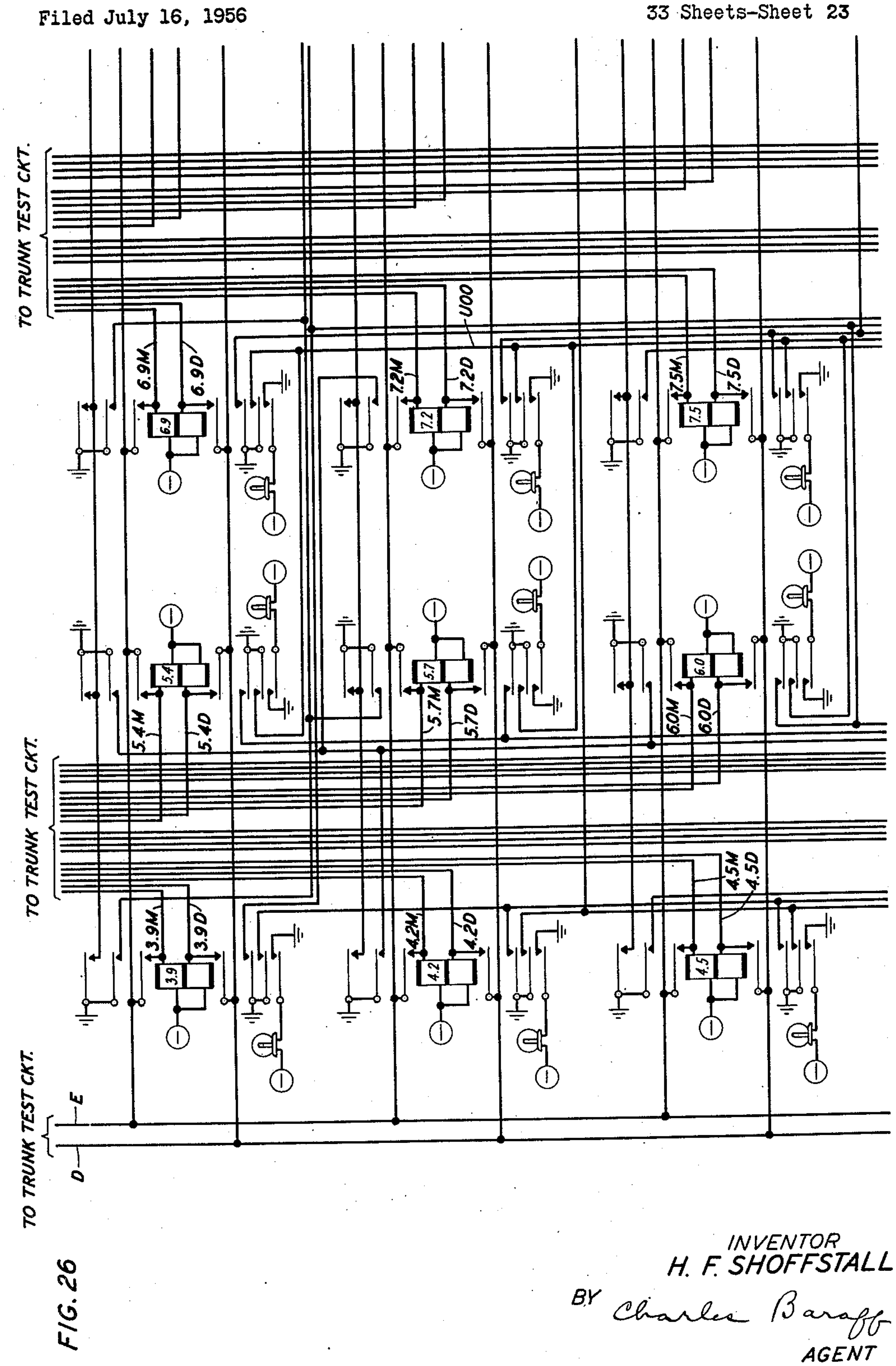
Figs. 26 through 29 show the class relays for the specified loss.
Figure 27:
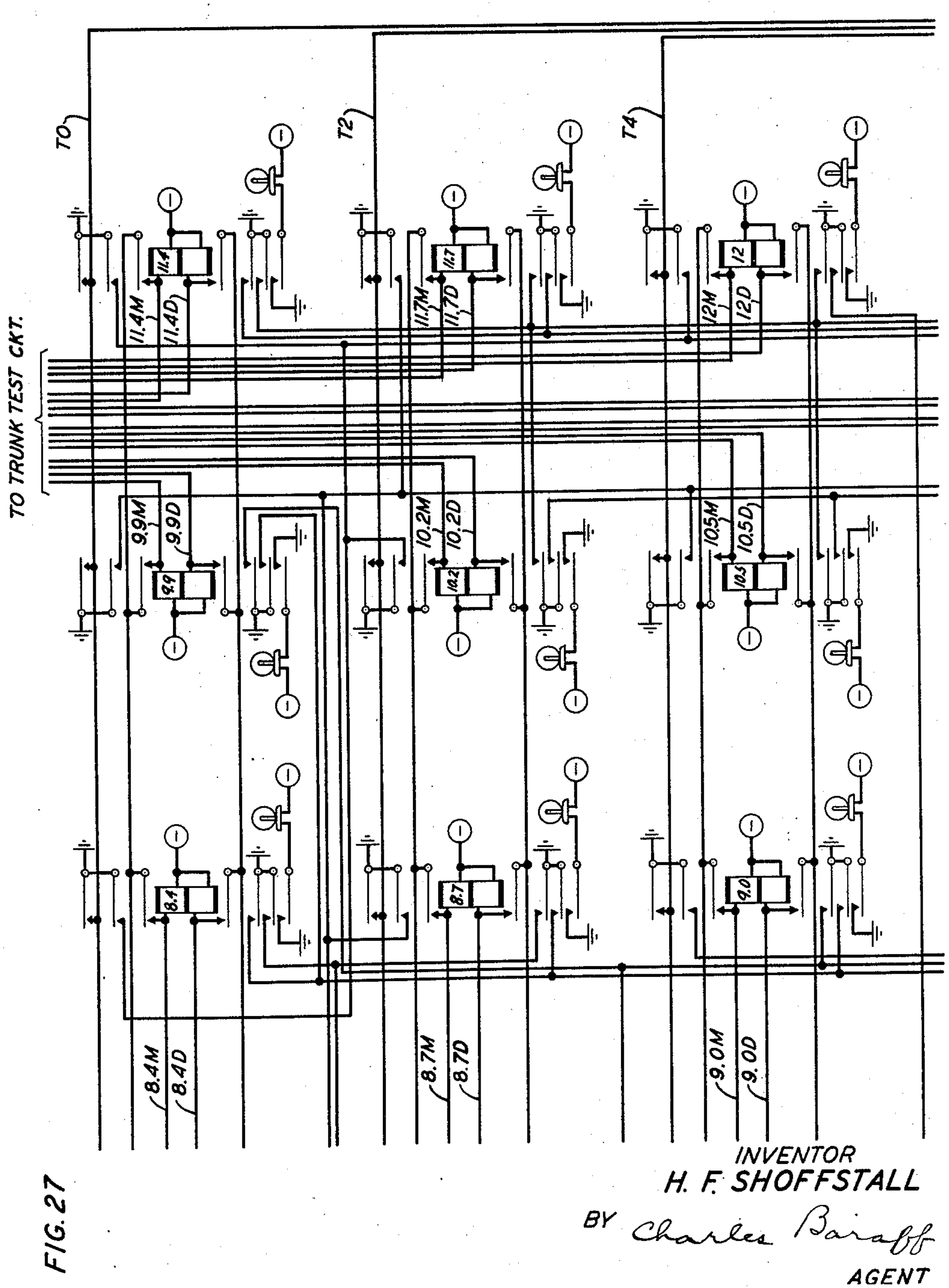
Figure 28:
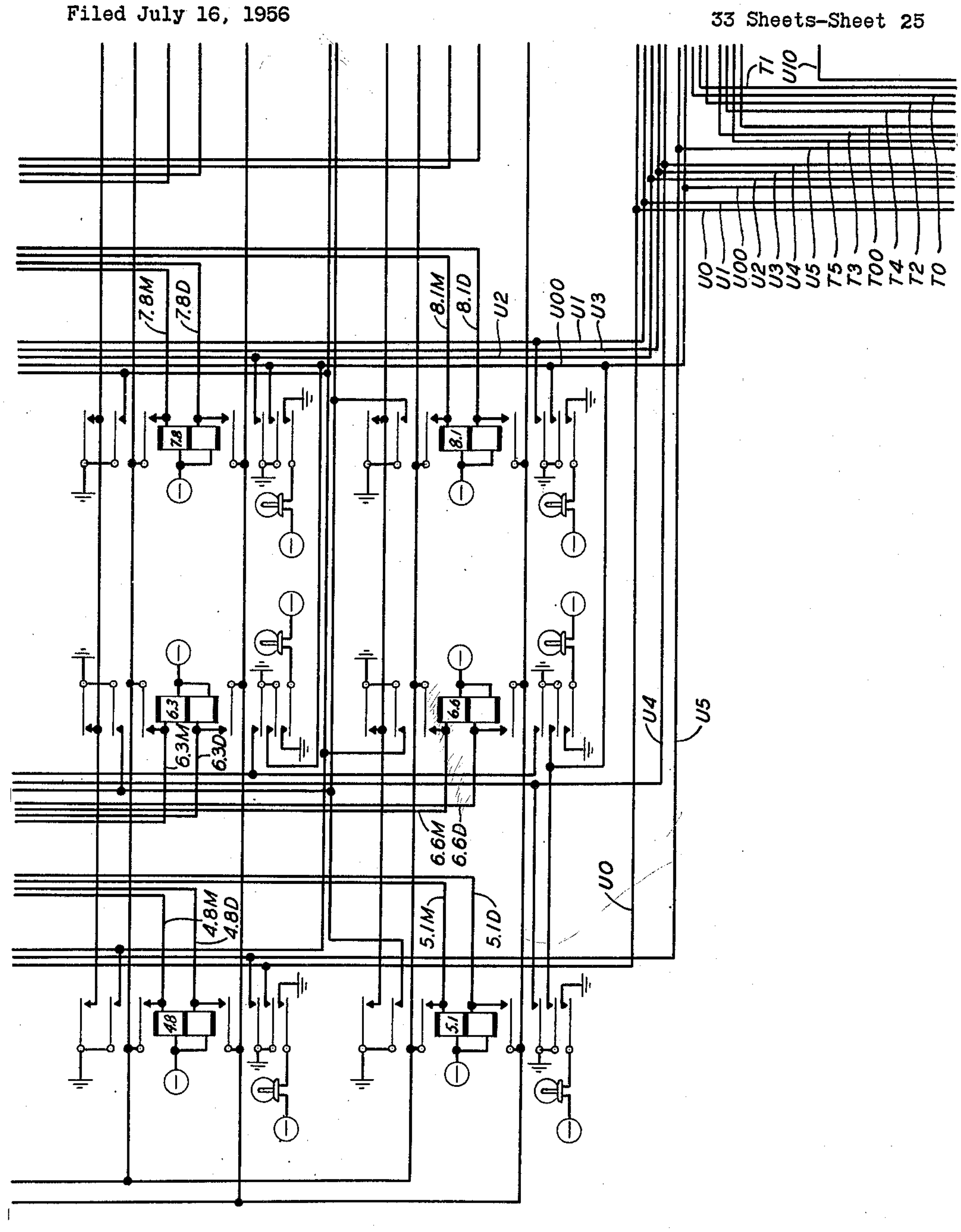
Figure 29:
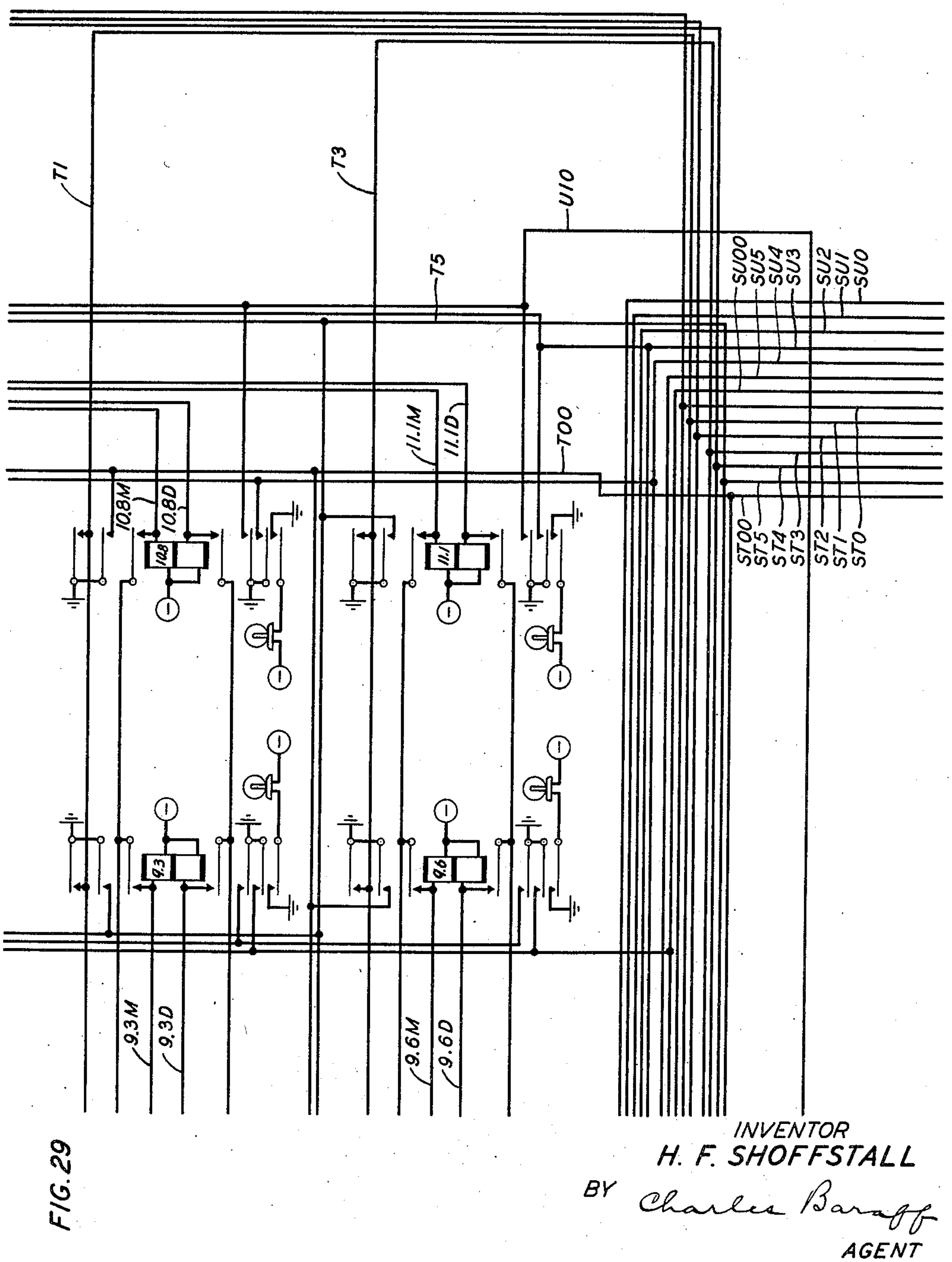

The amplifier-rectifier disclosed more fully in Fig. 26 of the aforementioned McKim-Neely Patent No. 2,721,-235, consists of a two-stage amplifier followed by a rectifier tube for controlling relay P.

Figure 6:
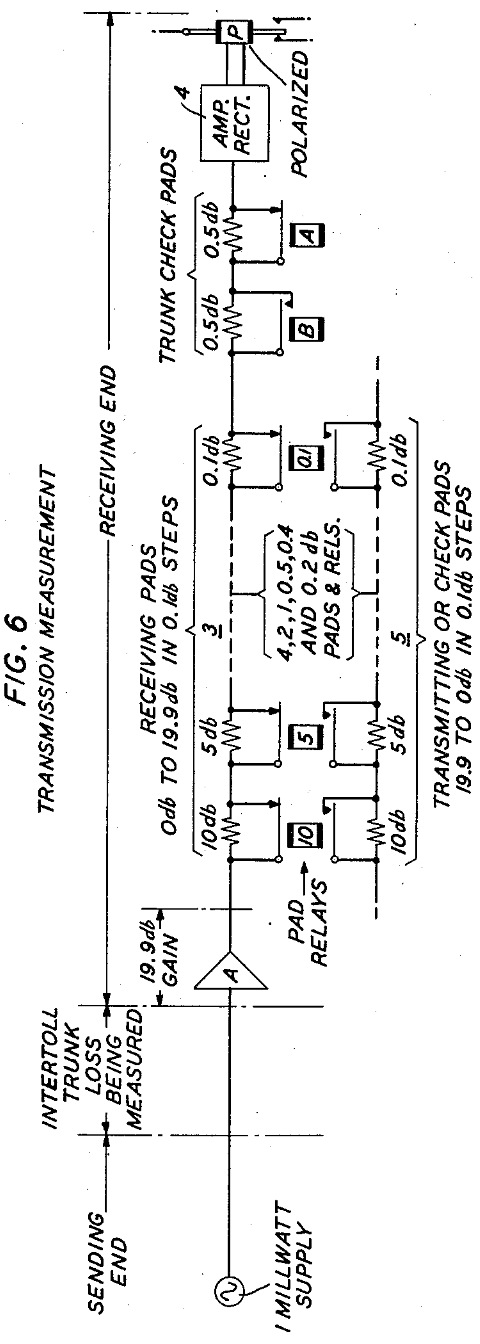
Figs. 6 and 7 show simplified schematics of a transmission measurement and loop check.

*Adjustment of receiving pads for a transmission measurement.*—The receiving pads, shown in Figs. 2 and 6, consist of 9 individual pads having losses of 10, 5, 4, 2, 1, 0.5, 0.4, 0.2 and 0.1 decibels. Each pad is inserted into the input circuit to the amplifier-rectifier by the operation of a corresponding pad control relay, so that adjustment of the pad loss takes place in steps.

When relay P operates on the arrival of the test power, the control circuit operates a relay to insert the 10 decibel pad. If this reduces the test power level at the output from receiving pads to a value below one milliwatt, relay P in the amplifier-rectifier will release. The control circuit then releases the relay to remove the 10 decibel pad before it proceeds to the next step. If the test power level remains one milliwatt or higher after the 10 decibel pad is inserted, relay P remains operated. The control circuit then locks the pad relay in its operated position to retain the 10 decibel pad before it proceeds to the next step. In the next step, a pad control relay is operated to insert the 5 decibel receiving pad. The 5 decibel receiving pad will then be rejected or retained, as described above, depending upon which position relay P takes after the 5 decibel pad is inserted. This process continues until all 9 individual receiving pads have been tried in descending order ending with the 0.1 decibel pad. When this process is completed, the combination of the 9 pad control relays which remains locked in the operated position determines, additively, the receiving pad loss and consequently this combination is related directly to the trunk loss. At the originating or control end, this combination of operated relays will be translated to the measured loss of the intertoll trunk being tested, when the results of the measurement are recorded. The method of transmitting the measured loss from the far end to the originating end is discussed later in fuller detail.

Whenever the control circuit leaves pad control relay 4 or 0.4 in its operated position to retain the 4 or 0.4 decibel pad, the subsequent 2 and 1 or 0.2 and 0.1 decibel pad control relays are disabled. There will then be no action as the control circuit passes through the 2 and 1 or the 0.2 and 0.1 decibel steps. This limits the maximum receiving pad loss to 19.9 decibels, which is the maximum range of the automatic meaurement. This range amply covers the range of losses of intertoll trunks in a usable condition.

*2. Accuracy checks*

If the receiving pad adjustment has been successful, the power level at the pad output will be very close to one milliwatt and the measuring relay P will be just on the verge of moving from its front to its back contact, or vice versa. Errors may creep in, however, to prevent these things from being true. Some such sources of error are:

(1) One or more of the pad control relays might fail to lock in the operated position when they should, or fail to release when they should. It would then be impossible to adjust the total receiving pad loss to the correct value.

(2) The trunk loss might change suddenly while the pad adjustment is in progress and make it impossible, with the pads remaining to be tried, to bring the power level at the pad output to one milliwatt.

(3) The amplifier or amplifier-rectifier gains might increase or decrease due to a defective component.

(4) The milliwatt test power supply might deviate from the standard value.

(5) Defective components or faulty control relay contacts might cause the individual pad losses to be incorrect.

To detect errors of the type in items (1) and (2) a "trunk check" is made immediately after the pad adjustment is finished. Referring to Fig. 6, two 0.5 decibel pads, A and B, are provided in the input circuit to the amplifier-rectifier, pad A being normally out. Before the sending end removes the test power, pad A is inserted, momentarily. The resulting decrease in input power to the amplifier-rectifier should cause relay P to release. Both pads A and B are then cut out. The resulting increase in input power should cause relay P to operate. If relay P fails to pass either of these checks the receiving pad loss is in error by 0.5 decibel or more and another trial is needed to secure a more accurate adjustment.

Figure 7:
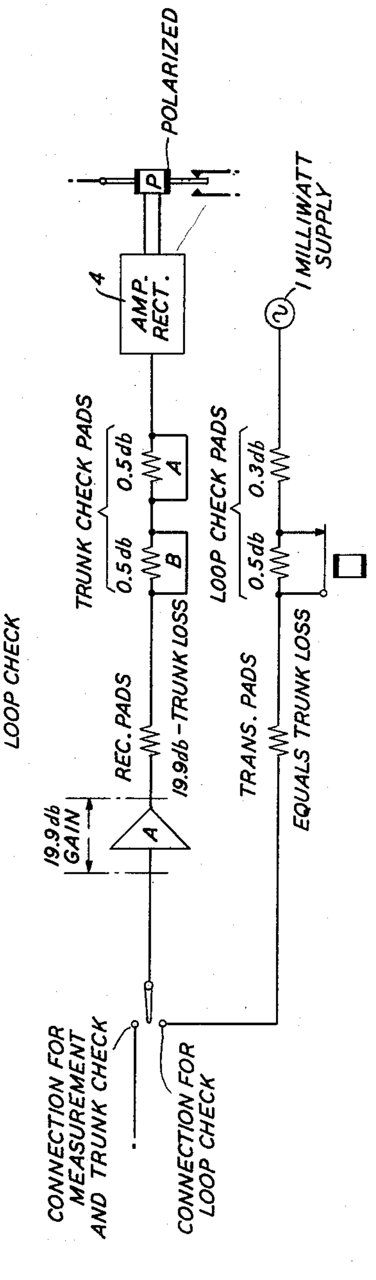

Immediately after the trunk check and while pad B is still cut out, the receiving end rearranges its circuit locally as shown in Fig. 7 for a "loop check" to guard against errors of the types mentioned in items (3), (4) and (5) above. This rearrangement inserts a 0.3 decibel pad in place of the 0.5 decibel pad B, which is cut out. The local milliwatt supply then applies power to the amplifier-rectifier at a level about 0.2 decibel higher than necessary to operate relay P. Relay P will fail to operate and pass this check if the combined effect of any decrease in the value of the milliwatt test power supply, any decrease in the amplifier and the amplifier-rectifier gains and cumulative errors in the receiving pads and check pads adds more than 0.2 decibel loss. After the above check a 0.5 decibel loss is added in the looped circuit. This reduces the input power to the amplifier-rectifier about 0.2 decibel below that which causes relay P to release. Relay P will remain operated and fail to pass this check if the combined effect of increases in the milliwatt test power supply or amplifier and amplifier-rectifier gains and cumulative errors in the pads exceeds 0.2 decibel gain. By means of the loop check the maintenance forces will be notified whenever the measuring equipment drifts more than ±0.2 decibel from the initially calibrated setting.

After the loop check the receiving end restores its circuit to the original connections shown in Fig. 6 and by means of relays not shown, cuts out all of the receiving pad loss. Relay P then reoperates. The circuit rests in this condition to await the removal of the test power at the sending end.

When the sending end removes the test power, relay P releases. If all accuracy checks have been passed successfully, the receiving end then prepares for the next phase of the test. If, however, the accuracy checks failed in any respect, the receiving end restores its circuit to the original condition at the start of the measurement.

*3. Intertoll trunk loss measurement in both directions*

An intertoll trunk loss measurement consists of two successive one-way measurements, one for each direction of transmission.

The philosophy of a two-way measurement is as follows: The near end sends test power over the trunk, and the far end measures the loss as previously described for Fig. 2. In this process the loss of the transmitting pads at the far end is adjusted to a value equal to the trunk loss in the near-to-far direction. The far end then returns test power, first directly over the trunk and next, through the transmitting pad. The power levels received at the near end are a measure, first, of trunk loss in the far-to-near direction and, next, the sum of the losses in the two directions. Measurements of these two levels thus provide information at the near end as to the trunk losses in each of the two directions.

The near-far sending and measurement at the far end of the intertoll trunk loss in the near-far direction, and its representation on the transmitting pads is essentially an operation described in greater detail in the aforementioned McKim-Neely Patent No. 2,721,235.

Fig. 3 shows schematically the circuit for providing a measurement at the near end of the intertoll trunk loss in the far-near direction. To accomplish this, the near end connects a far-near amplifier 7, far-near receiving pad 9, an amplifier-rectifier 8 and measuring relay P. The far end disconnects its receiving equipment shown in Fig. 2 and in McKim-Neely Patent No. 2,721,235 and returns one milliwatt from source 6 over the trunk. The far-near receiving pad 9 at the near end is now inserted and adjusted to reduce the power level at its output to one milliwatt. When this adjustment is finished the loss of the far-near pads will be related to the trunk loss as follows:

(4) Far-near pad loss+trunk loss in far-near direction=19.9 decibels

The adjustment of the far-near pad 9 represents a loss=19.9 decibels—trunk loss. This representation will later be translated to measured loss of the intertoll trunk in the far-to-near direction.

The transmitting pads 5 shown in Fig. 2 are complementary adjustable with respect to the receiving pads. They are utilized to transfer the intertoll trunk loss value in the near-far direction to the computer for a near-far measurement. Initially, at the start, the total loss value of the transmitting pads is 19.9 decibels. Whenever a pad control relay operates to insert a receiving pad, it removes an equal loss from the transmitting pads. Therefore, when the receiving pad adjustment is finished, the loss remaining in the transmitting pads will be equal to the intertoll trunk loss.

This can be readily comprehended from the following equations:

(1) Intertoll trunk loss+receiving pad loss =19.9 decibels (gain of amplifier A)

(2) Receiving pad loss+transmitting pad loss =19.9 decibels

Subtracting Equation 2 from Equation 1:

(3) Intertoll trunk loss=transmitting pad loss

Also, the sum of the losses in the two sets of pads 3, 5 is always 19.9 decibels regardless of the trunk loss being measured, provided all pad components and all pad control relay contacts are in perfect order. This condition permits a precise accuracy check to be made, as discussed later.

Figure 4:
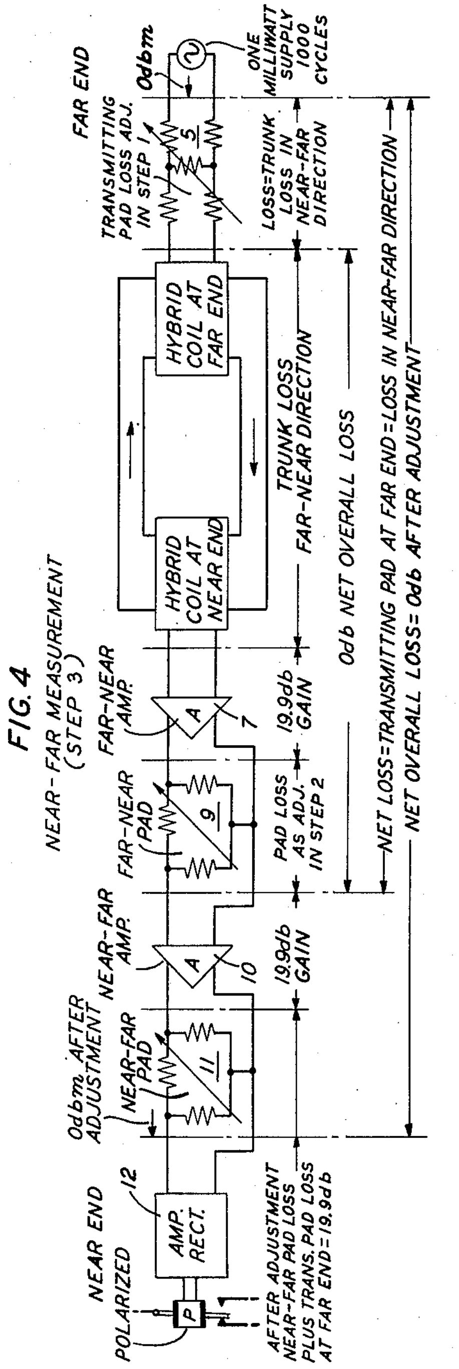

Fig. 4 shows schematically the circuit for transmitting back to the near end the loss in the near-far direction, measured at the far end in Fig. 2. The description hereafter will be directed principally to the home end equipment. The near end retains the far-near amplifier 7 and the setting of the far-near receiving pads 9 and adds a near-far amplifier 10 and a set of near-far receiving pads 11 in tandem in the input circuit to the amplifier-rectifier. The far end, after a short pause, again sends one milliwatt but this time it sends through the transmitting pad which was adjusted in Fig. 2 to represent the near-to-far trunk loss. The near-far receiving pads 11 at the near end are now automatically arranged to reduce the power level at their output to one milliwatt.

In the adjustment of Fig. 3 the over-all loss, including the trunk in the far-to-near direction, the far-near amplifier 7 and the far-near receiving pads 9, was made 0 decibel. Consequently, the net loss being measured in Fig. 4 is simply that of the transmitting pad 5 at the far end, which is the same as the trunk loss in the near-to-far direction.

Therefore the near-far pad after adjustment in Fig. 4 is finished, can be translated to measured loss of the intertoll trunk in the near-to-far direction.

Figure 5:
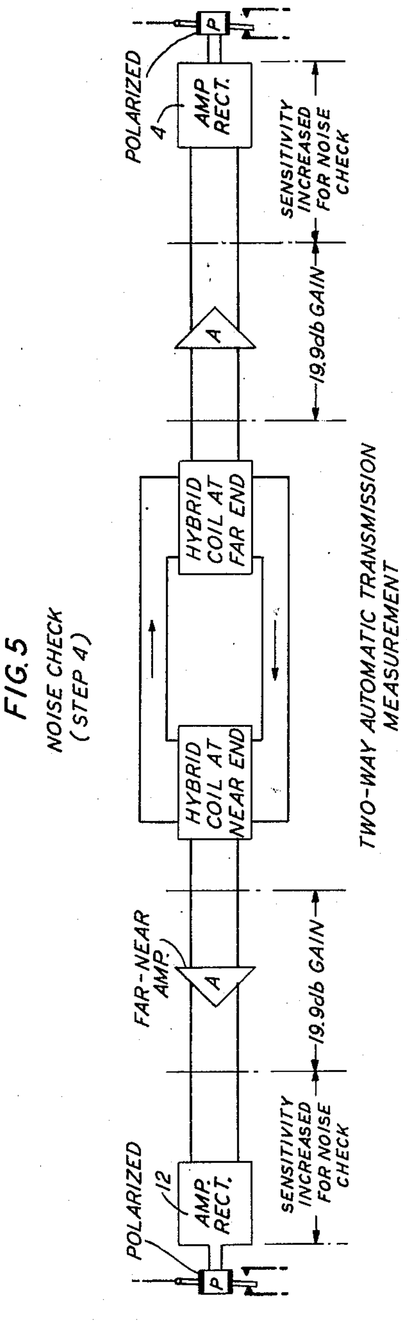

Besides the loss measurements of the intertoll trunk, as heretofore described in connection with Figs. 2, 3 and 4, there is a noise check made as schematically represented in Fig. 5.

For this purpose, the near end removes its near-far amplifier 10 and the near-far and far-near receiving pads 9, 11 (Fig. 4) and increases the gain of the amplifier-rectifier 12 for a noise check at the near end. Likewise, the far end removes the receiving pads and increases the gain of the amplifier-rectifier for a noise check at the far end. Each end rests in this condition while the amplifier-rectifier at each end integrates the noise voltage over approximately a 5-second interval. If the integrated value of noise voltage at either end exceeds a predetermined value, the amplifier-rectifier at that end will operate measuring relay P in its output to register on a relay the high noise condition at that end of the trunk.

Figure 8:
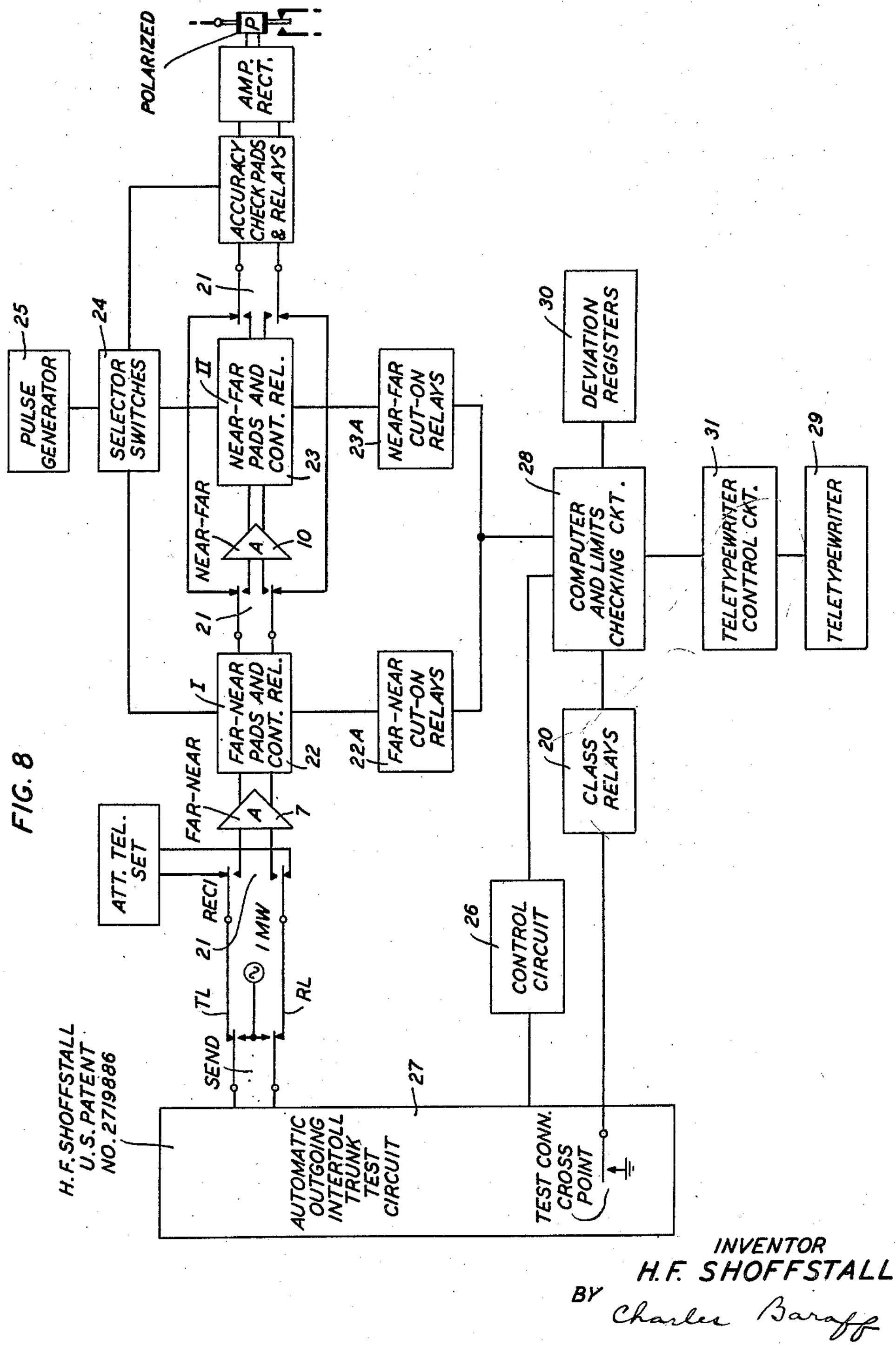
Fig. 8 is a block schematic of the equipment at the home or near end in accordance with the invention.

Fig. 8 shows a block schematic of the intertoll trunk test circuit for measuring trunk losses and computing deviation loss results.

*4. Computer circuit*

Intertoll trunk transmission performance is rated in terms of bias and distribution grade which are calculated from the deviations of the measured losses of the intertoll trunks from their specified values. For such calculations the maintenance forces are, therefore, more interested in the deviations than they are in actual measured losses. Accordingly, the automatic transmission test and control circuit, at the near end, has a computer built into it which will compute the deviation for each measurement so that the deviation can be recorded by the teletypewriter.

The computer is a bi-quinary relay type adder similar to those used for other purposes in the telephone plant, for example in the computer of the automatic message accounting system. It obtains the specified net loss of the trunk being tested from the class relay which remains operated throughout the test. When a computation is to be made of the deviation in the far-to-near direction for example, the control circuit extends to the adder a number of leads from the contacts of the far-near pad control relays. Some combination of the 9 far-near pad control relays remain operated after the far-near pad adjustment is finished and therefore some combination of the leads extended to the adder will be closed. These leads furnish to the adder the measured loss of the intertoll trunk in the far-to-near direction. The adder then subtracts the specified loss from the measured loss and presents the answer together with the proper sign, + or —, to the teletypewriter for a printed record. The deviation in the near-to-far direction is computed in the same manner by extending corresponding leads from the near-far pad control relays to the adder at the proper time.

*5. Deviation registers*

In calculating bias and distribution grade, the deviations are grouped together in ½ decibel increments from +8 to −8 decibels, all deviations exceeding +7.8 or −7.8 decibels being considered as +8.0 or −8.0 decibels, respectively. For example, all trunks having deviations of +0.3 to +0.7 decibel, inclusive, are grouped and are tallied as trunks having a deviation of +0.5 decibel. This simplifies the procedure and is sufficiently precise for the purpose.

After a few hundred transmission tests have been completed considerable clerical effort would be involved in grouping the deviations in ½ decibel increments and in making an accurate count of the deviations within each range of increment. Considerable care would also be necessary to avoid clerical errors. To assist in making this tally, 33 manually resettable counters are provided, corresponding to ½ decibel increments from +8.0 to −8.0 decibels inclusive. Just prior to a transmission test cycle all these counters are reset to zero. At the time a deviation computation is made, the computer also causes the proper counter to register one count. After the test run on a group of trunks, the counter readings can be used directly for calculating bias and distribution grade. A "total tests" counter keeps a tally of all the computations. At the end of the test run the total count serves as a check of the total count of the other 33 counters.

*6. Check for excessive deviations*

In addition to obtaining data for the calculation of bias and distribution grade, the maintenance forces would also like to know promptly when the loss of an intertoll trunk deviates an abnormal amount from its specified value. The maintenance practices frequently require that, whenever an intertoll trunk is found to have a deviation of ±5 decibels or more in either direction, the trunk should be removed from service immediately and the cause of the abnormal deviation corrected. Accordingly, the computer circuit includes an alarm feature which sounds an alarm to attract the immediate attention of the attendant whenever the computed deviation is ±5.0 decibels or greater.

The maintenance forces may also like to know promptly about trunks with abnormal deviations but which are not so bad as to require immediate removal from service. For this purpose the computer also includes a limit checking feature. This can be set, by means of optional wiring, to detect deviations in excess of ±3.0, ±4.0, or ±5.0 decibels. Whenever a deviation exceeds the limit for which the computer is wired, this feature performs as follows:

(1) When the teletypewriter is not in operation the test frame stops and sounds an alarm.

(2) When the teletypewriter is recording all measurements, the letter U is added in a separate column at the end of the test record. The letter stands out on the record to permit quick spotting of trunks with abnormal deviations.

(3) By means of a control key, a transmission test record can be printed only for those trunks whose deviation exceeds the computer checking limit or which are "noisy" at either end.

*7. Teletypewriter record*

The teletypewriter is put into operation by means of a key on the test frame. When this key is normal, no records are printed. Under this condition a trouble causes the test frame to stop and sound an alarm. When the teletypewriter is operating, it prints various records and a minor operational trouble may result only in a record without an alarm. Each record occupies a separate line on the tape. Each line starts with the 4-digit trunk identification number in the first column. Fig. 7 shows a short specimen of the teletypewriter record.

When the pass busy key on the test frame is in its non-operated position, the teletypewriter will print the trunk identification number, followed by the letter B, for each trunk passed over without test because it was busy. This is done on both operational and transmission test cycles. When the pass busy key is operated, no record is made of busy trunks passed without test.

During operational tests no record is printed for trunks which are satisfactory. Troubles during either operational or transmission test cycles result in a record of the trunk identification number followed by a cue letter in a separate column denoting the nature of the trouble. This may be a single line record or a double line record for a repeat test on the same trunk as previously discussed. For example, in Fig. 7, the letter Y in the second line indicates that on trunk 1267 the far end was unable to complete its transmission measurement successfully. The letter A in lines 3 and 4 indicates that the test frame was unable to establish a connection over trunk 1293 on either its first or second attempt. The record of transmission tests is printed in several columns. Reading from left to right (see Fig. 37) these are (1) trunk identification number, (2) specified net loss, (3) deviation in the far-to-near direction together with the sign, (4) deviation in the near-to-far direction together with the sign. In columns 2, 3 and 4 the decimal points are omitted and the ten's digits are omitted when they are zero (0). Column 5 will contain an N if the far end is "noisy" or the letter U if the deviation in the far-to-near direction exceeds the computer check limits, preference being given to N if both conditions occur on the same trunk. Likewise column 6 contains an N if the near end is "noisy" or a U if the deviation in the near-to-far direction exceeds the computer check limits. Transmission test cycles will, of course, include a trouble record whenever an operational trouble is encountered or whenever the transmission test cannot be completed successfully.

The automatic transmission test circuit includes: (1) A set of class relays, 20, for indicating the type of trunk under test and its specified terminal net loss. The class relays 20 are operated by the cross-points of a cross-bar switch (not shown).

(2) Switching relays, in the transmission path 21 for the control of sending, receiving, and certain accuracy checks during the test.

(3) Relay controlled pad circuits 22, 23 for the far-near direction, and near-far direction. The loss in these pad circuits is adjusted automatically during the measurement. Cut-on relays 22A, 23A apply the information of measured loss to the computer.

(4) Selector switches 24, which provide access to the windings of the pad control relays and checking relays in the proper sequence while the pad adjustment is in progress.

(5) A condenser timed polar relay type pulse generator 25 for driving selectors 24.

(6) A control circuit 26 to advance the test through the various steps, in the proper sequence. Lamps give a visual indication of the progress of the test. Time intervals for the various test functions are provided from the automatic intertoll trunk test circuit 27. The control circuit 26 causes the intertoll trunk test frame 27 to block and bring in an alarm if the various phases of the test are not completed successfully within the allotted time intervals.

The automatic outgoing intertoll test circuit 27 is described and disclosed more fully in U. S. Patent No. 2,719,886, issued October 4, 1955, of H. F. Shoffstall, which is herein incorporated as to common subject matter.

(7) A computer and limit checking circuit 28. The computer circuit 28 computes the amount by which the measured transmission loss, indicated by the pad relay settings, deviates from the specified terminal net loss indicated by an operated class relay 20. The computer includes a "limits check" feature to determine whether the deviation in either direction exceeds 2.9 or 3.9 or 4.9 decibels. Provision is made for bringing in an alarm, when the associated teletypewriter 29 is not in operation, if the deviation exceeds the above limits. When the teletypewriter 29 is in operation, the computed deviations for each direction of transmission, together with the proper sign, are shown on the printed test record.

(8) Deviation totalizing registers, 30. These register the total number of computed deviations in ½ decibel increments from ½ to +8 and from 0 to −8 decibels.

(9) Two associated amplifiers, a far-near amplifier 7 and a near-far amplifier 10, and one associated amplifier-rectifier 12.

When a test connection is established, the intertoll trunk test frame proceeds to control "sending" toward the distant end as in Fig. 2 and then turns further control over to the control circuit, 26, with timing intervals for the various functions being furnished from the intertoll trunk test frame 27. Upon arrival of test power from the far end, the control circuit 26 causes the far-near pads 22 to be adjusted as in Fig. 3, including accuracy checks to insure that the measurement is reasonably correct. The end of the measurement far-near relays 22A connect the far near pad control relays 22 to computer 28 and the computer makes a computation of the deviation of the measured loss in the far-near direction from the specified value. If this deviation exceeds the checking limits of 2.9, 3.9 or 4.9 decibels mentioned previously, this fact will register on relay in the computer 28 for use as explained later.

On completion of the far-near measurement the control circuit 26 causes the near-far amplifier 10 and near-far pads 23 to be inserted in the transmission path 21 and when test power arrives, causes the near-far pads 23 to be adjusted as in Fig. 4, including checks to insure the accuracy of the measurement. Near the end of this step the computer circuit 28 is again connected by cut-on relays 23A, and a limits check is made for the near-far direction and registered as explained above.

Figure 9:
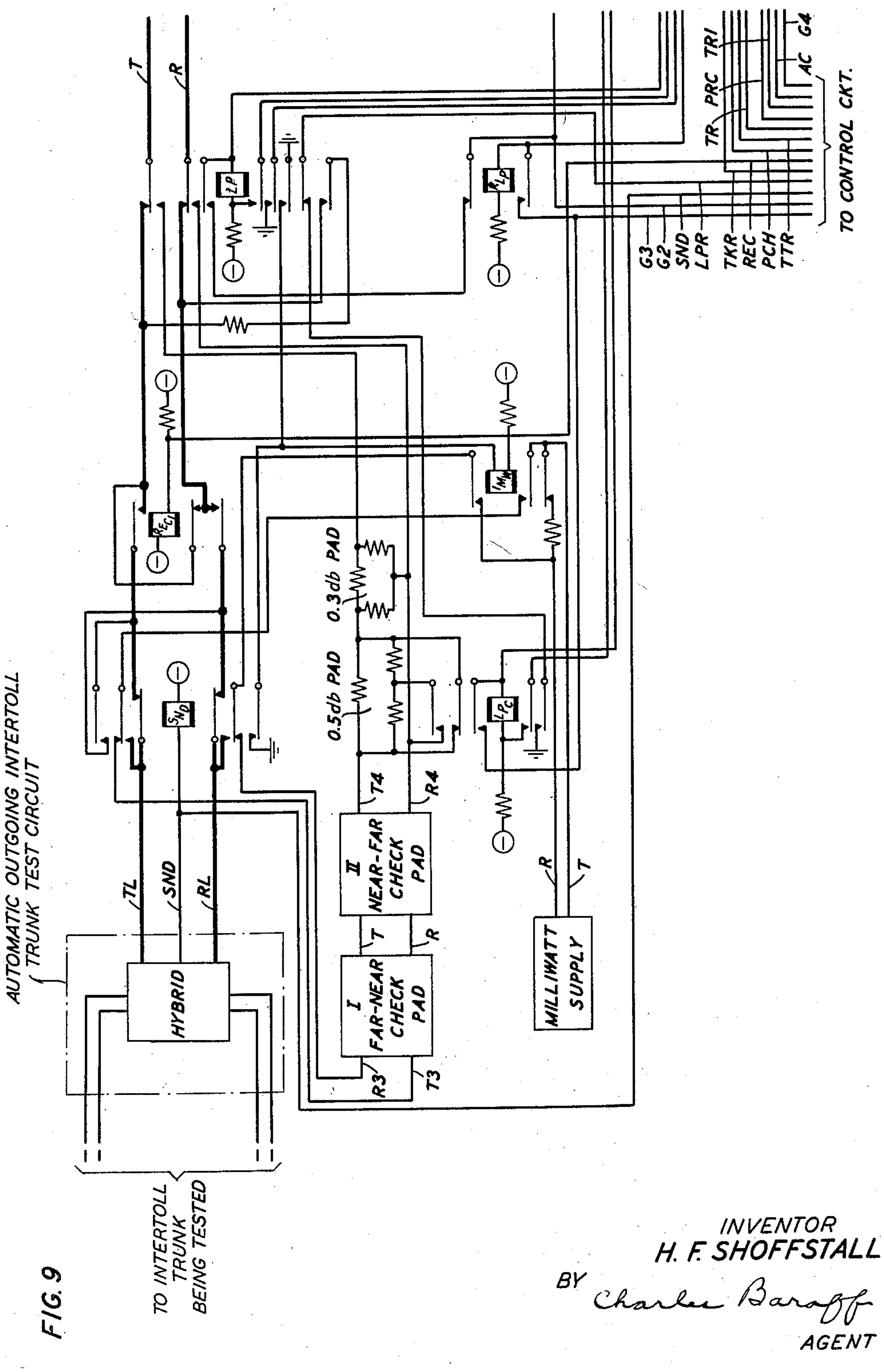
Figs. 9 and 10 show the transmission path circuit.
Figure 10:
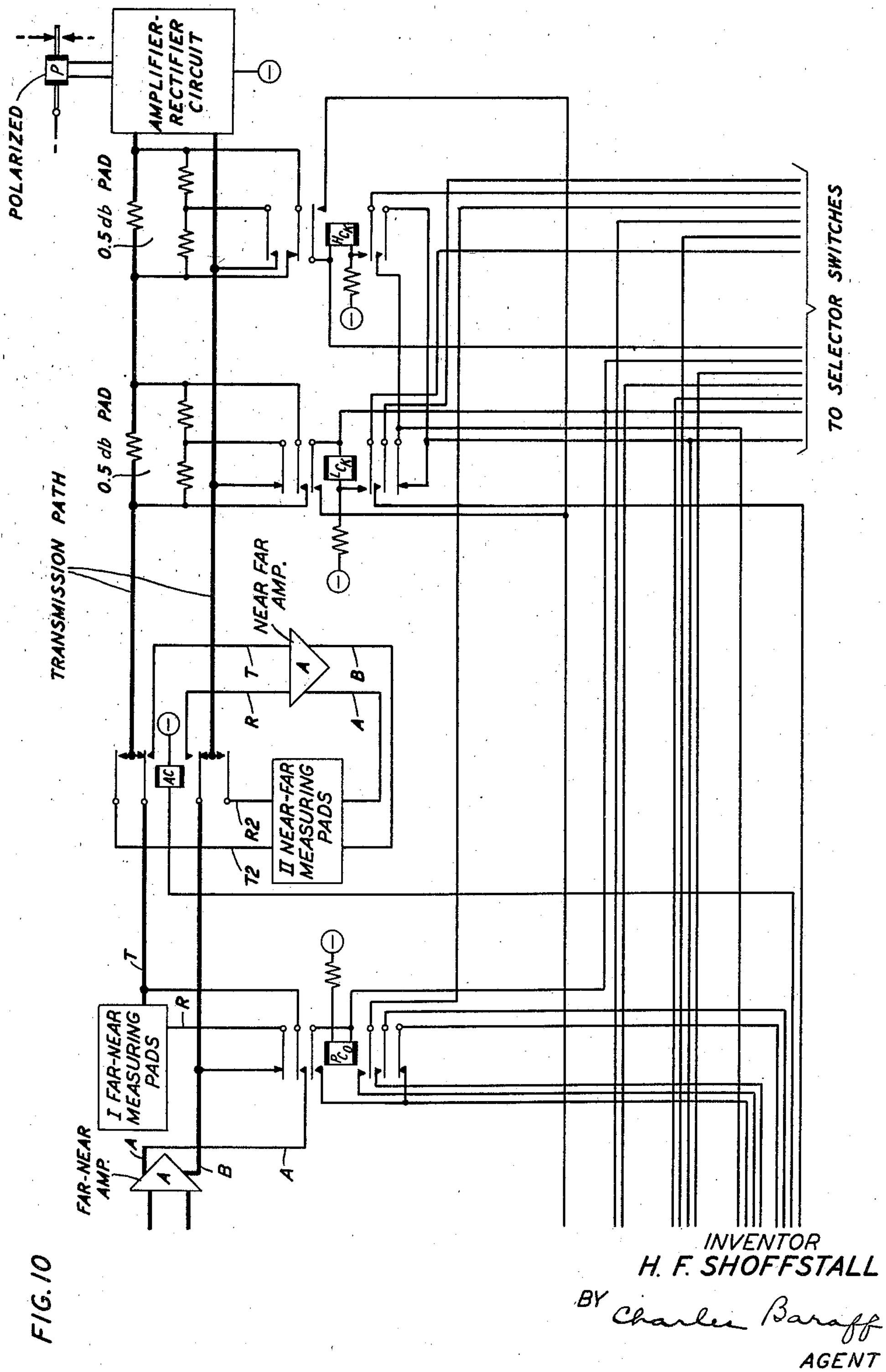

Figs. 9 and 10 show the near end or home end, at which the computer is located and where the data for measured trunk loss in the both directions is held in the far-near measurement pads 22 and near-far measurement pads 23 respectively, to be thence set into the relay computer.

The layout of Figs. 9 and 10 corresponds to the near end layout shown schematically in Fig. 4. The far-near measurement pads 22 and the near-far measurement pads 23 of Figs. 9 and 10, represented by blocks I and II, are shown as detailed circuits in Figs. 13 and 14.

The switching circuits which are shown in Figs. 9 and 10, involving the 1MW, SND, REC1, LP, LPC, PCO, LCK and HCK relays are described in greater detail subsequently.

DETAILED DESCRIPTION OF THE INTERTOLL TEST AND COMPUTING CIRCUITS

A more detailed description of the functioning of the various circuits in going through the test and computing sequences is given in the following sections.

*8. Near-far sending*

When making a transmission test, the automatic outgoing intertoll trunk test circuit selects the trunk to be tested and sets up a connection to the far-end equipment in distant office. When the connection is established and the far end is ready to start the test, the far end returns a steady off-hook signal. Upon receipt of the off-hook signal the intertoll trunk test circuit, after a short delay, grounds lead "SND" to operate relay SND, Fig. 9, and grounds lead "SEND" to light lamp SEND, Fig. 31. Relay SND operates relay 1MW and causes one milliwatt testing power to be connected over leads "TL" and "RL" to the intertoll trunk test circuit and thence over the trunk to the transmission measuring circuit at the far end.

While the test power is connected the far end measures the loss in the near-to-far direction as previously described. After about three seconds the intertoll trunk test circuit removes ground from lead "SND" which releases relays SND and 1MW to remove the test power from the trunk.

Should the far end be unsuccessful in its first measurement, it will return a short (about ½ second) on-hook signal soon after the test power is removed. When the on-hook signal is removed by the far end, the intertoll trunk test circuit will again ground lead "SND" for three seconds, which reoperates relays SND and 1MW for a second trial. If the far end is still unsuccessful after a third attempt, the intertoll trunk test circuit will (1) block and bring in an alarm, (2) remove ground from lead "SEND" to retire lamp SEND, and (3) ground lead "FNCK" to light lamp FNCK, Fig. 31, indicating that the far end was unable to make a satisfactory check of its measurement.

If the far end is successful on any one of the first three attempts, it will fail to return an on-hook signal when the test power is removed. When the intertoll trunk test circuit fails to receive the on-hook signal within about 0.5 second after it has removed the test power, it will again connect ground to lead "SND" for about 0.4 second, reoperating relays SND and 1MW to send a short spurt of test power to the far end and will also ground lead "ONG" to operate relay ON, Fig. 32. The short spurt of test power is a signal to the far end that this is an automatic test so that it needs to return test power for only about three seconds.

Figure 11:
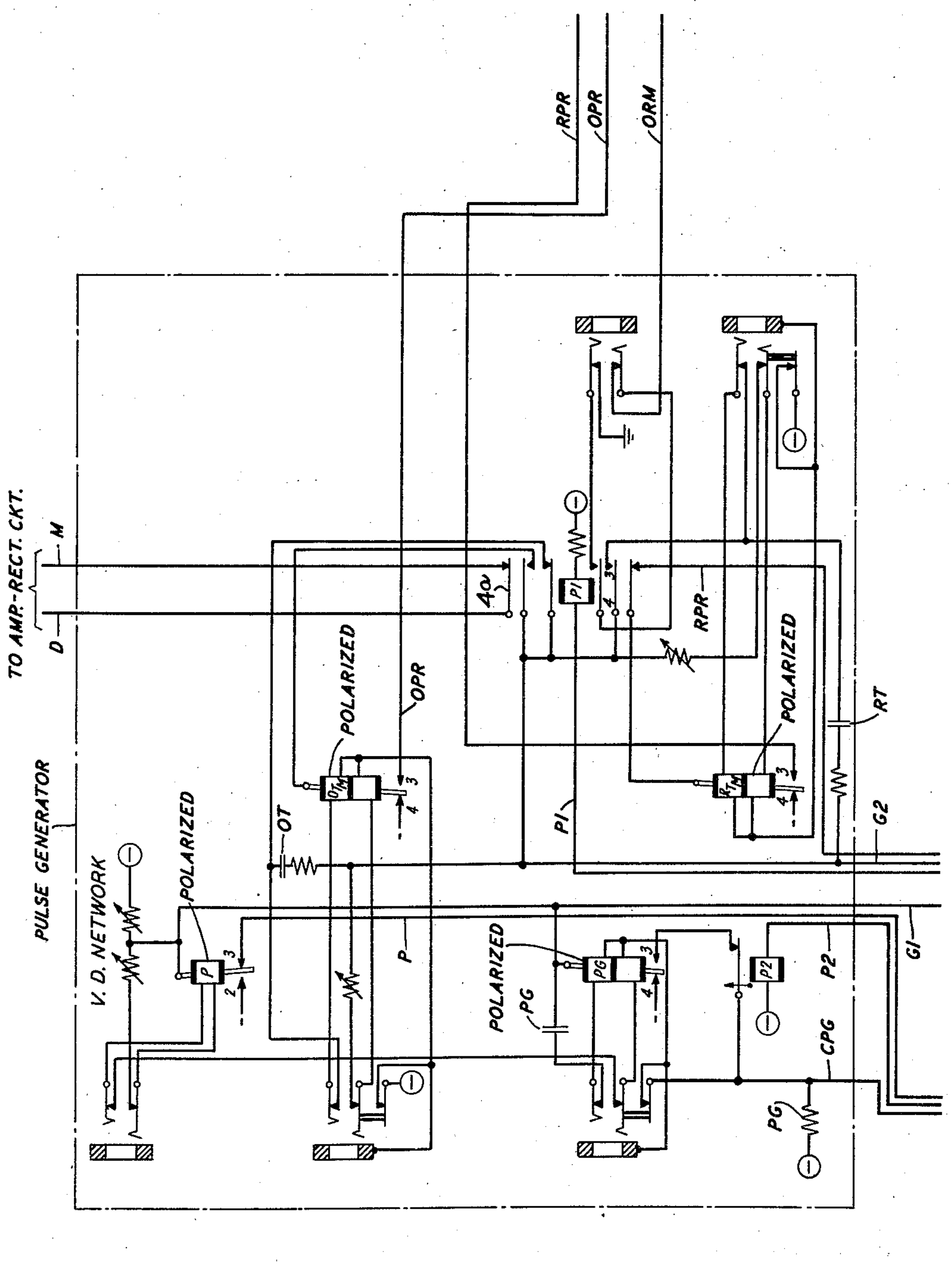
Fig. 11 shows the pulse generator circuit.

Relay ON operated:

(1) Supplies grounds over leads "G1" and "G2" and through the back contact of relay TA1 over lead "CPG" to the pulse generator circuit, Fig. 11, to prepare for pulsing.

(2) Operates relay TA through relay REC, normal.

Figure 32:
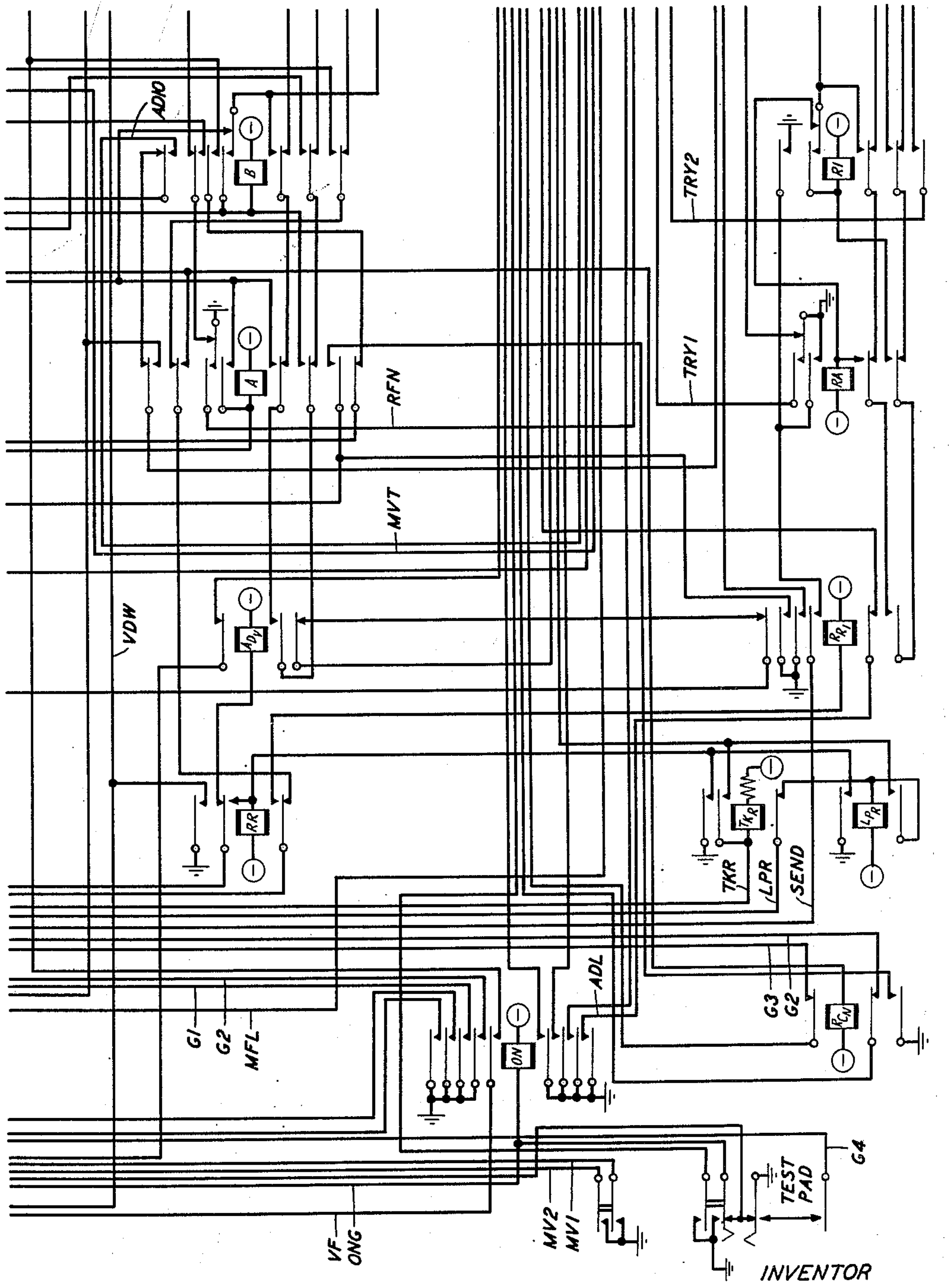
Figure 33:
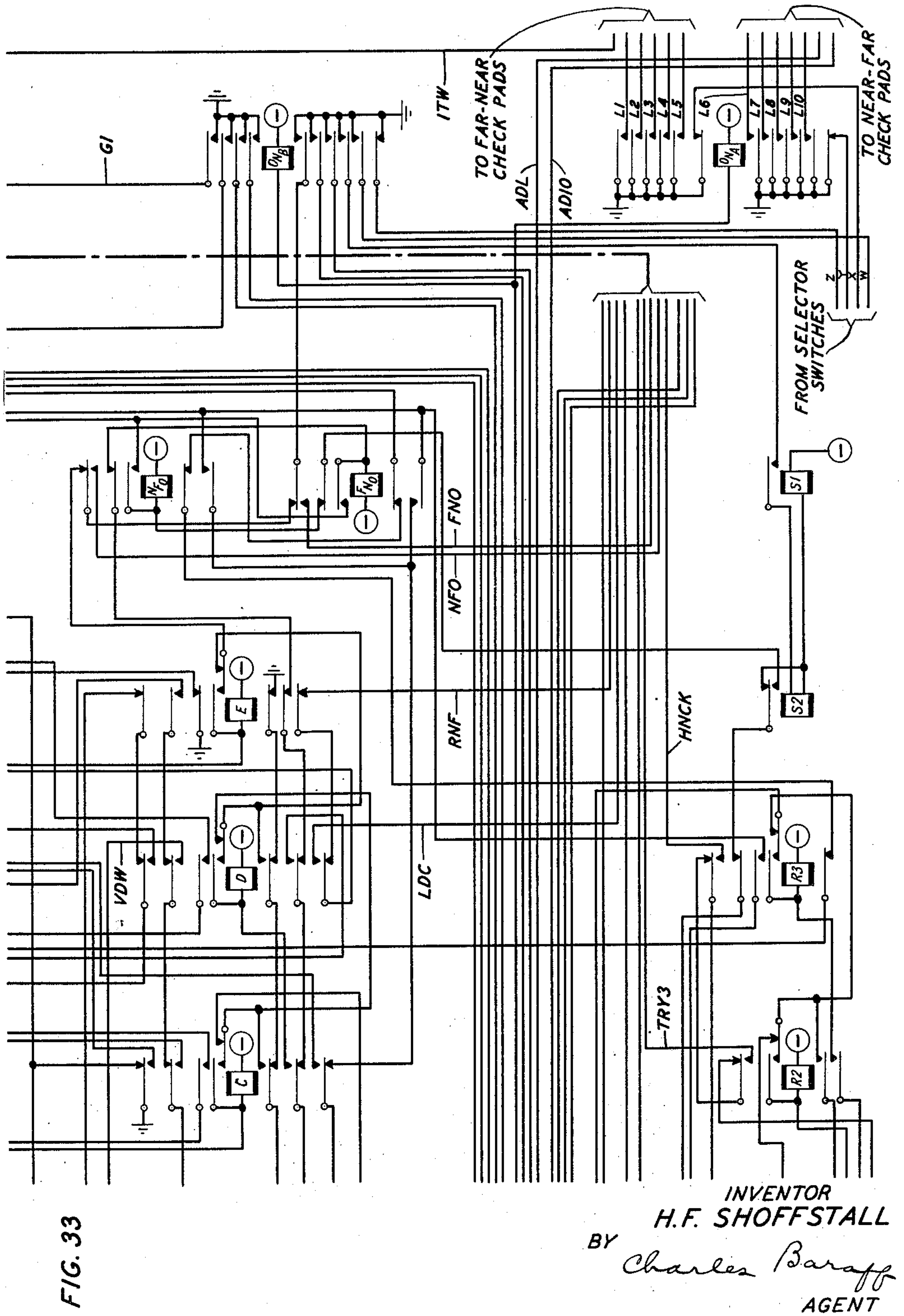

(3) Operates relay RA through relays R3, R2, and R1, normal, Figs. 32–33.

(4) Supplies holding ground for various relays in Figs. 30–33.

(5) Operates relays ONA and ONB through relay RR1, normal.

(6) Operates relay P2, Fig. 11, through relay TA1, normal.

Figure 30:
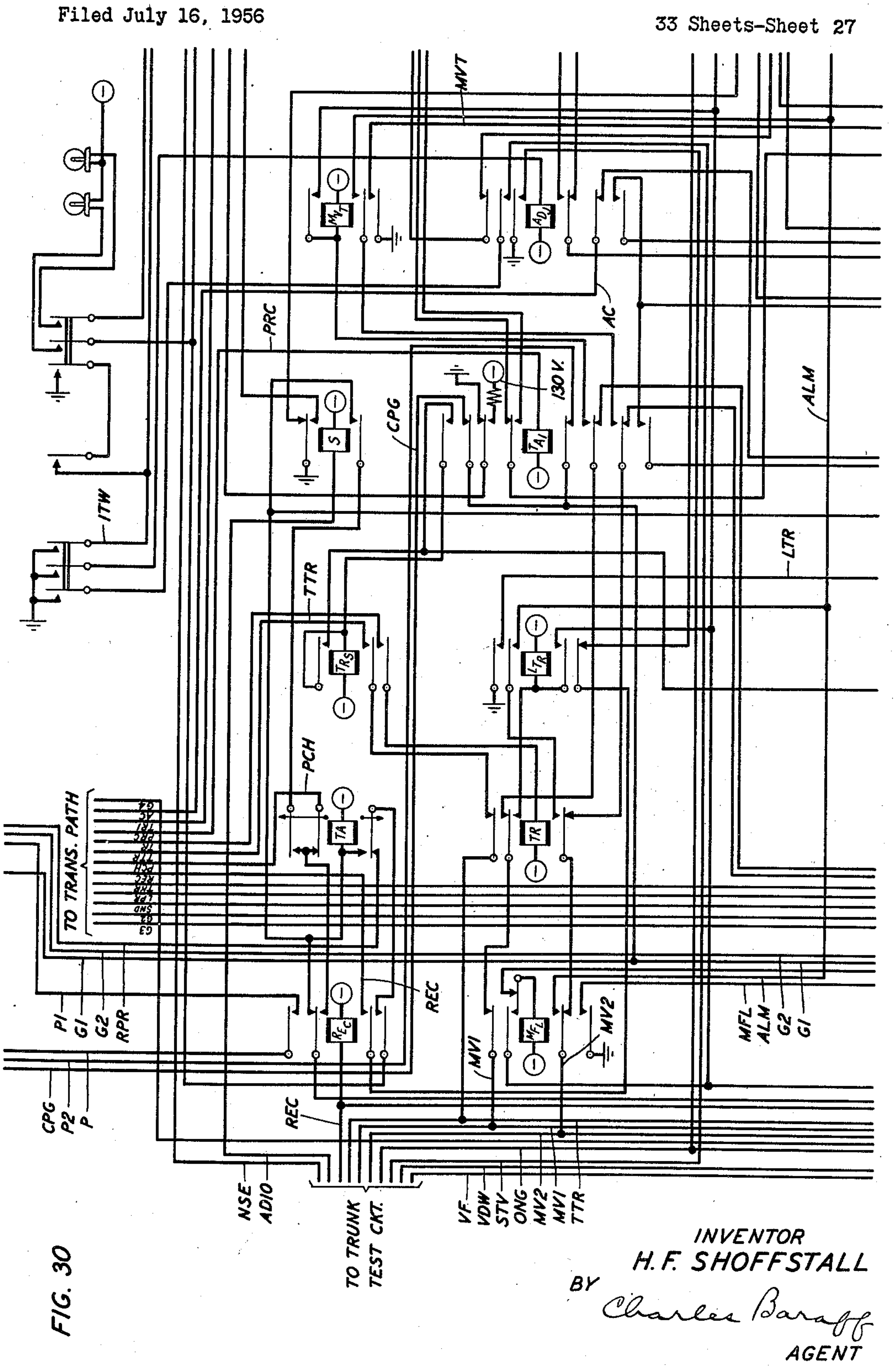
Figs. 30 through 33 show the control circuit.

(7) Grounds lead "VF," Fig. 30. This causes the timing circuit of the intertoll trunk test circuit to function so that it will wait about nine seconds for the completion of the far-near measurement.

Figure 12:
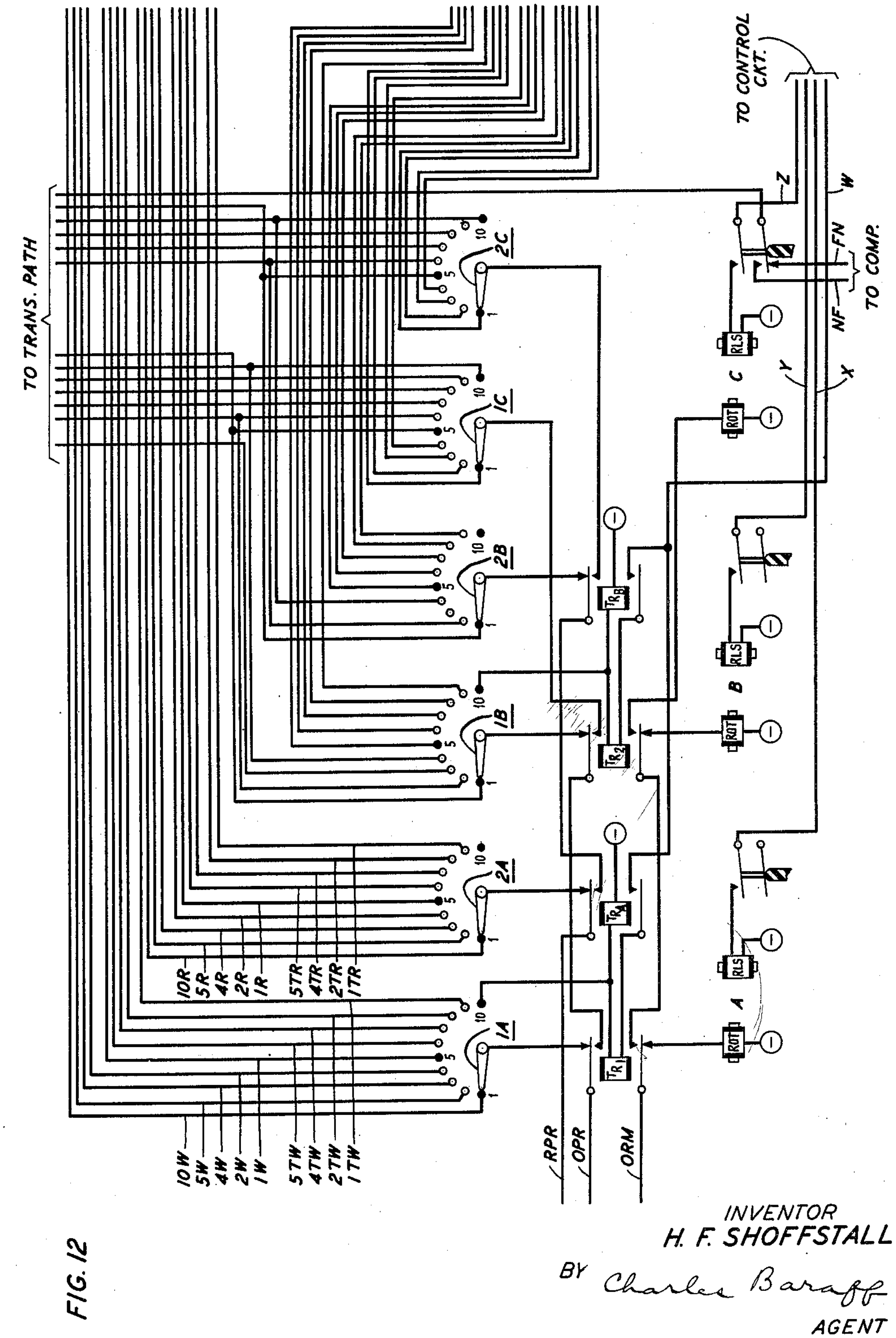
Fig. 12 shows the selector switches.
Figure 13:
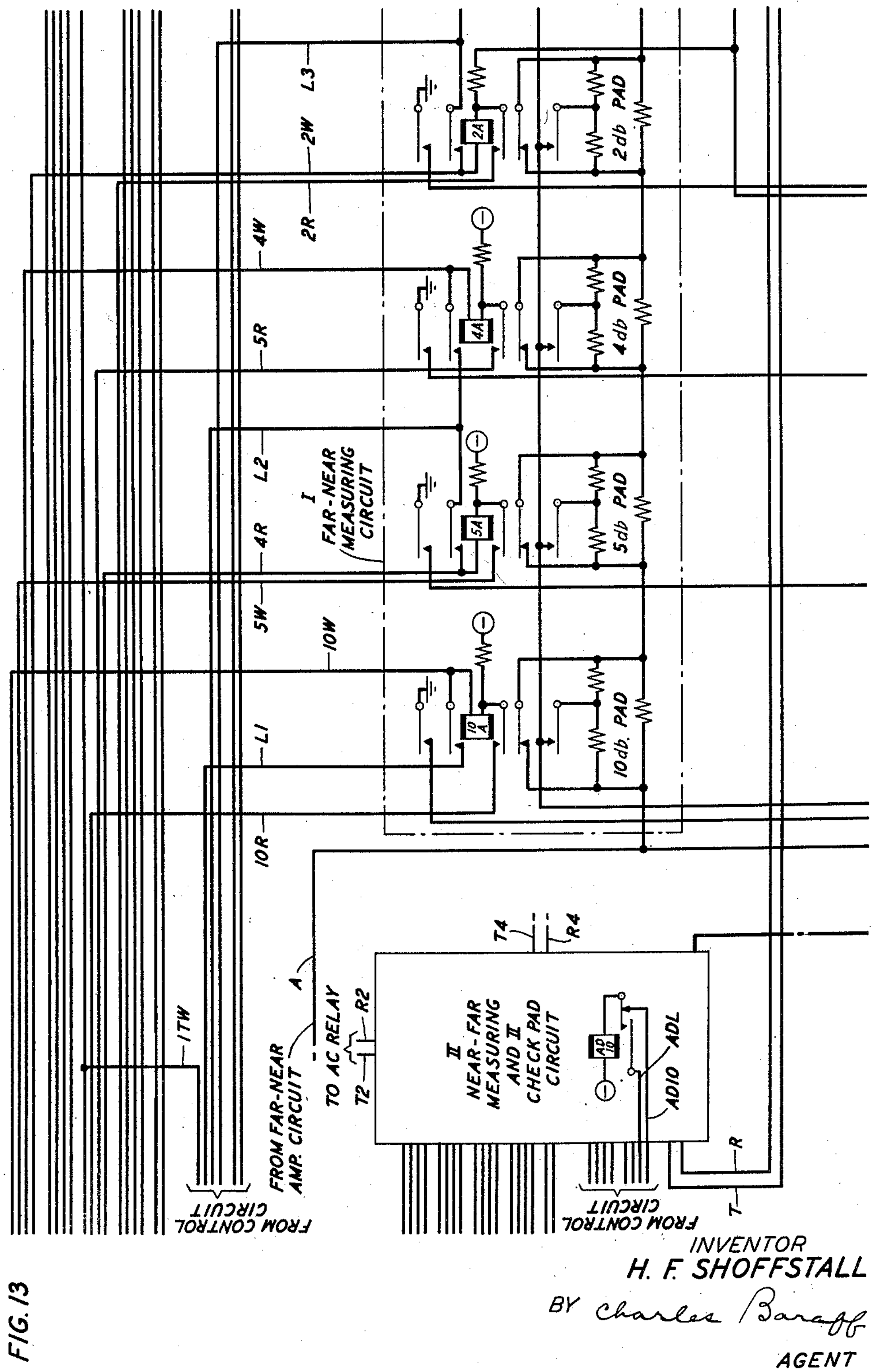
Figs. 13 and 14 show the attenuator pad circuits.
Figure 14:
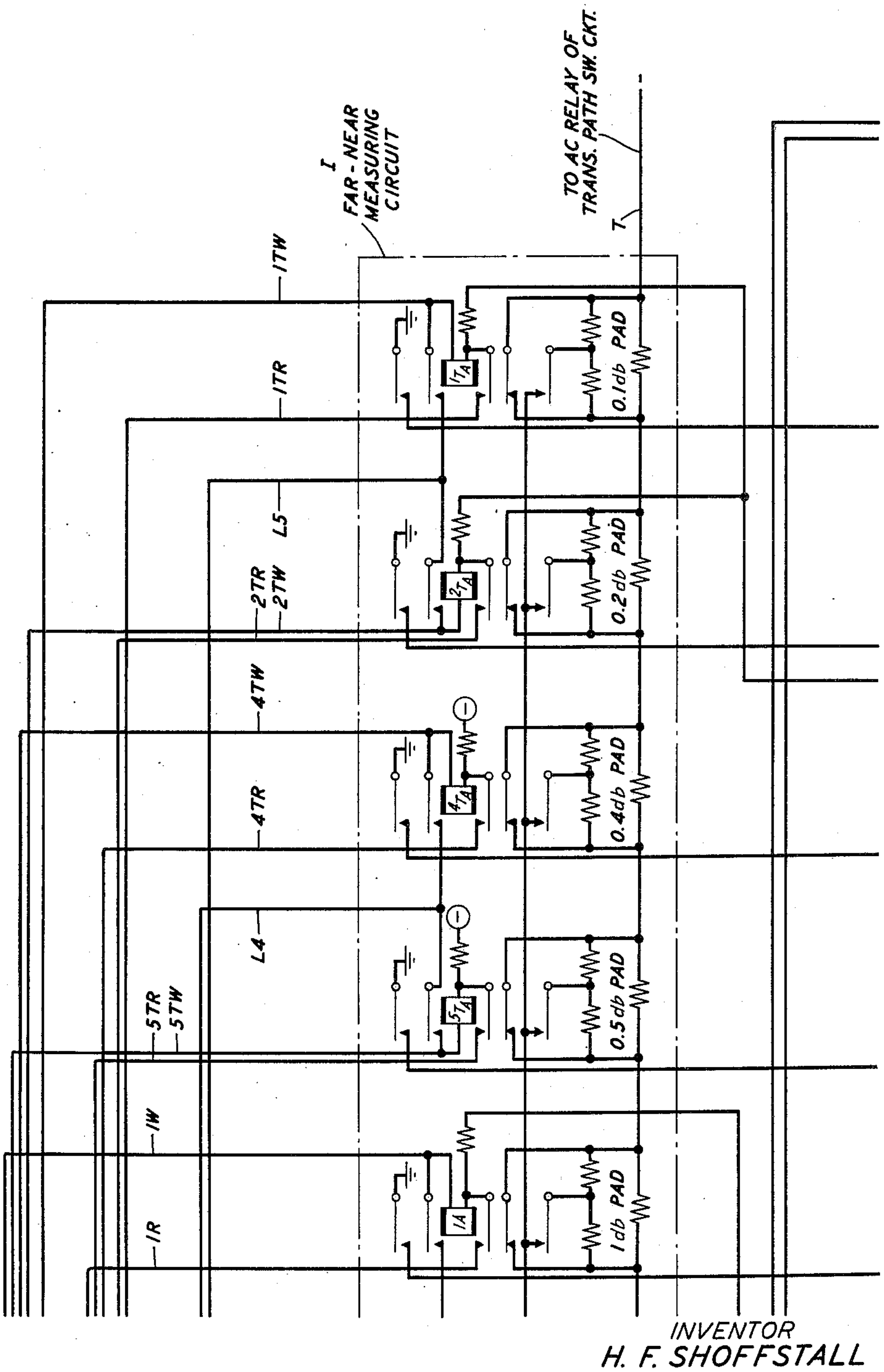

Relays ONA and ONB supply holding grounds for various relays in Figs. 30 through 33 and for the pad relays, Figs. 13 and 14, and switch transfer relays, Fig. 12.

At the end of the 0.4 second timing period the automatic intertoll test circuit (1) removes ground from lead "SND" to terminate the spurt of test power, (2) retires lamp SEND, and (3) connects ground to lead "REC" operating relay REC.

Relay REC operated:

(1) Prepares the operate path of relay P1, Fig. 11.

(2) Extends ground over lead "REC" to operate relay REC1, Fig. 9.

(3) Opens the original operate path of relay TA. Ground from the normal contact of relay TA1 over lead "J," Fig. 31, to the amplifier-rectifier is returned through the back contact of relay P in the amplifier-rectifier circuit over lead "K," Fig. 31, to hold relay TA.

Relay REC1, operated removes the short circuit on the leads to the input of the far-near amplifier and extends the input of the far-near amplifier over leads "TL" and "RL" through the intertoll trunk test circuit to the trunk under test. After grounding lead "REC" the intertoll trunk test circuit will relax for nine seconds, during which time it is expected that the far-near transmission measurement will be completed.

*9. Preparation for near-far measurement*

When the far end sends one milliwatt, the test power through the far-near amplifier, far-near pad, and the amplifier-rectifier operates relay P in the amplifier-rectifier circuit (Fig. 10). This removes the ground coming from the amplifier-rectifier over lead "K," releasing relay TA to start the measurement. Relay TA is slow release (about .16 second minimum) to guard against a false start of the measurement in case the relay in the amplifier-rectifier operates momentarily on transients while waiting for the arrival of the test power. Relay TA, released, prepares a holding path for relay PCO, Fig. 10, and operates relay TA1 through relay PCO, normal.

Relay TA1, operated:

(1) Operates relay A, Figs. 32–33, through relays B, C, D, E, NFO, and FNO, normal, and ONB, operated. Relay A prepares for an advance of the test circuit when the test power is removed and lights lamp RFN, Fig. 31, to indicate that the far-near measurement is in progress.

(2) Removes ground from lead "J" to the amplifier-rectifier and connects +130 volt resistance battery thereto to prepare for controlling the pad relays.

(3) Starts the release of slow release relay P2, Fig. 11.

(4) Removes ground from lead "CPG" to Fig. 11. This starts the pulse generator which proceeds with the adjustment of the far-near pads, as described in paragraphs 11 and 12.

(5) Operates relay TRS, which locks.

If the far end were unable to receive test power due to excessive loss in the trunk (20 decibels or more) in the near-far direction or for any other reason, it would have waited for about six seconds after returning the off-hook signal and then would have returned a steady 120 IPM flash. In the meantime, the home end would have completed near-far sending and would have relaxed for nine seconds as described in paragraph 8. Before the nine-second interval elapses, the far end will have started to return the flashing signal. During the first on-hook period of the flash the intertoll test circuit grounds lead "AD10," Fig. 30, to operate relay S. Relay S holds relay TA to prevent its release in case relay P in the amplifier-rectifier operates on transients accompanying the flash, and also operates relay S1, Fig. 33. Relay S1 locks, but relay S2 is short-circuited and does not operate. When the on-hook period is over, ground is removed from lead "AD10" and relay S releases, which permits relay S2 to operate in series with S1 which holds. During the next on-hook period lead "AD10" is again grounded, reoperating relay S. Relay S in turn operates relay NFO, Fig. 33, which locks. Relay NFO opens the operating path for relay A, lights lamp NFO, Fig. 31, indicating that the loss exceeds 20 decibels in the near-far direction, and prepares a circuit to bring in an alarm. At the end of the nine-second timing interval the intertoll trunk test circuit grounds leads "MV1" and "MV2," Fig. 30. Ground on lead "MV1" operates relay ADV which serves no useful purpose at this time; but ground on lead "MV2" is extended through the contacts of relays A, B, and C, normal, and NFO, operated, to lead "ALM" to the intertoll trunk test circuit to block the test circuit and bring in an alarm. The alarm condition in the intertoll trunk test circuit causes it to immediately remove ground from leads "MV1" and "MV2."

The far end may be able to complete its measurement successfully, but the home end may be unable to receive test power from the far end due to loss in excess of 20 decibels in the far-near direction. In this case the far-end, after near-far sending is completed, will (1) send test power for about three seconds for the far-near measurement, (2) after a short delay will send test power again for about three seconds for the near-far measurement, and then (3) proceed with its noise check. Should the far end return a short on-hook as an "add 10" signal (paragraph 15), the on-hook signal will be absorbed by relays S1 and S2. In the meantime, relay TA remains operated, and relays TA1 and A remain normal while the intertoll trunk test circuit measures off a nine-second timing interval awaiting the completion of the far-near measurement. Before the far end completes its noise check, this nine-second interval at the home end will have elapsed, and at that time the intertoll trunk test circuit connects ground to leads "MV1" and "MV2." Ground on lead "MV1" operates relay ADV, Fig. 32, which in turn operates relay FNO. Relay FNO, operated, locks, lights lamp FNO indicating that the loss exceeds 20 decibels in the far-near direction, and extends the ground on lead "MV2" over lead "ALM" to the intertoll trunk test circuit to bring in an alarm. The alarm condition in the intertoll trunk test circuit causes it to immediately remove the grounds from leads "MV1" and "MV2."

When an alarm is brought in by the operation of either relay FNO or NFO, relay REC1, Fig. 9, is released to cut the transmission path from the trunk under test through to the attendant's telephone circuit, Fig. 8.

*10. Pulse generator—Fig. 11*

The pulse generator circuit, Fig. 11, supplies pulses for stepping the selector switches, Fig. 12. The circuits through the selector switches provide access to the windings of the pad control relays, Figs. 13 and 14, for controlling the adjustment of the pads.

The pulse generator circuit consists of a pulse generating relay PG, a slave relay P, pulsing relay P1, slow release relay P2 and a voltage dividing network. When relay ON operates, ground over lead "G1" is connected to the voltage dividing network and through a back contact of relay TA1 over lead "CPG" to resistances PG and PG1. The current flow through relay P and the primary winding of relay PG is in a direction to cause relay PG to move to its No. 4 contact, relay P to move to its No. 2 contact, and condenser PG is discharged through the secondary winding of relay PG. When relay REC operates, it closes the operate path of relay P1 through to the No. 3 contact of relay P, which is open at this time. The pulse generator circuit remains in this condition until ground is removed from lead "CPG" by the operation of relay TA1, Fig. 30.

When relay TA1 operates upon the arrival of test power (paragraph 9), it starts the release of slow release P2 and removes ground from lead "CPG," causing a reversal of current in relay P and the primary winding of relay PG. Condenser PG also starts to charge. Relay P immediately moves to its No. 3 contact and operates relay P1. Initially, the charging current through condenser PG holds relay PG on its No. 4 contact for an interval. As the condenser becomes charged, the primary winding of PG becomes the stronger and moves PG to its No. 3 contact.

On the first pulse nothing more happens until slow release relay P2 is released. When relay P2 releases, it remains released for the remainder of the train of pulses and extends ground from the No. 3 contact of relay PG to again ground resistances PG and PG1. This again reverses the current in relay P and the primary winding of relay PG, and condenser PG starts to discharge. Relay P immediately moves to its No. 2 contact, releasing relay P1, but the discharge of condenser PG is in a direction to hold relay PG on its No. 3 contact momentarily. As the condenser PG becomes discharged, the current in the primary winding becomes the stronger and moves relay PG to its No. 4 contact. When the No. 3 contact of PG opens, it removes the ground from resistances PG1 and PG, and the current in relay P and the primary winding of relay PG again reverses, causing relay P to move to its No. 3 contact for the beginning of the second pulse. This reversing process will continue until ground is restored on lead "CPG," the speed depending upon condenser PG and the constants of the voltage dividing network. Slow release relay P2 lengthens the first pulse to permit the relay in the output circuit of the amplifier-rectifier to ing a successful far-near measurement, the intertoll trunk test circuit functions to ground leads "MV1" and "MV2;" as explained in paragraph 14, the ground on lead "MV1" operating relay ADV.

Relay ADV operated:

(1) Releases relay TRS which removes ground from lead "TTR" to the intertoll trunk test circuit. This restores the timing in the intertoll trunk test circuit so that, after it removes ground from leads "MV1" and "MV2" it will wait about 9 seconds for the completion of the near-far measurement.

(2) Extends ground from relay A, operated, to relay B, which operates and locks and opens the original operating path of relay A. This same locking ground is fed back through relay ADV, operated, to hold relay A.

The ground on lead "MV2" is connected through relay A, operated, to relay RCN which operates. Relay RCN releases relays LCK and FNC, in turn, and reoperates relay TA. Relay TA, operated, opens the holding path of relay PCO, which releases. Relay PCO, released, reinserts, the near-far pads in the transmission path, further opens lead "TTR" and the original operating path of relay TR, and prepares a path for reoperating relay TA1 when test power arrives for the near-far measurement.

When relay B operates, a circuit is established from the contact of relay S through relay NFST normal to lead "AD10" to Fig. 13. If the trunk loss in the near-far direction is 10 db or more, the far end will return a ½ second on-hook signal before it sends test power for the near-far measurement; and when it does send, 10 db loss will be omitted in the transmitting pad at the far end. The on-hook signal causes the intertoll trunk test frame to ground lead "AD10," operating relay S. Operation of relay S at this time operates relay AD10, Fig. 13. Relay AD10 locks to relay ON and causes 10 db to be added to the near-far transmission loss measurement to compensate for the loss omitted in the transmitting pad at the far end.

After a short interval the automatic intertoll trunk test circuit removes ground from leads "MV1" and "MV2," releasing relays ADV and RCN, leaving relay TA locked, operated, over lead "K" through the back contact of relay P in the amplifier-rectifier circuit. Relay ADV, released, also releases relay A. Relay A, released, lights lamp ANF, Fig. 31, indicating that the circuit is awaiting test power for the near-far measurement and operates relay AC, Fig. 10, over lead "AC." Relay AC cuts the near-far amplifier and near-far pads into the input circuit of the amplifier-rectifier.

After the intertoll trunk test circuit removes ground from leads "MV1" and "MV2" it will relax for nine seconds, awaiting the completion of the near-far measurement. Should the test power fail to arrive before the nine-second interval elapses, the intertoll trunk test circuit will function to again ground leads "MV1" and "MV2," operating relay ADV before relay TA1 has operated. Under this condition relay ADV operates relay LTA. Relay LTA locks, lights lamp LTA to indicate "late tone arrival," and extends the ground on lead "MV2" through to lead "ALM" to the automatic intertoll trunk test circuit to bring in an alarm. The alarm condition causes the ground to be immediately removed from leads "MV1" and "MV2."

16. *Adjustment of near-far pads*

When test power for the near-far measurement arrives on time, relay P in the amplifier-rectifier moves to its front contact and releases relay TA, which, in turn, operates relay TA1. Relay TA1 functions as described in paragraph 9 to start the pulse generator, except that it now operates relay NFST, Fig. 31, instead of relay A. Relay NFST operated:

(1) Prepares an operating path for relay (C).

(2) Retires lamp ANF.

(3) Lights lamp RNF to indicate that the near-far measurement in in progress.

(4) Opens lead "AD10" to Fig. 13, to prevent the operation of relay AD10 should an on-hook signal arrive after this time.

The start of the pulse generator by the release of relay TA1 moves switch B to position 5 for the insertion of the 10 decibel near-far pad. The adjustment of the near-far pads progresses in the same manner as for the far-near pads, as described in paragraph 12. When switch B reaches position 10, relays TRB and TR2 operate to transfer the control leads "ORM," "OPR," and "RPR" to selector switch C. Switch C then starts to move, and at position 4 the adjustment of the near-far pads is completed. On positions 5 and 6 of switch C the HCK and LCK relays are again operated to check the accuracy of the adjustment, as described in paragraph 13. While relay LCK is operated, it holds relay NFC operated through a make contact of the off-normal springs of selector switch C. This causes the computer circuit to function and to check the transmission deviation limits in the near-far direction, as described in paragraph 20.8. When position 7 of switch C is reached, the circuit proceeds with a "loop check" test.

17. *Loop check*

The far-near and near-far pads may be adjusted and checked successfully, but the measurement may still be an error due to such things as defective resistances or contacts in the pads or associated relays or a change in the amplifier or amplifier-rectifier gain or a variation in the testing power supply. A loop check is made as described below to guard against such errors.

Figure 15:
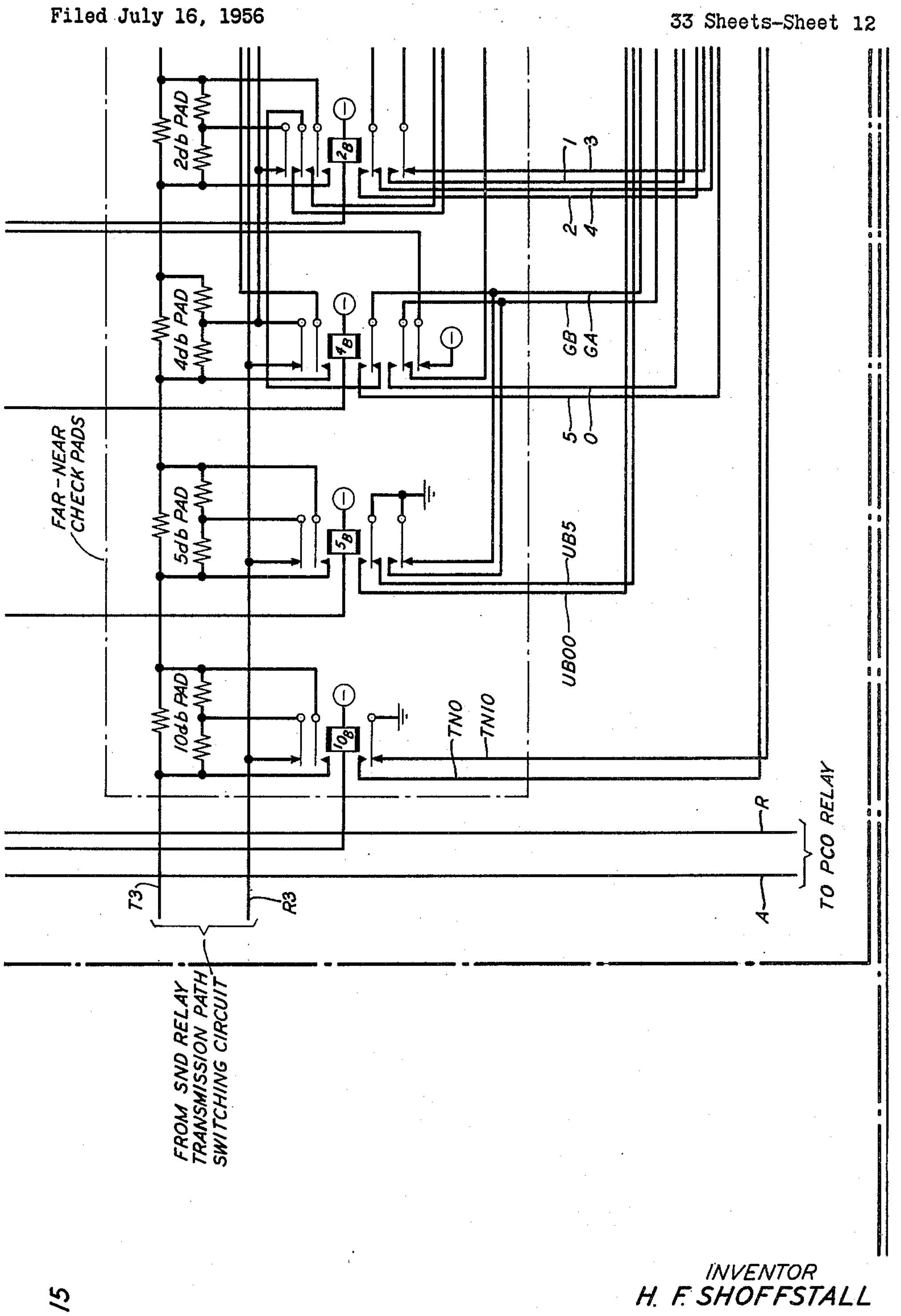
Figs. 15 and 16 show the check pads.
Figure 16:
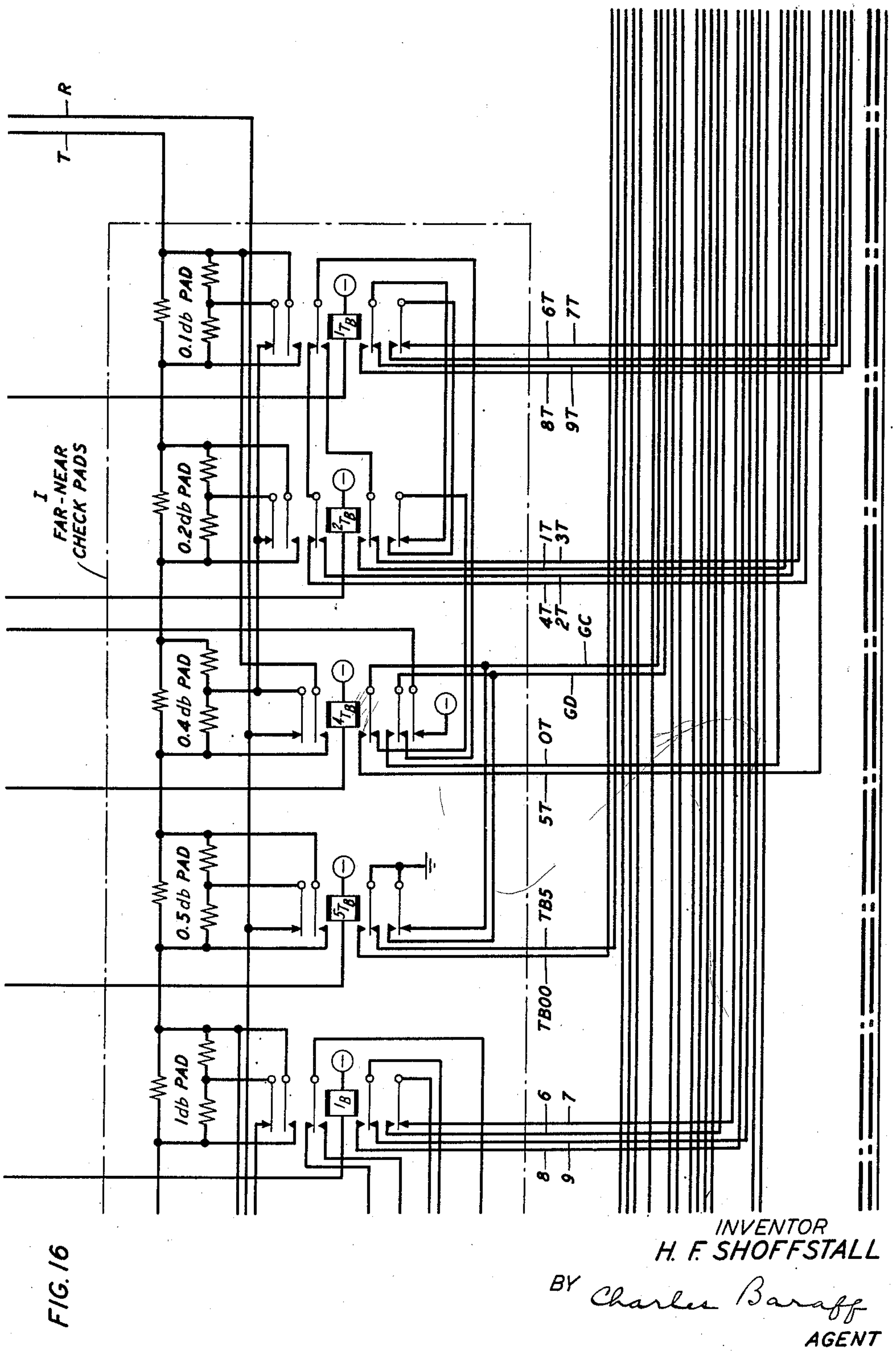

When a loss is added in the far-near or near-far pads during the adjustments previously described, the supplementary pad relay removes an equal loss from the associated check pad, Figs. 15 and 16. These check pads normally have a total loss of 19.9 decibels. Therefore, when the adjustment is finished, the sum of the losses in the far-near pad and the far-near check pad is always 19.9 decibels. Similarly, the sum of the losses in the near-far pad and the near-far check pad is also 19.9 decibels. Since the gain of each amplifier is 19.9 decibels, the sum of all losses and gains is zero if there have been no errors. At position 7 of switch C relay LP operates to start the loop check.

Relay LP, Fig. 9, operated:

(1) Connects ground through the contacts of relays HCK and LCK. If these relays are not in the proper position, relays TKR and RR will operate in turn, as described in paragraph 13, to prepare for a second trial.

(2) Operates relay 1MW which connects the one-milliwatt supply through relay SND normal to the input to the far-near check pad.

(3) Removes the input of the far-near amplifier from leads "TL" and "RL" and connects it to the output from the near-far check pad.

(4) Connects resistance T2 across leads "TL" and "RL" to terminate the trunk under test.

With the above circuit arrangement the one-milliwatt supply will be connected through the far-near check pads, Figs. 15 and 16, near-far check pads, Fig. 13, contacts of relay LPC normal, the 0.3 decibel fixed pad, Fig. 9, consisting of resistances, contacts of relay LP, operated, far-near amplifier and far-near measuring pads, Fig. 10, contacts of relay AC operated, near-far amplifier and near-far measuring pads, contacts of relays LCK operated and HCK released to the input of the amplifier-rectifier. If everything is satisfactory, the input power to the amplifier-rectifier will be about 0.2 decibel higher than necessary to cause relay P in the amplifier-rectifier to break its back contact on the next open period of the pulse. If the relay remains on its back contact, the +130 volt resistance battery mentioned previously will cause relay LP to release before switch C moves to position 8, thus indicating that the total net loss in the looped circuit is too high and that a second trial should be made.

When switch C moves to position 8, relay LPC, Fig. 9, operates and inserts a 0.5 decibel pad in the loop circuit to decrease the power input to the amplifier-rectifier. This should cause relay P in the amplifier-rectifier to remain on its back contacts during the open period of the pulse. Should relay LP have released at position 7 of switch C, the operation of relay LPC at position 8 connects ground through LP normal to lead "LPR" to operate relay LPR, Fig. 30. Relay LPR locks and operates relay RR to prepare for a second trial when the test power is removed. If relay P in the amplifier-rectifier remains on its back contact after LPC operates, the +130 volt resistance battery will cause LPC to be released before switch C moves to position 9; but if relay P operates to its front contact, relay LPC will remain operated, thus indicating that the total net loss in the looped circuit is too low and that a second trial should be made.

When switch C reaches position 9, relay RLP operates and locks and releases relay LP. If relay LPC is still operated, it now operates relay LPR, Fig. 30, to prepare for a second trial. Relay LP, released, restores leads "TL" and "RL" to the input of the far-near amplifier to check for the removal of test power at the far end. When switch C reaches position 10, relay PCO is again operated. Relay PCO functions as explained in paragraph 14. Relay P in the amplifier-rectifier then operates on the test power from the far end and operates relay TR while waiting for the far end to remove the test power.

While the near-far pad adjustment and check is in progress the intertoll trunk test circuit is timing the nine-second interval awaiting the completion of the near-far test. Should this interval elapse before the test power is removed by the far end, the intertoll trunk test circuit functions to ground leads "MV1" and "MV2" while relay TR is still operated. The circuit then functions as described in paragraph 14 to light lamp LTR and to bring in an alarm.

If the test power is removed within the allotted time, relay P in the amplifier-rectifier releases and, in turn, releases relay TR. Lead "TTR" to the test circuit is then grounded as described in paragraph 14, which causes the test circuit to stop its nine-second timing interval and to ground leads "MV1" and "MV2." With relay TR normal the ground on leads "MV1" and "MV2" causes this circuit to either start a second trial, as described in paragraph 18, or if a second trial is not necessary, to prepare for a noise check, as described in paragrpah 19.1.

18. *Second trial test*

Should the home end be unsuccessful when checking the accuracy of the pad adjustment (paragraph 13) either after the far-near or the near-far pad adjustment or in its loop check (paragraph 17), either relay TKR or LPR will operate and lock at the time the check is made and, in turn, will operate relay RR. Relay RR grounds lead "VDW," Fig. 32, to arrange the intertoll trunk test circuit so that the next time it grounds leads "MV1" and "MV2" it will hold ground on these leads for about 0.4 second. When the test power is removed at the far end, the intertoll trunk test circuit functions, as described in paragraph 14 or paragraph 17, to connect ground to leads "MV1" and "MV2." Ground on lead "MV1" holds relay RR, and ground on lead "MV2" operates relay RR1.

Relay RR1 operated:

(1) Operates relay R1, which locks and opens the original operate path of relay RA. The locking ground is fed back through relay RR1 to hold relay RA.

(2) Releases relays ONA and ONB.

(3) Releases relay TRS to open lead "TTR" to the automatic intertoll trunk test circuit.

(4) Reoperates relay TA, which functions as described in paragraph 15.

(5) Operates relays SND and 1MW, Fig. 9, in turn. This sends a spurt of 1000-cycle test power to the far end as a signal for the far end to again send 1000-cycle test power for a second trial.

As mentioned above, the repeat test will be started either directly after the completion of the far-near measurement or after completion of the loop check. In the latter case both the far-near and near-far measurements will be repeated.

Relays ONA and ONB, Fig. 33, released:

(1) Release relays A and B, if operated.

Figure 31:
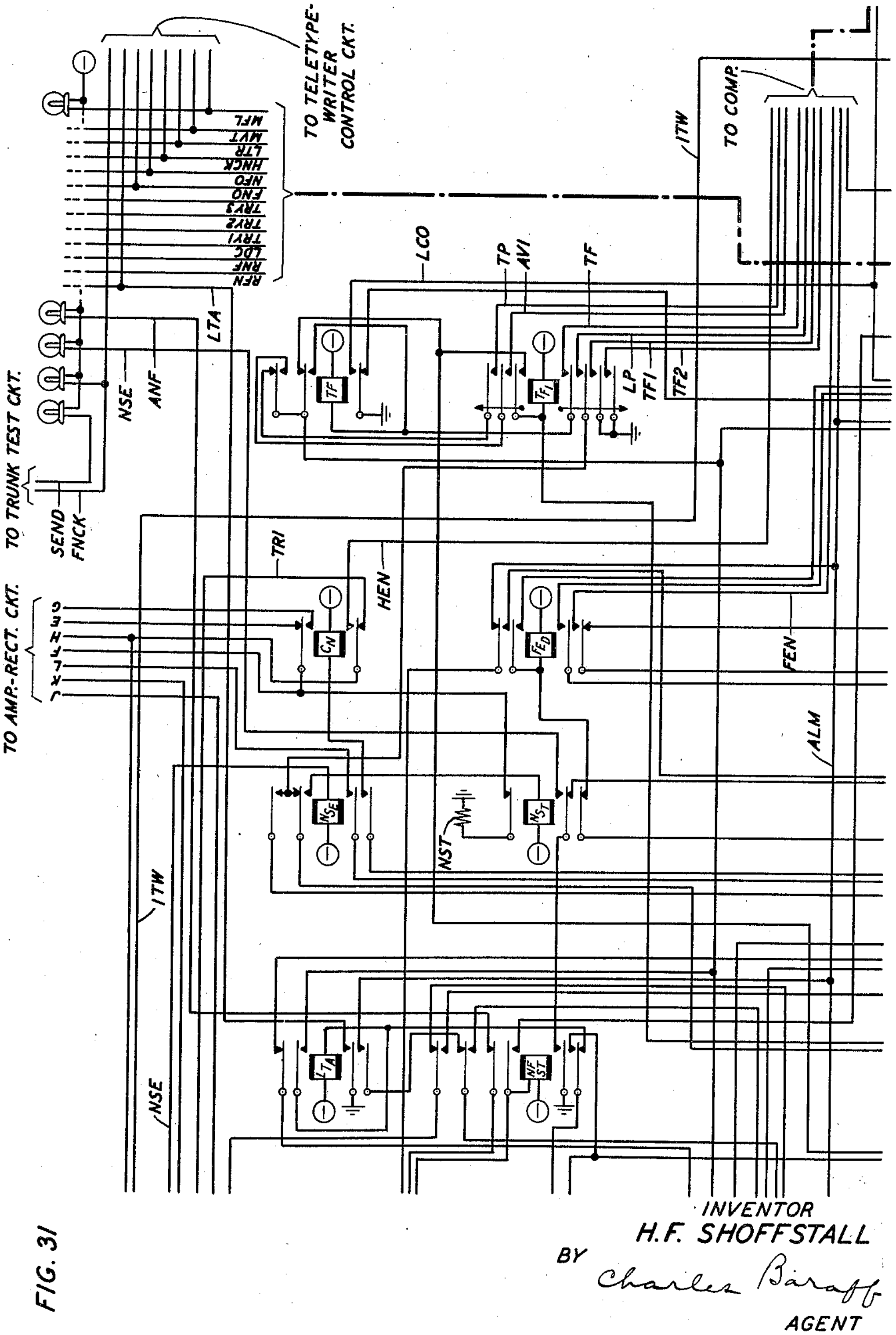

(2) Release relays NFST, Fig. 31, S1, S2, and TKR or LPR, Fig. 32.

(3) Release all the operated pad and supplementary pad relays in Figs. 13 and 16.

(4) Restore the selector switches, Fig. 12, to normal.

Figure 22:
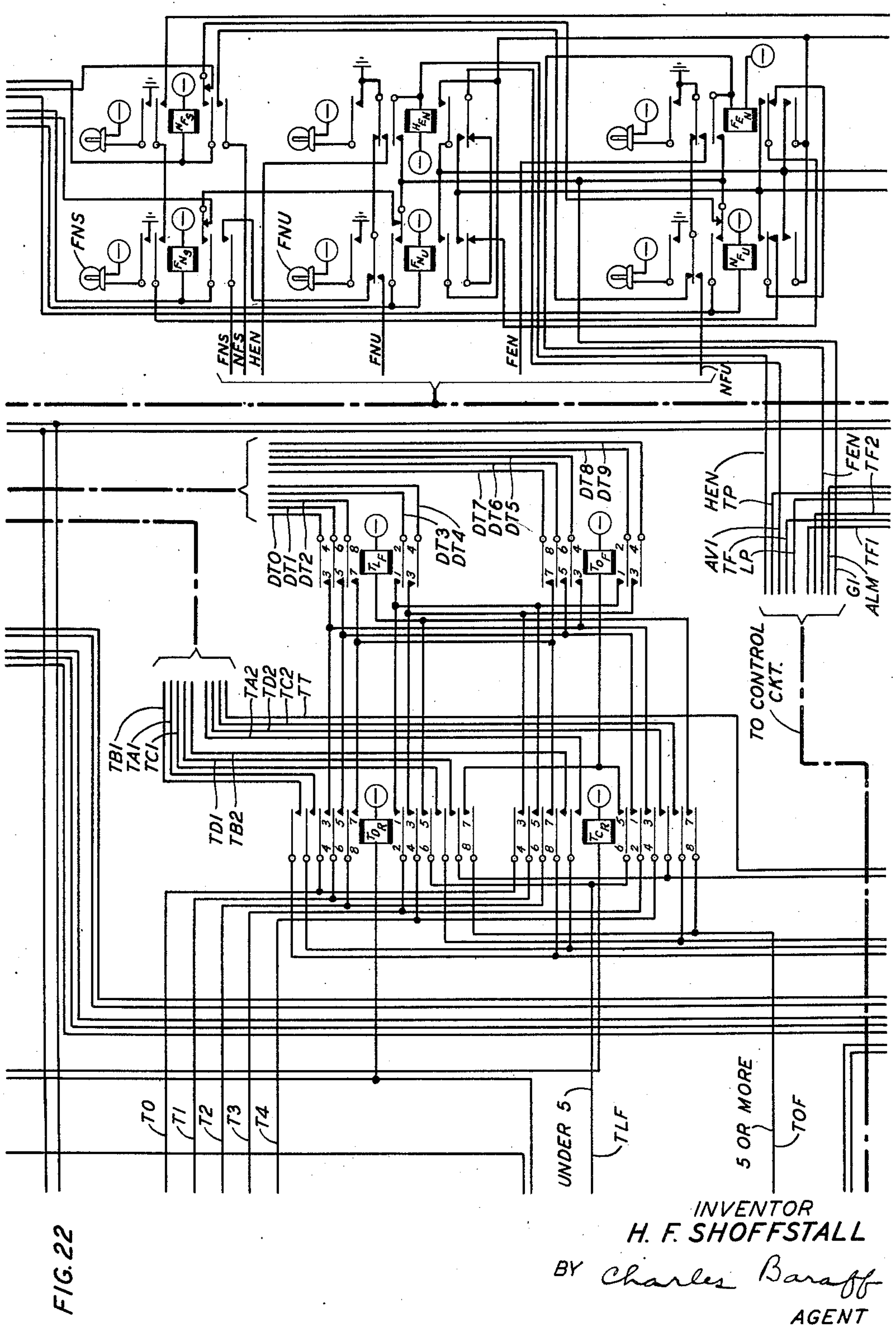

(5) Release the operated FNS or FNU, and NFS or NFU relays, Fig. 22.

(6) Release relays LP, HCK, and LCK, Figs. 9 and 10, if operated. Relay LCK releases relays FNC or NFC.

(7) Release relays RLP and LPC, Fig. 9, if operated.

After about 0.4 second the intertoll trunk test circuit functions to remove the grounds from leads "MV1" and "MV2," which releases relays RR and RR1. Relay RR1, released, releases relays SND and 1MW to terminate the spurt of test power, removes ground from lead "VDW" and opens the operate path of relay TA, leaving TA locked through the back contact of relay P in the amplifier-rectifier to await the arrival of tone for the second trial. Relay RR1, released, also releases relay RA which retires lamp TRY1 and lights lamp TRY2 to indicate that a second trial is in progress and reoperates relays ONA and ONB preparatory to the second trial.

When the intertoll trunk test circuit removes the ground from leads "MV1" and "MV2," it will relax for nine seconds, during which time it is expected that the second far-near measurement will be completed. The circuit now is in the same condition that it was in when the near-far sending was completed, as described in paragraph 8. When the test power arrives, the circuit will function in the same manner as was described for the first trial.

During the second trial a repeat condition may again be encountered, resulting again in the operation of relay TKR or LPR and relay RR. When the test power is removed at the far end, the circuit again functions as described above, resulting in the reoperation of relay RR1. Relay RR1 again causes a spurt of test power to be sent to the far end to request a third trial and releases relays ONA and ONB to restore the pad circuits, check relays, and selector switches to normal. On its second operation relay RR1 operates relay R2, which locks and opens the original operating path of relay R1. The locking ground is fed back through relay RR1 to hold relay R1.

After about 0.4 second the intertoll trunk test circuit functions to remove ground from leads "MV1" and "MV2," releasing relays RR and RR1. Relay RR1, released, terminates the spurt of test power and releases relay R1, which retires lamp TRY2 and lights lamp TRY3, indicating that a third trial is in progress by the home end.

The intertoll trunk test circuit will now relax for nine seconds awaiting the completion of the third far-near measurement. If a repeat condition is encountered on the third trial, relay RR1 will again be operated as before when the test power is removed at the far end. This time relay RR1 operates relay R3, which locks and opens the original operating path of relay R2. The locking ground is fed back through relay RR1 to hold relay R2. However, with relay R1 released, the operate path of relay SND will be opened to prevent a spurt of test power to the far end. The far end will then assume that the third trial was successful and will proceed to complete its noise check and release. Relay RR1 also connects ground through relay R3, operated, to lead "ALM" to the intertoll trunk test circuit to bring in an alarm. The alarm condition causes the intertoll trunk test circuit to function to remove ground from leads "MV1" and "MV2," thereby releasing relays RR and RR1. Relay RR1 in turn releases relay R2. Relay R3, operated, retires lamp TRY3 and lights lamp HNCK to indicate that the home end is unable to make a satisfactory check of its measurements.

If either the second or third trial is successful, relays TKR and LPR and relay RR remain normal. Then, when test power is removed by the far end after the completion of the loop check in the second or third trial, the circuit advances to prepare for a noise check, as explained in paragraph 19.1.

*19. Advance to noise check*

*19.1 Preparation for noise check*

Figure 23:
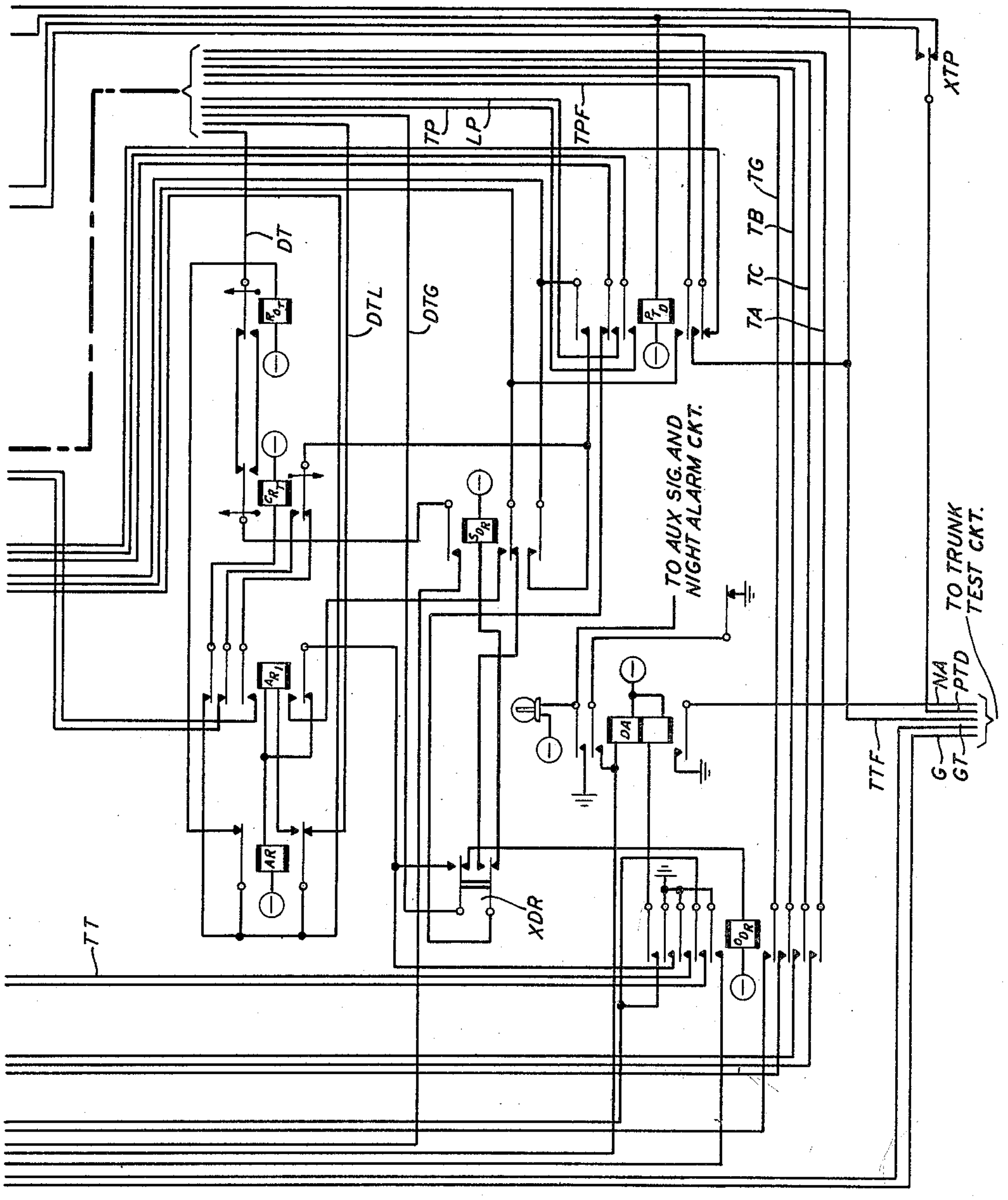

If the control key on the automatic outgoing intertoll trunk test frame is operated to the TRANS & NOISE position, lead "NSE" is grounded and relay NSE, Fig. 31, will be operated. Under this condition a noise check will be made. If the control key on the automatic outgoing intertoll trunk test frame is operated to the TRANS position, relay NSE will be normal and under this condition the noise check will be omitted. The procedure, after the successful completion of the loop check, will depend, therefore, on the position of relay NSE. The procedure will also depend upon the position of relay PTD, Fig. 23. If relay PTD is operated, the teletypewriter will be started at the time preparation is made for the noise check; but if relay PTD is normal, the teletypewriter will not start at this time. Relay PTD will be operated only if the teletypewriter is operating and (1) if key XTP, Fig. 23, is normal, or (2) if an out-of-limits condition during the limits check described in paragraph 20.8 has resulted in the operation of relay FNU or relay NFU, Fig. 22.

When the intertoll trunk test circuit functions to ground leads "MV1" and "MV2" after the removal of tone following successful loop check, the ground on lead "MV1" operates relay ADV. Relay ADV, Fig. 32, operated, releases relay TRS, Fig. 30, and operates relay C, Fig. 33. Relay TRS, released, opens leads "TTR" to restore the timing in the intertoll trunk test circuit.

Relay C operated:

(1) Locks and opens the original operating path of relay B, but the locking ground is fed back through relay ADV, operated, to hold relay B.

(2) Releases relay AC, Fig. 10, which removes the near-far amplifier and near-far pads.

(3) If relay NSE is operated, it grounds lead "L," Fig. 31, to the amplifier-rectifier. This prepares the amplifier-rectifier for the noise check.

(4) Removes ground from lead "VF." This changes the timing in the intertoll trunk test circuit so that it will allow a five-second interval for the noise check.

(5) Operates relay TF1, which locks under control of relay TF.

The ground on lead "MV2" is extended through relays B and NFST, operated, to operated relay RCN, Fig. 32. Relay RCN, operated, releases relays LCK and NFC in turn and relay RLP.

Relay TF1, Fig. 31, operated:

(1) Supplies a holding ground for relay AR, Fig. 23, when it operates.

(2) Operates relays ROT and CRT, Fig. 23. These relays function in connection with the computer circuit, as described later.

Figure 19:
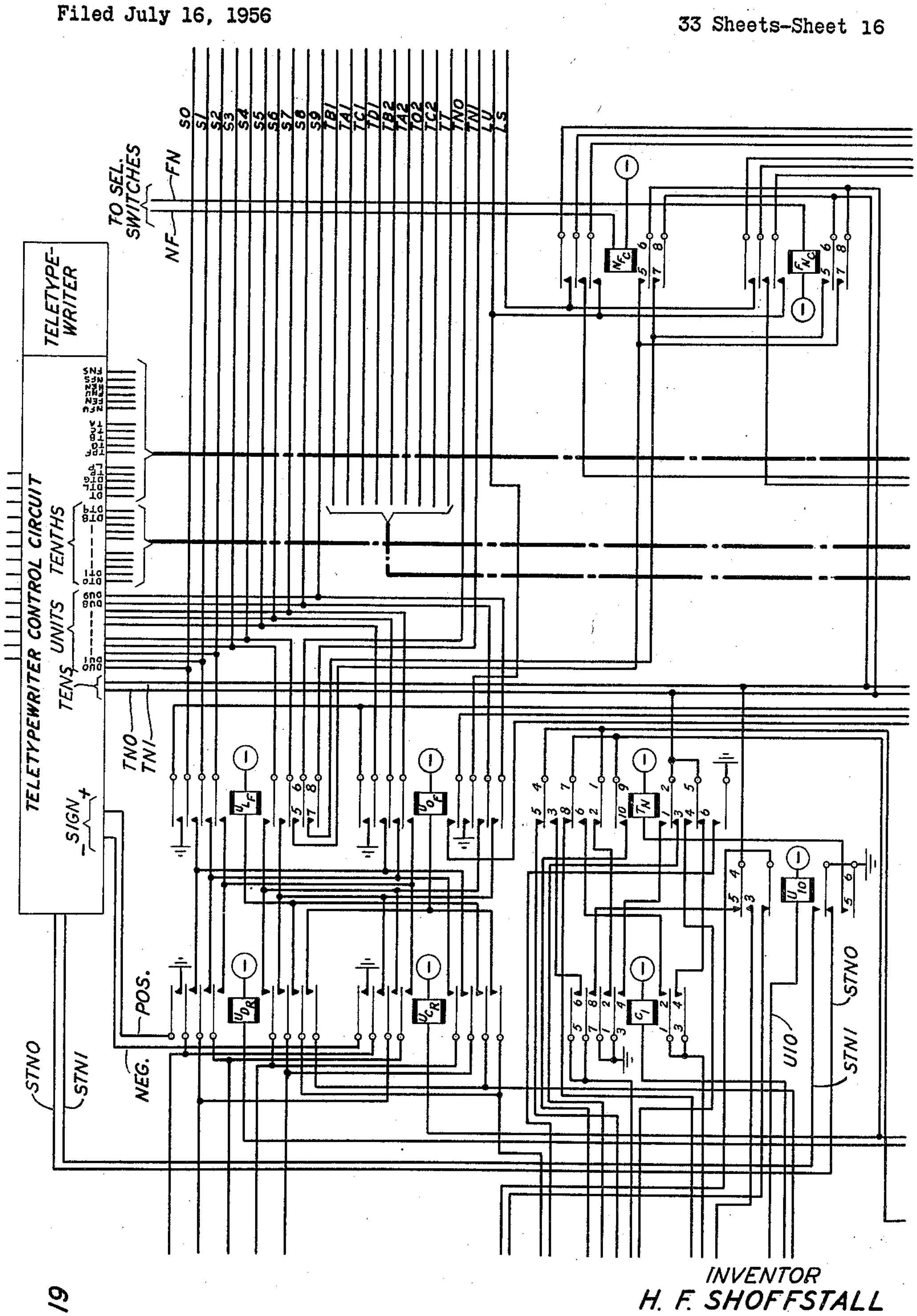

(3) If relay PTD is operated, it grounds lead "TP" to the teletypewriter control circuit, Fig. 19. This starts the teletypewriter.

Figure 17:
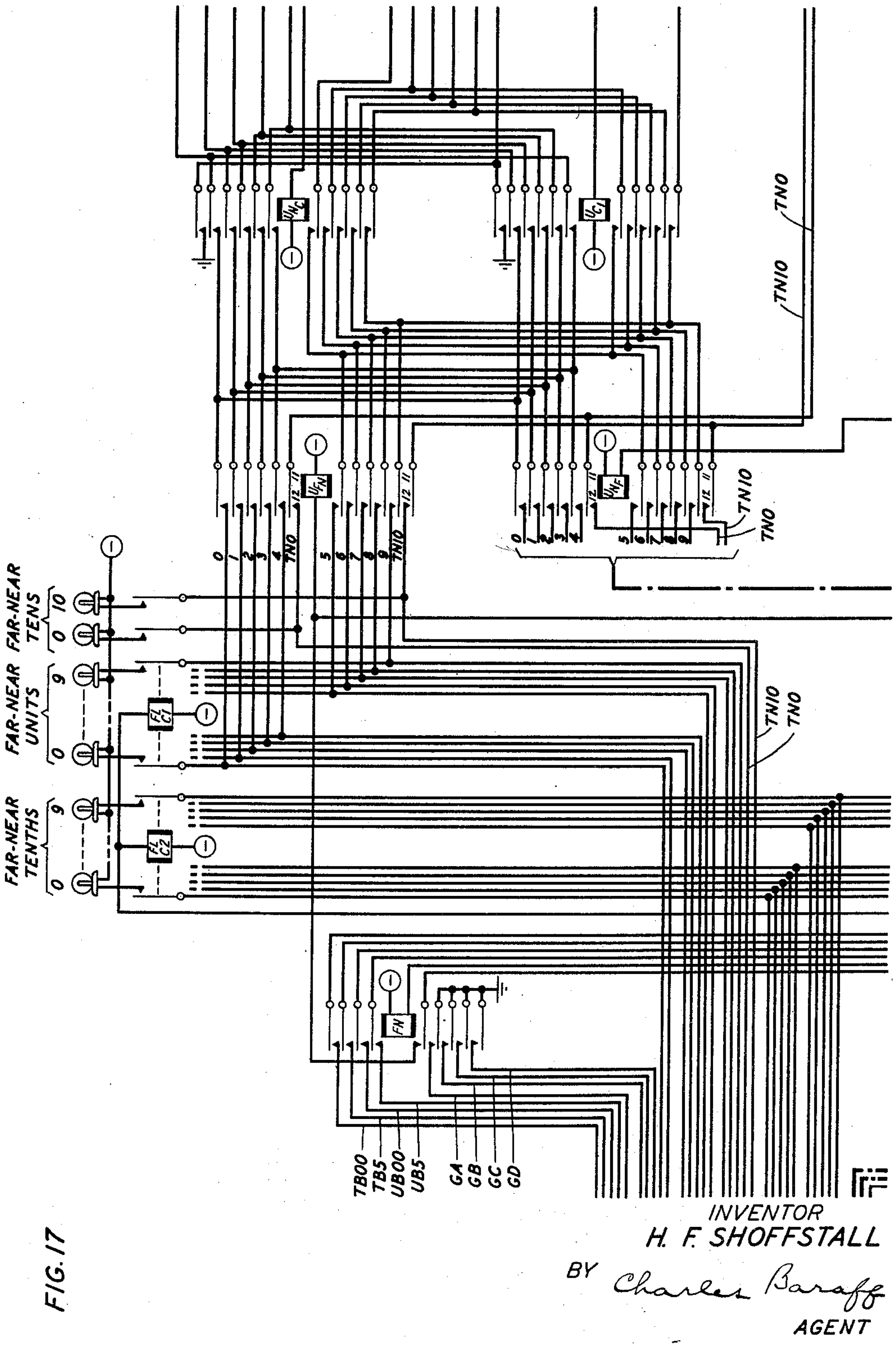
Figs. 17 through 23 show the bi-quinary computer circuit, its input, output and various associated relays.
Figure 18:
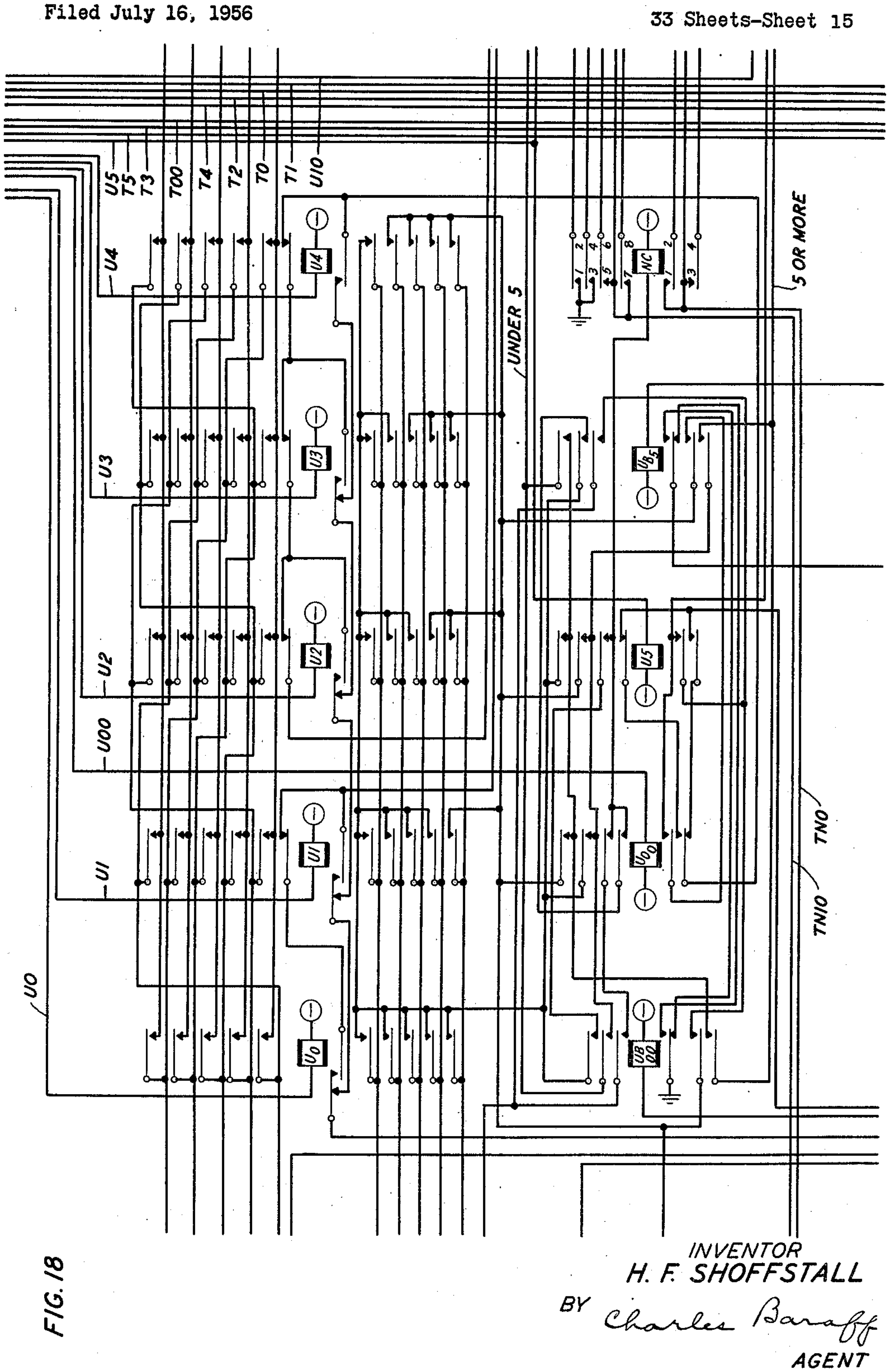

(4) If relay PTD is operated, operates relay FN, Fig. 17, through relays CRT, operated, and AR1, normal. This starts a computation of the far-near deviation. If relay PTD is still normal, the computation does not start at this time. The procedure from this point on depends upon the position of relay NSE.

*19.2 Noise check omitted, relay NSE normal*

After about 1/10 second the intertoll trunk test frame functions to remove ground from leads "MV1" and "MV2," releasing relays ADV and RCN. Relay ADV, in turn, releases relay B.

If relay PTD is operated, the release of relay B extends ground through relays C, operated, NSE, normal, and relays TF1 and PTD, operated, to lead "LP" to the teletypewriter control circuit. This causes the teletypewriter to complete its record without waiting for the completion of a noise check. When the printed record is finished, the teletypewriter control circuit returns a ground over lead "TPF," through relays PTD and TF1, operated, to operate relay TF. Relay TF, operated, causes an advance to the next trunk, as described in paragraph 23. While the teletypewriter is printing the tenths digit of the computed deviation, the deviation registers will be operated as described in paragraph 21.

If relay PTD is normal, the teletypewriter does not start and the release of relay B extends ground through relay C, operated, NSE, normal, TF1, operated, and PTD, normal, over lead "LP" to operate relay SDR through key XDR. Relay SDR extends ground from the contact of relay TF1 through relays CRT, operated, and AR1, normal, to operate relay FN. This cuts on the computer to start a far-near deviation computation. The computer circuit then proceeds to compute and to register on the deviation register the deviation for each direction. When deviation registration is finished, ground is supplied through relay TF1, operated, to operate relay TF. This causes an advance to the next trunk.

If relay PTD is normal and key XDR is operated, the operate ground mentioned above is returned through key XDR, operated, relay SDR, normal, and TF1, operated, to operate relay TF and thus cause an immediate advance to the next trunk.

*19.3 Noise check performed, relay NSE operated*

With relay NSE operated, the operation of relay C, as described above, grounds lead "L" to the amplifier-rectifier panel to increase its gain in preparation for a noise check. Since relay AC is released (paragraph 19.1), the near-far amplifier and near-far pads are cut out and the trunk is connected through the far-near amplifier and ½ decibel check pad (resistances CS, CT, and CU) to the input of the amplifier-rectifier. The loss in the far-near measureing pads is removed, since relay PCO is still operated.

When the intertoll trunk test frame removes ground from leads "MV1" and "MV2," as described in paragraph 19.2, relays RCN and ADV release. ADV, in turn, releases relay B. The intertoll trunk test frame will now relax for five seconds to await completion of the noise check.

Relay B, released, extends ground through relays C and NSE, operated, to operate relay NST. Relay NST retires lamp RNF and lights lamp NSE to indicate that a noise check is in progress and disconnects the 200-ohm shunt resistance NST from lead "F" to the amplifier-rectifier, which permits a condenser in the amplifier-rectifier to begin to charge on amplified noise from the trunk. This charge will continue to accumulate during the five-second interval allotted by the intertoll trunk test frame. In the meantime if relay PTD is operated, ground over lead "TP" to the teletypewriter control circuit will start the teletypewriter and relay FN will be operated to start the far-near deviation computation. After the record of the far-near and near-far deviations has been printed, the teletypewriter control circuit will await completion of the noise check. If relay PTD is normal, the teletypewriter and computer circuit will remain at rest during the noise check.

When the five-second noise check interval has elapsed, the intertoll trunk test frame again grounds leads "MV1" and "MV2." The ground on lead "MV1" operates relay ADV, which, in turn, operates relay D. Relay D locks, prepares an operating path for relay FED and opens the original operate path of relay C; but the locking ground is fed back through relay ADV to hold relay C. Relay D, operated, also replaces ground on lead "VF," which again changes the timing so that the intertoll trunk test circuit will wait about nine seconds for the far end to complete its noise check. The timing at the far end is such that the home end will complete its noise check first and will be waiting for the disconnect signal before the far end completes its noise check. Ground on lead "MV2" operates relay CN. Relay CN loops leads "F" and "G" from the amplifier-rectifier, which presents the charged "noise" condenser in the amplifier-rectifier to the input of the detector tube. If the voltage on the noise condenser in the amplifier-rectifier is high enough, relay P, in the amplifier-rectifier, will operate; otherwise it will remain normal. If the relay operates, ground is returned from the amplifier-rectifier over lead "H" through relay CN, Fig. 31, operated, to operate relay HEN, Fig. 22. Relay HEN locks, lights lamp HEN to indicate that the home end is noisy, and prepares for printing a noise cue if the teletypewriter is in operation, or for bringing in an alarm if the teletypewriter is not in operation. If the teletypewriter is in operation but relay PTD is still normal, relay HEN operates relay PTD and the teletypewriter and deviation computer then start; but if relays HEN and PTD remain normal, these circuits do not start at this time.

After about one-tenth second the intertoll trunk test circuit functions to remove ground from leads "MV1" and "MV2." The intertoll trunk test circuit will then relax for nine seconds awaiting the completion of the noise check at the far end. Removal of ground from lead "MV2" releases relay CN to complete the noise check, and removal of ground from lead "MV1" releases relays ADV and C in turn.

Relay C released:

(1) Removes ground from lead "L" to the amplifier-rectifier to restore that circuit to normal.

(2) Releases relay NST. This retires lamp NSE and lights lamp LDC, indicating that this circuit is awaiting a disconnect signal from the far end.

(3) Connects ground to lead "VDW" to the intertoll trunk test frame. This arranges the intertoll trunk test circuit so that the next time it connects ground to leads "MV1" and "MV2" it will keep them grounded for about 0.4 second.

The intertoll trunk test circuit will wait nine seconds for the far end to return an on-hook signal, indicating completion of the noise check at the far end. Should the on-hook signal fail to arrive, the intertoll trunk test circuit will, at the end of the nine-second interval, again ground leads "MV1" and "MV2." Ground on lead "MV2" serves no useful purpose at this time, but ground on lead "MV1" operates relay ADV. Relay ADV extends ground through relay D, operated, and relays ADJ, Fig. 30, and FED, Fig. 31, normal, to lead "ALM" to the intertoll trunk test circuit to bring in an alarm, and lamp LDC will remain lighted indicating a "late disconnect" at the far end. The alarm condition causes the intertoll trunk test circuit to immediately remove ground from leads "MV1" and "MV2."

When the far end completes its noise check and disconnects within the allotted time, it will return either (1) a steady on-hook signal if the far end is not noisy, or (2) a steady 120 IPM flash if the far end is noisy. When the first on-hook signal arrives, the intertoll trunk test circuit functions to ground lead "AD10," operating relay S, Fig. 30. Relay S operates relay FED through relays NFST and D, operated.

Relay FED operated:

(1) Locks to relay ON.

(2) Prepares an operating path of relay E.

(3) Extends lead "FEN" from Fig. 31 through relay D, operated, to a back contact of relay S.

(4) Connects ground from a back contact of relay E, through relays D, operated, and ADV, normal, to lead "TTR" to the intertoll trunk test circuit.

The ground on lead "TTR" causes the intertoll trunk test circuit to stop its nine-second timing interval and to function to connect ground to leads "MV1" and "MV2." Since lead "VDW" is grounded, the intertoll trunk test circuit will hold the ground on leads "MV1" and "MV2" about 0.4 second. The ground on lead "MV2" serves no useful purpose at this time, but ground on lead "MV1" operates relay ADV. Relay ADV operates relay E. Relay E locks and opens the original operating path of relay D, but the locking ground is fed back through relay ADV, operated, to hold relay D. After about 0.4 second, the intertoll trunk test circuit functions to remove ground from leads "MV1" and "MV2," which releases relays ADV and D, in turn.

If the far end is returning a 120 IPM flash (far end noisy), the first off-hook period of the flash will arrive before the intertoll trunk test circuit functions to release relays ADV and D, as described above. The off-hook signal causes the intertoll trunk test circuit to function to remove ground from lead "AD10," releasing relay S. Relay S, released, connects ground through relays D and FED operated, to lead "FEN" for operating relay FEN, Fig. 22. Relay FEN (1) locks, (2) lights lamp FEN to indicate a far end noise condition, and (3) prepares a circuit for typing a far end noisy cue if the teletypewriter is in operation or for bringing in an alarm if the teletypewriter is not in operation.

If the teletypewriter is in operation but relay PTD is still normal (conditions for this would be (1) key XTP operated, (2) both limit checks satisfactory, and (3) home end not noisy), the operation of relay FEN will operate relay PTD and thus start the teletypewriter and deviation computer, as described above.

If the far end returns a steady on-hook signal on disconnect (far end not noisy), relay S remains steadily operated and relay FEN, Fig. 22, remains normal. When relays ADV and D release, as described above, relay D:

(1) Retires lamp LDC.

(2) Opens the operate path of relay FEN to prevent its operation when relay S finally releases.

(3) Connects ground through relays E, NSE, and TF1, operated to the contacts of relay PTD.

If a record is to be printed of this test, relay PTD will have been operated prior to this time and the above ground will be extended through relay PTD, operated, to the teletypewriter control circuit over lead "LP." The ground on lead "LP" causes the teletypewriter to print cue letter indications of the results of the limits checks and noise checks in each direction as soon as the deviations are printed, or immediately if the teletypewriter control circuit is already waiting for the completion of the far end noise check. When the teletypewriter is finished, ground is returned over lead "TPF" through relays PTD and TF1, operated, and lead "TF" to operate relay TF. Relay TF, operated, causes an advance to the next trunk, as described in paragraph 23.

If no record is to be printed of this test, relay PTD will still be normal after the completion of the noise check at the far end, and the ground in item (3) above will be extended through relay PTD, normal, and key XDR, normal, to operate relay SDR, Fig. 23. Relay SDR functions as described in paragraph 19.2 to start computation and registration of the deviations in each direction. When deviation registration is finished, ground supplied through relays SDR and TF1, Fig. 31, operated, operates relay TF to start an advance to the next trunk. Should key XDR be operated, the ground mentioned will be routed through key XDR, relay SDR, normal, and relay TF1, operated, to operate relay TF. This causes an immediate advance to the next trunk without either a printed record or deviation registration.

*Class relays—Figs. 26–29.*—Class relays, Figs. 26–29, are used to indicate the specified transmission loss of the trunk under test and to indicate to the automatic intertoll trunk test circuit the type of outpulsing which the trunk requires. Each class relay has two windings which are cabled to the intertoll trunk test circuit. On the test connector frame there is a crosspoint for each trunk and each crosspoint includes a class contact, indicated schematically in Fig. 8. At the test connector frame the class contact of each crosspoint is cross-connected to the class relay corresponding to the specified transmission loss of the trunk associated with that crosspoint. For MF pulsing trunks the primary winding is used; and when the class relay operates, the class ground is extended over lead "E" to the intertoll trunk test frame to cause that frame to set up for MF pulsing. For dial trunks the secondary winding of the class relay is used; and when the class relay operates, the class ground is extended to the intertoll trunk test frame over lead "D" to cause that frame to set up for D. C. key pulsing to outgoing senders in No. 4 or No. 4M toll offices or for simplex dialing to the outgoing trunk in No. A4A and No. 4A offices.

When a class relay operates, it lights a class indicating lamp showing the specified loss of the trunk under test and also operates relays to set up in the computer circuit a three digit number representing the specified loss of the trunk. Operation of the computer circuit is described in paragraph 20.

The leads from the class relays are also multipled to the teletypewriter control circuit, which provides information to the teletypewriter for printing the specified net loss.

*20. Deviation computer and limits checking circuit, Figs. 17–23*

*20.1 General*

The computer circuit is used to compute the amount by which the measured loss, in each direction of transmission, deviates from its specified value, as indicated by the class relays. These deviations, together with the proper sign, can then be printed on the teletypewriter test record for use in statistical analyses of transmission loss variations. The computer consists of:

(1) A set of biquinary relays for the tenths and units digits and a tens relay to set up a three digit number corresponding to the specified net loss of the trunk under test. These relays operate from contacts on the operated class relays and remain operated for the duration of the test.

(2) Start and cut-on relays for each direction of transmission. These relays operate during a computation to close through a number of leads from the supplementary pad relays to indicate to the computer circuit the measured net loss.

(3) Read-out and output cut-through relays for determining the proper sign, plus (+) or minus (−), and to close through the leads for presenting the answer to the teletypewriter, the deviation totalizing registers, or the limits checking relays.

*20.2 Method of computation*

Basically the computer circuit performs a substraction in which the measured loss is the minuend, the specified net loss is the subtrahend, and the deviation is the remainder. Actually, an addition is done in which the measured loss (minuend) is added to the nines complement of the specified loss (the subtrahend). The nines complement of the specified net loss is the three digit number which must be added to the specified loss to obtain 999. Thus, if the specified loss is 7.2 decibels, the corresponding three digit number is 072 and its nines complement is 927.

The sum resulting from this addition fixes the proper sign, plus or minus. If the sum results in a "carry one" in the tens column, the sign is plus (measured loss too high); and the deviation will be equal to the sum plus one-tenth (one in the first column). If the sum does not result in a "carry one" in the tens column, the sign is minus (measured loss too low), and the deviation will equal the nines complement of the sum. Two examples are tabulated below:

Example A:

| | |
|---|---|
| Specified loss____db__ | 7.2 |
| Nines complement____ | 927 |
| Measured loss____db__ | 081 |
| Sum ____ | 1008 |
| Because of "carry one" in tens column, add one____ | 1 |
| Final sum____ | 1009 |
| Deviation is final sum disregarding the one carried to fourth column and is db__ | 0.9 |
| Because of "carry one" in tens column, sign is____ | plus (+) |

Example B:

| | |
|---|---|
| Specified loss____db__ | 7.2 |
| Nines complement____ | 927 |
| Measured loss ____ | 063 |
| Sum ____ | 990 |
| Because of "no carry" in tens column, deviation is nines complement of sum and is 999–990, or____db__ | 0.9 |
| Because of "no carry" in tens column, sign is____ | minus (−) |

*20.3 Set-up of specified loss*

A biquinary scheme is used for setting up the specified loss in the computer. The tenths digit, for example, requires one group of five quinary relays T0, T1, T2, T3, and T4, Fig. 21, only one of which will be operated at a time, and one group of two binary relays, T00 and T5, only one of which will be operated. T00, operated, means "add zero" to the quinary digit to obtain the decimal digit; and T5 operated, means "add five" to obtain the decimal digit. Thus, if the tenths digit is "2," relays T2 and T00 operate, while if the tenth digit is "7," relays T2 and T5 operate. The units digit is handled in the same way by quinary relays U0, U1, U2, U3, U4, Fig. 18, and binary relays U00 and U5. Since the tens digit will always be "0" or "1," only one tens relay, U10, and its supplementary relay TN, Fig. 19, are required which operate when the specified loss is 10 decibels or more. As indicated above, these relays operate from contacts on the class relays so as to set up in the computer circuit a three digit number which is the nines complement of the specified net loss. The available class relays and the corresponding relays which they operate in the computer circuit are listed in Table I.

TABLE I

| Spec. Net Loss (Class) | Nines Complement | Computer Relays Operated | | |
|---|---|---|---|---|
| | | Tens | Units | Tenths |
| 3.9 | 960 | ------ | U5, U1 | T00, T0 |
| 4.2 | 957 | ------ | U5, U0 | T5, T2 |
| 4.5 | 954 | ------ | U5, U0 | T00, T4 |
| 4.8 | 951 | ------ | U5, U0 | T00, T1 |
| 5.1 | 948 | ------ | U00, U4 | T5, T3 |
| 5.4 | 945 | ------ | U00, U4 | T5, T0 |
| 5.7 | 942 | ------ | U00, U4 | T00, T2 |
| 6.0 | 939 | ------ | U00, U3 | T5, T4 |
| 6.3 | 936 | ------ | U00, U3 | T5, T1 |
| 6.6 | 933 | ------ | U00, U3 | T00, T3 |
| 6.9 | 930 | ------ | U00, U3 | T00, T0 |
| 7.2 | 927 | ------ | U00, U2 | T5, T2 |
| 7.5 | 924 | ------ | U00, U2 | T00, T4 |
| 7.8 | 921 | ------ | U00, U2 | T00, T1 |
| 8.1 | 918 | ------ | U00, U1 | T5, T3 |
| 8.4 | 915 | ------ | U00, U1 | T5, T0 |
| 8.7 | 912 | ------ | U00, U1 | T00, T2 |
| 9.0 | 909 | ------ | U00, U0 | T5, T4 |
| 9.3 | 906 | ------ | U00, U0 | T5, T1 |
| 9.6 | 903 | ------ | U00, U0 | T00, T3 |
| 9.9 | 900 | ------ | U00, U0 | T00, T0 |
| 10.2 | 897 | U10, TN* | *U5, U4 | T5, T2 |
| 10.5 | 894 | U10, TN* | *U5, U4 | T00, T4 |
| 10.8 | 891 | U10, TN* | *U5, U4 | T00, T1 |
| 11.1 | 888 | U10, TN* | *U5, U3 | T5, T3 |
| 11.4 | 885 | U10, TN* | *U5, U3 | T5, T0 |
| 11.7 | 882 | U10, TN* | *U5, U3 | T00, T2 |
| 12.0 | 879 | U10, TN* | *U5, U2 | T5, T4 |

The start ground to the intertoll trunk test frame for starting the test is wired through the groups of relays T0—T4, T00 and T5, U0—U4 and U00 and U5 to provide a "one-only" check. Should a relay in any group fail to operate or should two operate in any one group, this ground will fail and will cause the test frame to time-out and bring in an alarm.

The leads from the class relays for operating the relays in the computer circuit are multipled to the teletypewriter control circuit. This provides information to the teletypewriter for printing the specified net loss.

*20.4 Presenting the value of measured loss*

After the far-near and near-far measurements are completed, a certain combination of the supplementary pad relays in Figs. 13 and 16 will remain operated, as explained in paragraph 11. If the measured loss is less than 10 decibels, relay 10B in Fig. 15 will be operated and lead "TN0" will be grounded, indicating a tens digit "0". If the loss is 10 decibels or more, relay 10B will be normal and lead "TN10" grounded to indicate a tens digit "1". Lead "TN10" from the near-far supplementary pad relays is also grounded when relay AD10 is operated (see paragraph 15) so as to add 10 decibels to the near-far measurement.

Contacts on supplementary pad relays 5TB, 4TB, 2TB, and 1TB (Fig. 16) supply grounds on leads "0T" to "9T" and on leads "TB00" and "TB5" to indicate the tenths digit of the measured loss as follows:

| Measured Loss Tenths Digit | Supplementary Pad Relays Operated | Leads to Computer Grounded |
|---|---|---|
| 0 | 5TB, 4TB | 0T, 5T, TB00 |
| 1 | 5TB, 2TB, 1TB | 1T, 6T, TB00 |
| 2 | 5TB, 2TB | 2T, 7T, TB00 |
| 3 | 5TB, 1TB | 3T, 8T, TB00 |
| 4 | 5TB | 4T, 9T, TB00 |
| 5 | 4TB | 0T, 5T, TB5 |
| 6 | 2TB, 1TB | 1T, 6T, TB5 |
| 7 | 2TB | 2T, 7T, TB5 |
| 8 | 1TB | 3T, 8T, TB5 |
| 9 | None | 4T, 9T, TB5 |

It will be noted that the measured loss is presented to the computer in a biquinary pattern. When the tenths digit of the measured loss is 0, 1, 2, 3, or 4, the corresponding leads "0T," "1T," "2T," "3T," or "4T," respectively, are grounded and lead "TB00" is also grounded. This operates relay "TB00" (Fig. 21) which means add zero. When the tenths digit is 5, 6, 7, 8, or 9, leads "0T," "1T," "2T," "3T," or "4T," respectively, are grounded, and lead "TB5" is also grounded so that relay TB5 (Fig. 21) operates. Relay TB5, operated, means add five.

Supplementary pad relays 5B, 4B, 2B, and 1B (Fig. 15) supply grounds over leads "0" to "9" and leads "UB00" or "UB5" in the same pattern to indicate the units digit of the measured loss.

*20.5 Start of computation*

When a computation is to be made, the start relay is operated. Relay FN (Fig. 17) is operated to start a computation of the far-near deviation. Relay NF (Fig. 20) is operated to start a computation of the near-far deviation.

Relay FN, operated, grounds leads "GA," "GB," "GC," and "GD" of Figs. 15, 16 and closes through leads "TB00," "TB5," "UB00," and "UB5," respectively. One only of the leads "TB00" or "TB5" will be grounded, depending upon whether the tenths digit of the measured loss in the near-far direction is 0 to 4 or 5 to 9 and causes the operation of relay TB00 or TB5, but not both. Similarly, the ground on leads "UB00" or "UB5" operates relay UB00 or UB5, but not both. When one TB— and one UB— relay is operated, ground is supplied through relay FN to operate the cut-on relays TFN (Fig. 20) and UFN (Fig. 17). These relays cut through the ten leads "0T" to "9T," the ten leads "0" to "9," and leads "TN0" and "TN10" from Figs. 15, 16 to start the computation.

Start relay NF operates similarly except that it grounds leads "GA," "GB," "GC," and "GD" to near-far measuring pad II (Fig. 13) and closes through leads "TB00," "TB5," "UB00," and "UB5" from pad II for the operation of the TB— and UB— relays of the computer. The TB— and UB— relays then operate cut-on relays TNF (Fig. 20) and UNF (Fig. 17) to start the near-far computation. Relay NF, operated, opens the operating path of relays FLC1, FLC2 (Fig. 17), NLC1, and NLC2 (Fig. 20) to prevent connection of the loss display lamps until the near-far computation is finished. Relay TFN or TNF, operated, operates relay TNC through a normal contact of relay DR. This starts the process of adding.

*20.6 Process of addition*

Figure 34:
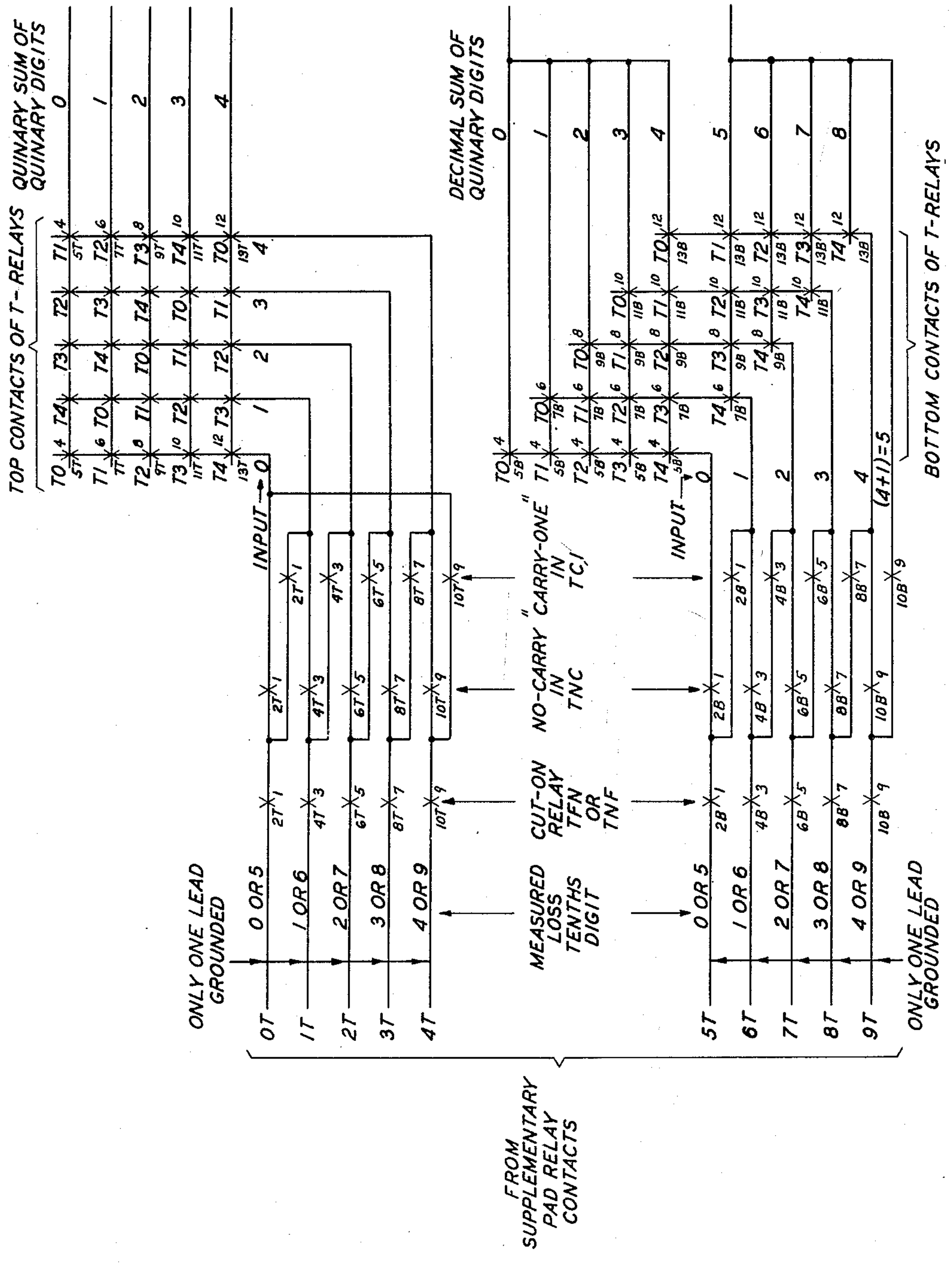
Figs. 34 through 36 are explanatory schematics for the computer circuit, showing the relay contacts and connections for the adder thereof.
Figures 35, 37:
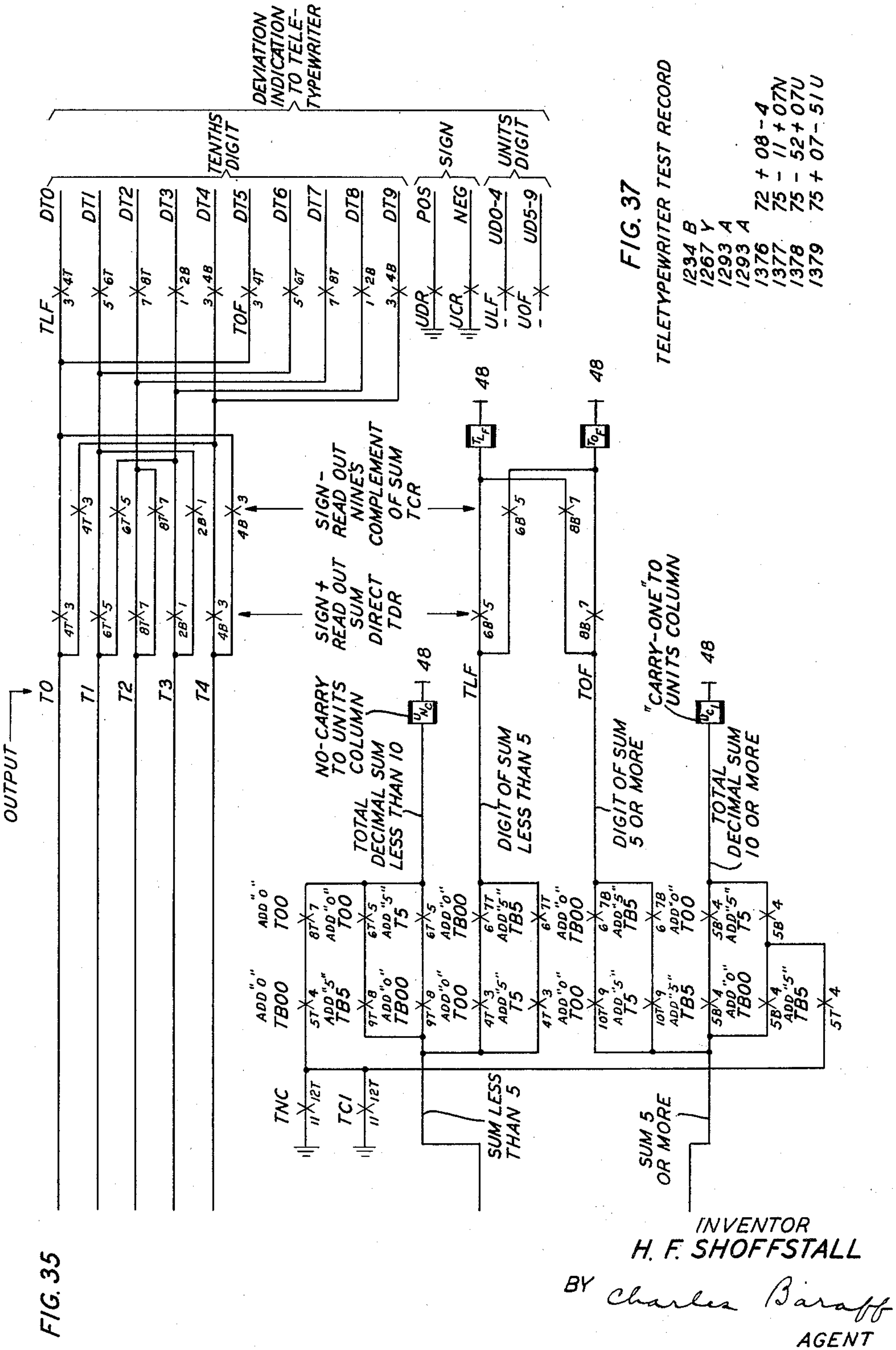
Fig. 37 illustrates a typical teletypewriter record of a trunk test.

The process of addition may be understood by reference to the attached Figs. 34–35 showing a functional schematic for the tenths digit. The operated T— relay indicates for the tenths digit the quinary portion of the nines complement of the specified loss. The ground on one of the leads "OT" to "4T" and "5T" to "9T" indicates the quinary portion of measured loss.

When relay TNC operates, it extends the ground on one of the leads "0T" to "4T" through the top contacts of the T— relays, one of which is operated, to one of the output leads "DT0" or "DT4" which represents the quinary sum. Thus, lead "2T," grounded, and relay T2, operated, grounds output lead "DT4." Lead "2T," grounded, and relay T3, operated, grounds output lead "DT0" (0 quinary + 5 binary equals 5). Only one output lead will be grounded, and this is used later for reading out the answer on a decimal basis.

Relay TNC, operated, also extends the ground on one of the leads "5T" to "9T," through the bottom contacts of the T— relays, to one of a set of leads which represents the decimal sum of the two quinary digits. Thus, if lead "7T" (equivalent to "2T") is grounded and relay T2 is operated, the sum is "4," while if relay T3 is operated, the sum is "5." All bottom contacts of the T— relays which close through leads representing decimal sums of 0, 1, 2, 3, or 4 are multipled together to indicate a sum less than five. All bottom contacts of the T— relays which close through leads representing decimal sums of 5, 6, 7, or 8 are multipled together to indicate a sum five or more. The ground on one or the other of these multiples is used to determine:

(1) Whether the total decimal sum of the digits being added is less than ten or ten or more. If ten or more, one must be carried to the units column; and (2) Whether the digit of the total sum is less than five or five or more. This is used later for reading out the answer on a decimal basis. Either relay T00 or T5, but not both, will be operated; and relay TB00 or TB5, but not both, will be operated. It should be remembered that:

(1) Relay T00 operated means add zero to specified loss quinary digit; and relay T5, operated, means add five to the specified loss quinary digit.

(2) Relay TB00, operated, means add zero to the measured loss quinary digit; and relay TB5, operated, means add five to the measured loss quinary digit.

The ground appearing at one of the above multiple points, sum less than five or sum five or more, is extended through the contacts of the TB00 or TB5 and the T00 or T5 relays so as to add either 0, 5, or 10, as listed in Table II.

TABLE II

| Decimal Sum of Quinary Digits | TB-Relay Operated | Binary Relay Operated | Total Added | Total Decimal Sum | Carry to Units | Carry Relay Oper. | Digit of Total Sum | Output Lead Grounded |
|---|---|---|---|---|---|---|---|---|
| Less than 5 | TB00 | T00 | 0 | 0 to 4 | None | UNC | 0 to 4 | TLF |
| Do | TB00 | T5 | 5 | 5 to 9 | None | UNC | 5 to 9 | TOF |
| Do | TB5 | T00 | 5 | 5 to 9 | None | UNC | 5 to 9 | TOF |
| Do | TB5 | T5 | 10 | 10 to 14 | One | UC1 | 0 to 4 | TLF |
| 5 or more | TB00 | T00 | 0 | 5 to 9 | None | UNC | 5 to 9 | TOF |
| Do | TB00 | T5 | 5 | 10 to 14 | One | UC1 | 0 to 4 | TLF |
| Do | TB5 | T00 | 5 | 10 to 14 | One | UC1 | 0 to 4 | TLF |
| Do | TB5 | T5 | 10 | 15 to 19 | One | UC1 | 5 to 9 | TOF |

Accordingly, when relay TNC operates, the ground on one of the leads "5T" to "9T" through the operated T-relay on the ground from the local contact on TNC finds a path through relays TB00 or TB5 and T00 or T5 to operate relay UNC for the conditions listed in Table II as "No carry" or for operating relay UC1 for the conditions listed as "Carry one." Similarly, this same ground will be connected to lead TLF (tenths less than five) for each of the conditions listed with the digit of the sum less than five, or to lead TOF (tenths five or more) for conditions with the digit of the sum five or more.

Figure 20:
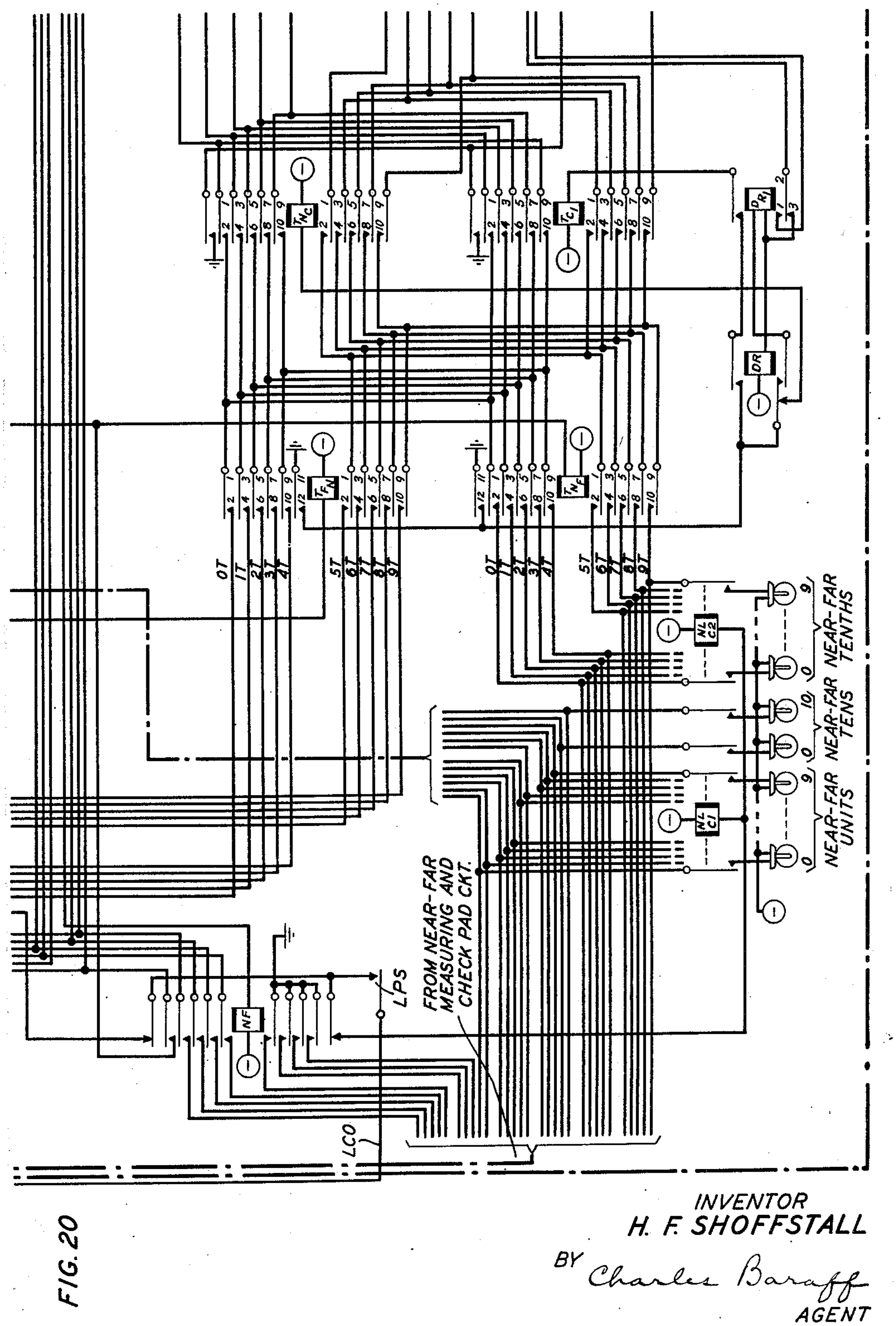

It will be noted in Fig. 20 that if relay TC1 had been operated instead of relay TNC, leads "0T" to "4T" and "5T" to "9T" would have been extended to the next higher numbered output lead from the T— relays. This is the means used to add one when it is necessary to "carry one in" from the preceding column.

When relays UNC or UC1 operate, leads "0" to "4" and "5" to "9" are cut through for adding the units digit in the same manner as the tenths digit. As a result, relay C1 will operate if there is a "carry one" into the tens column from the units column, or relay NC will operate if there is "no carry." Either of these relays closes through leads "TN0" and "TN10" from the pad supplementary relays for addition of the tens digit.

For the tens digit, the following conditions obtain:

(1) If the measured loss is less than 10 decibels, lead "TN0" from Fig. 17 is grounded; if the measured loss is 10 decibels or more, lead "TN10" from Fig. 17 is grounded.

(2) If the specified loss is less than 10 decibels, relays U10 and TN will be normal, and the nines complement of the tens digit is nine. If the specified loss is 10 decibels or more, relays U10 and TN wil be operated and the nines complement of the tens digit is eight.

(3) There may be "no carry in" from the units column, in which case relay NC is operated; or there may be a "carry one" from the units column, in which case relay C1 is operated.

The sum of the above tens digits, makes up the total sum for the tens column. To determine this sum, leads "TN0" and "TN10" from Fig. 17 are connected through the operated NC or C1 relay and contacts of relays TN and U10 (Fig. 19) so as to indicate whether the sum is ten or more, which fixes the sign, and whether the sum is "10" or "11," which fixes the digit as "0" or "1." This is shown in the attached Fig. 36, and the various combinations are listed in Table III.

TABLE III

| Specified Loss | Complement | Measured Loss | Carry In | Sum | Sign | Deviation | Tens Digit |
|---|---|---|---|---|---|---|---|
| 0 | 9 | 0 | NC | 9 | – | Comp. of Sum | 0 |
| 0 | 9 | 0 | C1 | 10 | + | Sum Direct | 0 |
| 0 | 9 | 1 | NC | 10 | + | Sum Direct | 0 |
| 0 | 9 | 1 | C1 | 11 | + | Sum Direct | 1 |
| 1 | 8 | 0 | NC | 8 | – | Comp. of Sum | 1 |
| 1 | 8 | 0 | C1 | 9 | – | Comp. of Sum | 0 |
| 1 | 8 | 1 | NC | 9 | – | Comp. of Sum | 0 |
| 1 | 8 | 1 | C1 | 10 | + | Sum Direct | 0 |

As mentioned previously, if the sum in the tens column is 10 or more (carry one to hundreds), the sign is plus and one must be added in the tenths column. It will be noted in the attached Fig. 36 that for each of the cases listed in Table III where the sum is "10" or "11," ground from lead "TN10" or from a local contact on relay C1 is extended through a back contact of relay DR1 to operate relay DR. Delay DR locks under control of relay TFN or TNF, but relay DR1 does not operate, as its winding is short-circuited by the operate ground. Relay DR, operated, releases relay TNC.

When relay TNC releases, it opens the ground being supplied over one of the leads "5T" to "9T" which releases relay UNC or UC1, whichever one is operated. The release of relay UNC or UC1, in turn, opens the ground being supplied over one of the leads "5" to "9" of the units digit and thus releases relay NC or C1, whichever one is operated. The release of relay NC or C1, in turn, opens the original operating path of relay DR. This removes the short circuit from the winding of relay DR1, which now operates in series with relay DR, which holds. With DR and DR1 both operated, relay TC1 operates and recloses leads "0T" to "4T" and "5T" to "9T" but closes them through to the next higher numbered output lead from the operated T— relay so as to add one (see Fig. 34). This reoperates relay UNC or UC1 to close through leads "0" to "4" and "5" to "9," which reoperates relay NC or C1. Relay DR1 being operated, the operation of relay NC or C1 now operates relays UDR and TDR in parallel. Relays UDR and TDR provide for reading out the total three-digit sum direct as the deviation and provide a signal to the teletypewriter that the sign is positive (+).

It will also be noted in Figs. 34, 35 that for each of the cases listed in Table III where the sum is "8" or "9," ground from lead "TN0" or from a local contact on relay NC is connected through contacts of relay TN to operate relays UCR and TCR in parallel. Relays UCR and TCR provide for reading out the nines complement of the three-digit sum as the deviation and provide a signal to the teletypewriter that the sign is negative (−). The operation of relays UDR and TDR when the sign is positive, or of relays UCR and TCR when the sign is negative, completes the computation and the answer can now be presented to the teletypewriter, the deviation totalizing registers, or limits checking relays.

*20.7 Reading out the answer*

Referring to the attached Fig. 35, when the computation is completed, ground will be standing on one only of the output leads from the T— relays, "T0" to "T4," which represent the quinary sum for the tenths digit. Also, ground will be standing on one of the output leads "TLF" or "TOF" in Fig. 35. Ground will also be connected to similar leads for the units digit.

Figure 36:
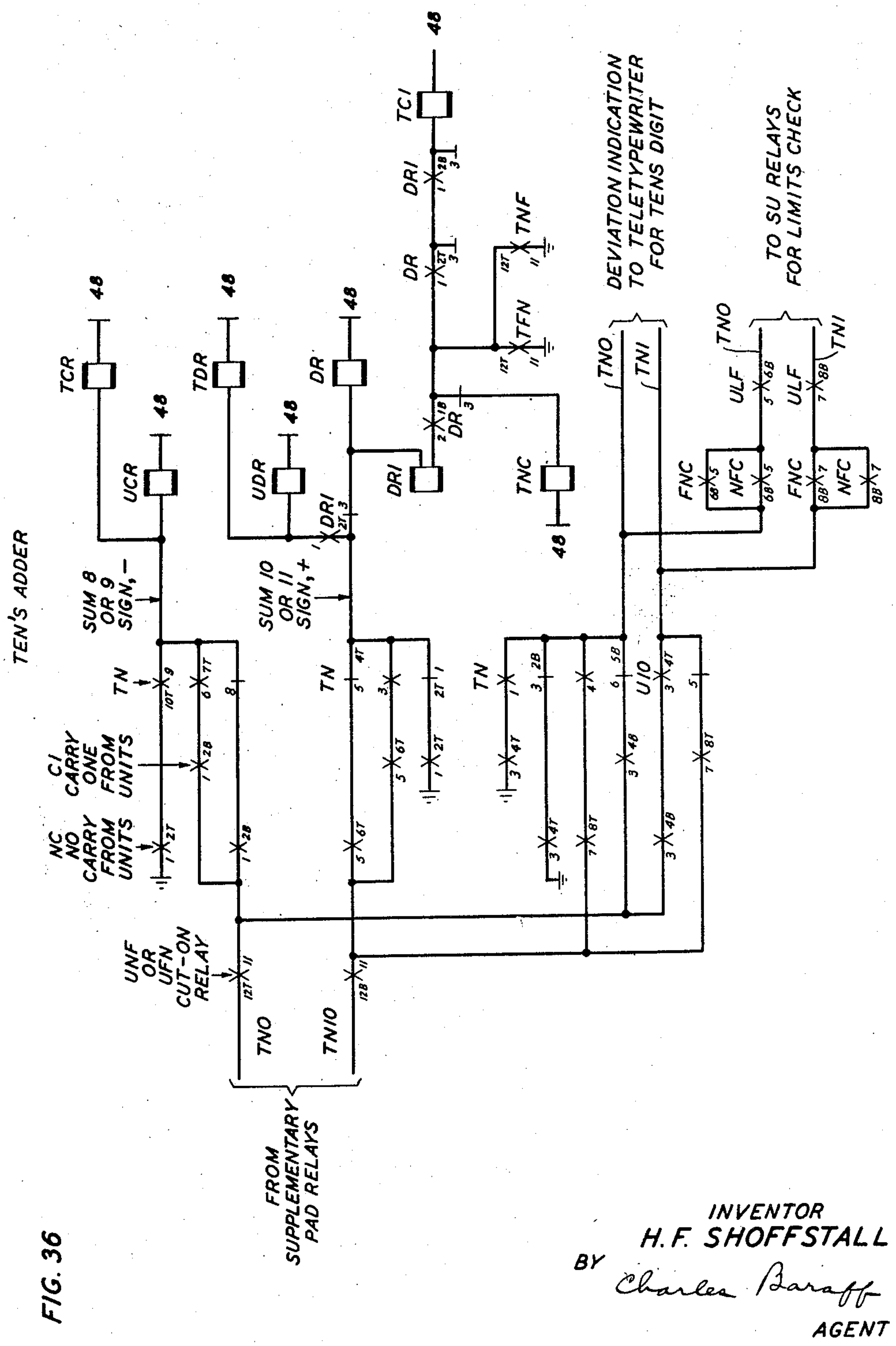

When the sign is positive, relays UDR and TDR both operate. Relay UDR grounds lead "POS" to the teletypewriter control circuit which causes the teletypewriter to print a plus (+) sign preceding the deviation. Relay TDR extends leads "T0" to "T4" from the top contacts of the T— relays through to the contacts of the TLF and TOF relays and extends leads "TOF" and "TLF" through to the windings of relays TOF and TLF, respectively. If the tenths digit of the total sum is less than 5, relay TLF operates; or if the tenths digit is five or more, relay TOF operates. Relay TLF extends leads "T0," "T1," "T2," "T3," and "T4" through to the teletypewriter over leads "DT0," "DT1," "DT2," "DT3," and "DT4," respectively. Relay TOF extends leads "T0"—"T4" through to the teletypewriter over leads "DT5"—"DT9," respectively. The teletypewriter will then print a tenths digit corresponding to the lead "DT0"—"DT9," which is grounded. Similarly, relays UDR, ULF, and UOF provide for grounding one of the leads "DU0"—"DU9" to the teletypewriter for printing the units digit. Leads "TN0" and "TN1" to the teletypewriter for the tens digit are shown in Fig. 36.

Referring again to the attached Fig. 35, when the sign is negative, relays UCR and TCR both operate. Relay UCR grounds lead "NEG" to the teletypewriter which causes the teletypewriter to print a minus (−) sign preceding the deviation. Relay TCR extends the output leads from the top contacts of the T— relays through to the contacts of relays TLF and TOF, as explained above, except that leads "T0" and "T4" and "T1" and "T3" are now reversed. Likewise, leads "TLF" and "TOF" are reversed and extended to the windings of relays TOF and TLF, respectively. Therefore, if the tenths digit of the sum is less than five, relay TOF operates; but if the tenths digit of the sum is five or more, relay TLF operates. Consequently, when the digit of the sum is less than five, output leads "T0," "T1," "T2," "T3," or "T4" will be extended to the teletypewriter over leads "DT9," "DT8," "DT7," "DT6," or "DT5," repectively. If the sum is over five, output leads "T0," "T1," "T2," "T3," or "T4" will be extended to the teletypewriter over leads "DT4," "DT3," "DT2," "DT1," and "DT0," respectively. The reversal of leads "T0" and "T4," "T1" and "T3," and "TLF" and "TOF" by relay TCR thus causes the teletypewriter to print a tenths digit, which is the nines complement of the sum determined by the adder. Relays UCR, ULF, and UOF cut through leads for the units digit in the same manner.

Should a cross occur so that two or more leads in the group "DT0"—"DT9," "DU0"—"DU9," et cetera, to the teletypewriter control circuit become grounded at the same time, the teletypewriter will print an error for that digit, but the teletypewriter control circuit will "stick" at that point. Similarly, if a discontinuity prevents the ground supplied from the supplementary pad relays over leads "0T"—"4T," "0"—"4," or "TN0" or "TN10" from being cut through to the teletypewriter, it will be unable to print that digit, and the teletypewriter control circuit will "stick" at that point. In either case, the intertoll trunk test frame will time out and bring in an alarm.

*20.8 Limits check*

During the accuracy check following a far-near measurement (paragraph 13), relay LCK operates and, in turn, operates relay FNC to start a computation for a limits check. If the accuracy check fails, relay LCK may release immediately thus releasing relay FNC before the computation is finished; but this makes no difference, since another trial will be made anyway. If the check is successful, relay LCK remains operated until the test circuit advances to the near-far test and holds relay FNC through the normally closed off-normal contact on selector switch C. Relay FNC, operated, operates the start relay FN through normally closed contacts on relays FNS and FNU. The far-near computation then proceeds as described above. On completion of the computation, relays TLF or TOF and ULF or UOF cut through the leads to present the answer to the teletypewriter, which is at rest at this time.

Figure 24:
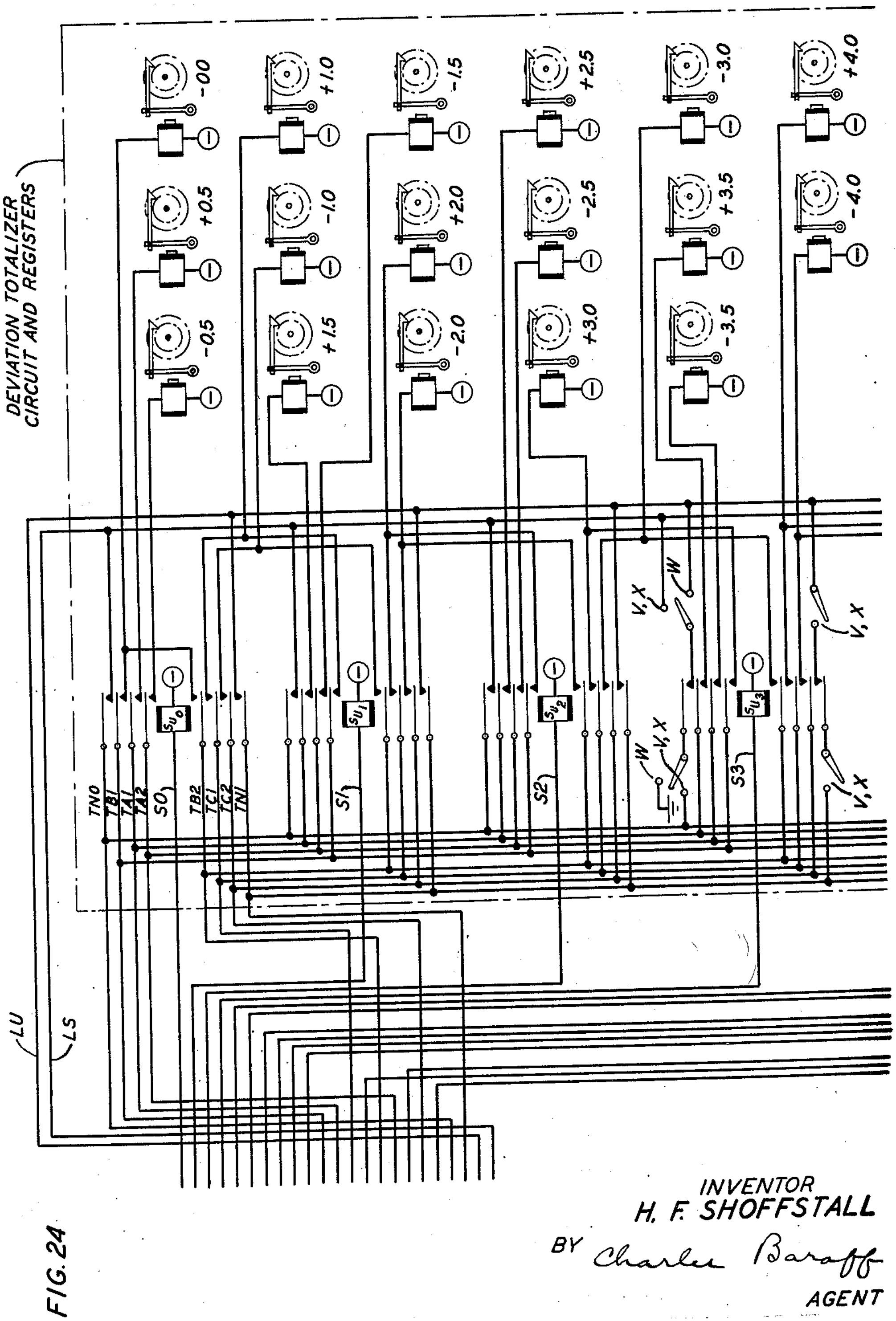
Figs. 24 and 25 show the deviation registers.
Figure 25:
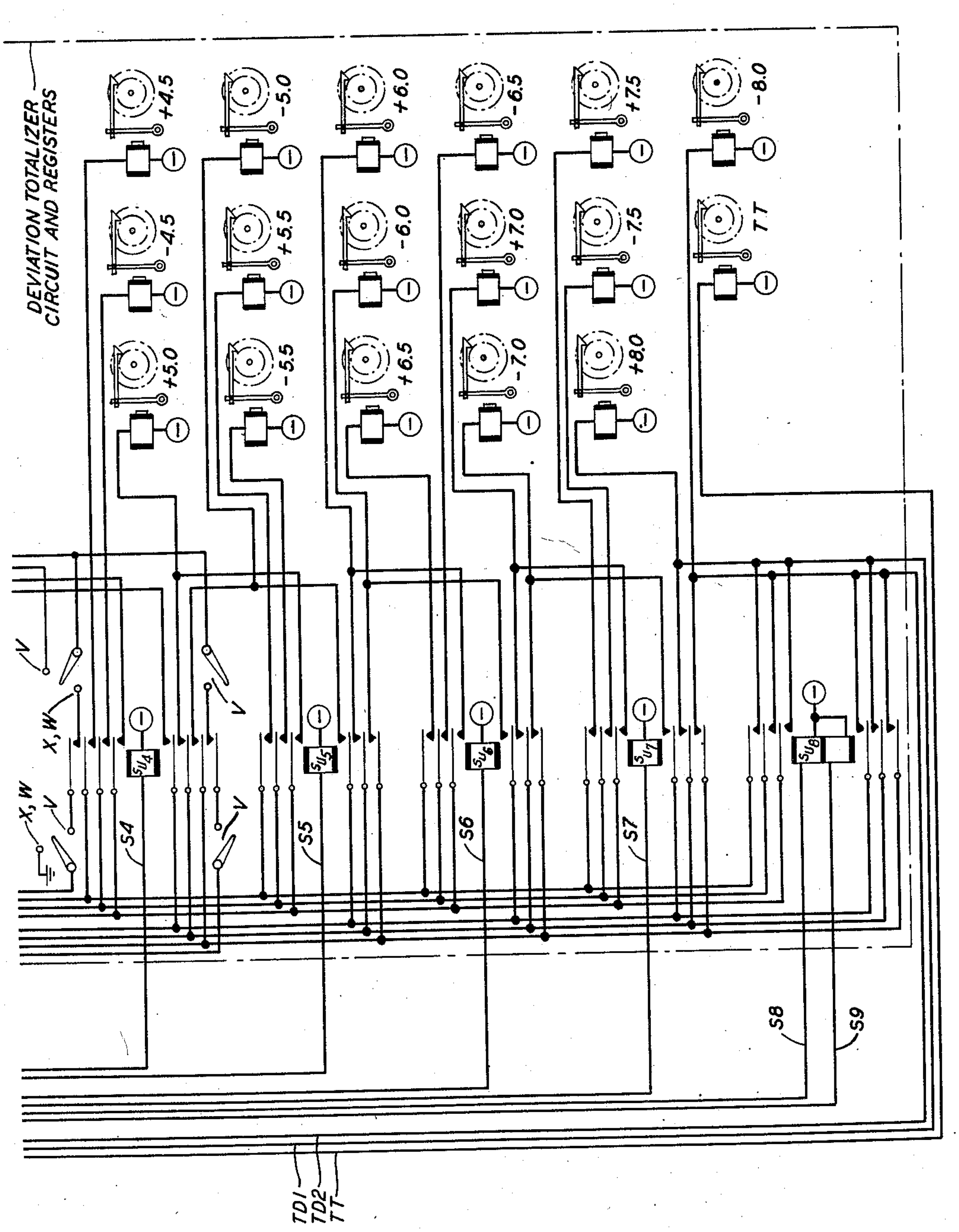

The winding of relays SU0—SU8, Figs. 24 and 25, are multiplied to leads "DU0"—"9"; and when these leads are cut through, one of the relays SU0—SU8 will operate, depending upon the units digit of the deviation. Relay SU8 is double wound and operates when either lead "SU8" or "SU9" is grounded. The conditions at this time will be as follows:

(1) If the deviation is less than 10 decibels, lead "TN0" to the teletypewriter control circuit will be grounded; otherwise, lead "TN1" will be grounded.

(2) If the units digit of the deviation is less than five, relay ULF is operated; but if more than five, relay UOF is operated.

(3) If the units digit of the deviation is less than five, one of the relays SU0, SU1, SU2, SU3, or SU4 will be operated.

By optional wiring at the contacts of the SU3 and SU4 relays, the limits check is made to limits of 3 decibels or more, 4 decibels or more, or 5 decibels or more. For the 4 decibel limit, for example, lead "TN0" must be grounded, the digit must be less than five (ULF operated), and relay SU0, SU1, SU2, or SU3 must be operated. When one of these SU— relays operates, ground on lead "TN0" through the contacts of relays FNC and ULF, operated, is extended through the operated SU— relay and contacts of relay FNC to the winding of relay FNS, which operates and locks. Relay FNS releases relay FN to restore the computer circuit to normal.

If lead "TN1" had been grounded instead of lead "TN0", the ground on lead "TN1" through relays FNC and ULF (Fig. 19), operated, would have been extended through the SU0, SU1, SU2, or SU3 relays and the contacts of relay FNC to the winding of relay FNU. Similarly, if lead "TN0" had been grounded and relay SU4 operated, or if relay UOF had been operated, ground would have been connected to the winding of relay FNU. Relay FNU, operated, locks and releases relay FN to restore the computer to normal.

Relay FNS, if operated, lights lamp FNS to indicate a satisfactory far-near limits check, grounds lead FNS to the teletypewriter control circuit, and sets up conditions to permit an advance to the next trunk when the test is finished, if otherwise satisfactory. Relay FNU, if operated, lights lamp FNU to indicate an unsatisfactory far-near limits check, grounds lead FNU to the teletypewriter control circuit to provide for printing a cue letter on the record, and sets up conditions to bring in an alarm at the end of the test if the teletypewriter is not in operation.

A check to 3 or 5 decibel limits is similar, the optional wiring being arranged so that the relay FNU is operated when the 3 or 5 decibel limits are exceeded and relay FNS operated when the limits are not exceeded.

When LCK operates for the accuracy check of the near-far measurement (paragraph 16), selector switch C will have moved off-normal and relay LCK will then operate relay NFC through the off-normal contacts of selector switch C. Relay NFC operates relay NF to start a deviation computation for the near-far direction. On completion of the computation, a circuit is closed through to operate either relay NFS or NFU, which function for the near-far direction in the same manner as described above for relays FNS and FNU. Either relay NFS or NFU, operated, releases relay NF to restore the computer circuit to normal.

If a repeat test condition is encountered during the near-far accuracy check or the loop check, relay FNU or FNS will already have been operated, and relay NFS or NFU may be operated. However, relay ONB is released for a short period at the time the repeat signal is transmitted to the far end (paragraph 18). This releases relay FNU or FNS and NFU or NFS, if operated, to prepare for the second trial.

*21. Deviation totalizer circuit—Figs. 24 and 25*

The deviation registers are used to totalize, for a series of measurements, the deviations within each ½ decibel increment as follows:

| Deviation | Register | Deviation | Register |
|---|---|---|---|
| +7.8 db or more | +8 | −7.8 db or more | −8 |
| +7.3 to +7.7 db inc. | +7.5 | −7.3 to −7.7 db inc. | −7.5 |
| +6.8 to +7.2 db inc. | +7.0 | −6.8 to −7.2 db inc. | −7.0 |
| . . . . . . . . | | . . . . . . . . | |
| +0.3 to +0.7 db inc. | +0.5 | −0.3 to −0.7 db inc. | −0.5 |
| | | −0.2 to +0.2 db inc. | 0 |

This requires a total of 33 message registers. When the teletypewriter is to print a record of the test, one of these registers is operated at the time the tenths digit of the far-near deviation is printed, and one is operated when the tenths digit of the near-far deviation is printed. When no record is to be printed, the operation of relay SDR, as described in paragraphs 19.2 and 19.3, starts the computer for a deviation registration.

At the time the tenths digit is being printed, the following conditions obtain:

(1) Lead "TN0" or "TN1" to the teletypewriter control circuit will be grounded.

(2) One of the relays SU0—SU8 of Figs. 24 and 25 will be operated, depending upon which one of the units leads, "DU0"—"DU9" to the teletypewriter control circuit is grounded.

(3) One of the tenths leads "DT0"—"DT9" to the teletypewriter control will be grounded, depending upon the tenths digit of the deviation.

(4) Relay TDR will be operated if the sign is positive, or relay TCR will be operated if the sign is negative.

When the teletypewriter control circuit is ready to print the far-near deviation, it operates its cut-on relays in sequence to close through the indications for (1) the sign, (2) the tens digit, (3) the units digit, and (4) the tenths digit. If lead "TN1" is grounded, the deviation is 10 decibels or more and register +8 or −8 should be operated; but if lead "TN0" is grounded, the proper register depends upon the units and tenths digits.

When the teletypewriter control circuit operates its tenths digit cut-on relay, leads "DT0"—"DT9" are closed through to ten code relays, 0–9 respectively, in the teletypewriter control circuit, and one of the code relays will operate, depending upon the tenths digit to be printed, and a ground will be connected to lead "DTG" for operating relay ODR.

If lead "TN1" is grounded, its ground will be extended through relay ODR to the contacts of relays TCR and TDR. If lead "TN0" is grounded, its ground is extended to the teletypewriter control circuit over lead "TC" and will be returned through the operated code relay in the teletypewriter control circuit over leads "TA", "TB", or "TC" as follows:

| DT-Lead Grounded | Code Relay Operated in TTY | Ground Returned on Lead |
|---|---|---|
| DT0, −1 or −2 | 0, 1, or 2 | "TB" |
| DT3, −4, −5, −6, or −7 | 3, 4, 5, 6, or 7 | "TA" |
| DT8 or DT9 | 8 or 9 | "TC" |

If the sign is positive, the ground on leads "TA", "TB", or "TC" is extended through relays ODR and TDR, operated, over leads "TA1", "TB1", or "TC1", respectively, to the contacts of the SU— relays, (Figs 24 and 25) one of which is operated. If lead "TA1" is grounded, a +0.5, +1.5, +2.5 et cetera, register operates if relay SU0, SU1, SU2, et cetera, respectively, are operated, except that if relay SU8 is operated relay +8.0 operates. If lead "TB1" is grounded, registers +1.0, +2.0, +3.0, et cetera, operate if relays SU1, SU2, SU3, et cetera, respectively, are operated. If lead "TC1" is grounded, registers +1.0, +2.0, +3.0, et cetera, operate if relays SU0, SU1, SU2, et cetera, respectively, are operated. If lead "TN1" is grounded, its ground is extended through relays ODR and TDR, operated over lead "TD1" to operate register +8.0.

If the sign is negative, the ground from the teletypewriter control circuit on leads "TA," "TB," "TC" is extended through relays ODR and TCR, operated, over leads "TA2," "TB2," or "TC2" to the contacts of the SU— relays. This causes minus (−) registers to be operated in the manner described above. If lead "TN1" is grounded, its ground is extended through relays ODR and TCR operated over lead "TD2" to operate register −8.0.

If the teletypewriter is not in operation, or if it is in operation but no record is to be printed because key XTP is operated, relay PTD will be normal and the teletypewriter at rest when the noise check at the far end is furnished. In this case, relay SDR will operate as described in paragraph 19.2 or 19.3 and will operate relay FN to start a computation of the far-near deviation. When this computation is finished, relays ULF or UOF will operate. Relays CRT and ROT were previously operated by relay TF1 at the time of preparation for the noise check (paragraph 19.1). When relay ULF or relay UOF operate, they supply a ground through relays SDR, CRT, and ROT, operated, to lead "DT" to the teletypewriter control circuit. This operates the deviation tenths digit cut-on relay in the teletypewriter control circuit, but the teletypewriter remains normal. Operation of the tenths cut-on relay closes through leads "DT0"—"DT9," resulting in the operation of a code relay 0–9 in the teletypewriter control circuit. A ground will then be returned over one of the leads "TA," "TB," or "TC" and will result in one of the registers being operated as explained above.

Each time relay ODR operates, it grounds lead "TT" to Fig. 25, which operates register TT. Register TT scores the total number of one-way measurements, and its reading should be equal to the total of the reading on the other 33 registers and also equal to twice the number of trunks tested.

When the register readings are to be used in a statistical analysis of the performance of a group of trunks, the registers are reset to zero just prior to the start of the test cycle and the reading of each register recorded immediately after the completion of the test cycle.

*22. Advance from far-near to near-far computation*

When preparation is made for noise check (paragraph 19.1), relay TF1 operates relay FN if relay PTD is operated, or later, if PTD operates later. If no test record is to be printed, then TF1 operates relay FN through relay SDR when it operates. In either case relay FN starts a far-near computation.

When the teletypewriter reaches the tenths digit, it operates a tenths cut-on relay, as explained previously, and also supplies a ground over lead "DTG." If key XDR is normal, relay ODR operates, and in turn operates relay AR. If key XDR is operated, the ground on lead "DTG" operates relay AR directly. Relay AR locks, but relay AR1 does not operate as its winding is short-circuited by the operate ground. Relay AR releases relay ROT, which serves no useful purpose when a record is being printed. When the tenths digit has been printed, the teletypewriter control circuit removes ground from lead "DTG" which releases relay ODR, if operated, and this permits relay AR1 to operate in series with AR, which holds. Relay AR1, operated, releases relay FN to restore the computer to normal and starts the release of slow release relay CRT. Relay TF1 then operates relay NF through relays CRT, released, and AR1, operated, to start the near-far computation. Relay CRT is made slow release to allow time for the computer relays to restore before the new computation is started. When the near-far computation is finished, the teletypewriter will proceed to print the near-far deviation in the same manner; but this time the ground supplied over lead "DTG" while the tenths digit is being printed will be ineffective.

In case no test record is to be printed, the far-near computation for the purpose of operating the deviation registers starts when relay SDR operates. When the computation is finished, relay UOF or ULF operates and supplies a ground through relays SDR, CRT, and ROT, operated, over lead "DT" to the teletypewriter control circuit. This causes the tenths cut-on relay in the teletypewriter control circuit to operate and cut through the "DT0"—"DT9" leads to code relays, as explained above, and to return a ground on lead "DTG." The teletypewriter remains at rest. The ground on lead "DTG" functions as described above to operate relays ODR and AR. Relay AR releases relay ROT, which disconnects the ground being supplied over lead "DT" to the teletypewriter control circuit, which in turn removes the ground from lead "DTG." During the release time of slow release relay ROT, the ground on leads "TA," "TB," or "TC" from the teletypewriter control circuit, or on lead "TN1" will be extended through relay ODR to operate the registers.

Removal of ground from lead "DTG" permits relay AR1 to operate in series with AR and to function as described above to release cut-on relays FN and slow release relay CRT. When relay CRT finally releases, relay NF operates to start the near-far deviation computation. When the computation is finished, relay ULF or relay UOF will again operate and ground lead "DT" to the teletypewriter control circuit, which functions as before to operate the registers for the near-far deviation. This time the ground returned over lead "DTG" is routed through relays AR1, SDR, and TF1, operated, to operate relay TF. This starts an advance to the next trunk, as described in paragraph 23.

When relay TF operates, it releases relay TF1. Relay TF1 is slow release to provide time for the operation of the registers for the near-far deviation.

*23. Advance to disconnect*

When the printed record is finished, ground supplied from the teletypewriter control circuit over lead "TPF" operates relay TF. If no record is being printed, then ground from the teletypewriter control circuit over lead "DTG" when the near-far deviation registration is made is connected through relays AR1, SDR, and TF1 to operate relay TF. If neither a printed record nor a deviation registration is being made, the ground, normally supplied to lead "LP" on the completion of the far-end noise check, is routed through relay PTD, normal, key XDR, operated, and relays SDR, normal, and TF1, operated, to operate relay TF (Fig. 31). Relay TF, operated:

(1) Removes ground from lead "REC," releasing relay REC1 (Fig. 9). This cuts the transmission path from the trunk under test through to the attendant's telephone circuit (Fig. 8) on the intertoll trunk test frame.

(2) Connects ground to lead "LC0" if key LPS is operated. This causes a lamp display of the measured transmission losses in each direction.

(3) Removes ground from lead "TP" to the teletypewriter control circuit to restore the circuit to normal.

(4) Locks to relay ON and starts the release of slow release relay TF1.

(5) Connects ground to lead "AV1" to Fig. 22 during the release time of relay TF1.

If the limits checks in both directions (paragraph 20.8) were satisfactory, relay FNS and NFS will be operated and relays FNU and NFU normal; and if the noise check at each end was satisfactory, relays HEN and FEN will be normal. The ground on lead "AV1" is then routed from these relays to lead "TTF" to the intertoll trunk test circuit to prepare for an advance to the next trunk. If the limits checks or noise checks were not all satisfactory, one of the relays FNU, NFU, HEN, or FEN will be operated. In this case the ground on lead "AV1" will be routed through the operated relay to the contacts of relay PTD. If a record has been printed, relay PTD will be operated and the ground will be extended over lead "TTF" to prepare for an advance to the next trunk. If relay PTD is still normal, no record has been printed and the ground will be extended to the intertoll trunk test frame over lead "ALM," which will cause the test frame to block and bring in an alarm. The lighted lamp FNU, NFU, HEN, or FEN will indicate the reason for the alarm.

When relay TF1 releases, it:

(1) Releases relay NF to restore the computer circuit to normal.

(2) Releases relays AR and AR1.

(3) Removes ground from lead "TTF," which causes the intertoll trunk test frame to advance to the next trunk.

(4) Releases relay SDR, if operated.

When the intertoll trunk test circuit advances to the next trunk, it removes ground from leads "ONG" and "REC," releasing relays ON and REC, and opens the test connector crosspoints, which releases the operated class relays and in turn, the biquinary relays in the computer circuit. Relay ON, released:

(1) Removes ground from leads "G1" and "G2" to Fig. 11 restoring the pulse generator to normal.

(2) Releases relay AD10, Fig. 13, if operated.

(3) Releases relays RA, R1, et cetera, if operated.

(4) Releases relays ONA, ONB, and various other relays of the control circuit, if operated.

It should be understood that the present invention is not specifically limited to the details of the disclosed system, which is described herein by way of illustration, but may take other forms, within the scope of the appended claims, as will be apparent to those skilled in the art.

What is claimed is:

1. A system for measuring transmission loss on a group of two-way signaling trunks comprising means for specifying and holding a predetermined transmission loss for each of the two opposite directions of signaling transmission on each of said trunks, means for measuring the transmission loss for each of the two opposite directions of signaling transmission on each of said trunks and holding the measurements, and means responsive to the transmission losses held by said specifying and measuring means for computing the amount and sign of the deviation of the measured loss from the specified predetermined loss for each of the two opposite directions of signaling transmission on each of said trunks.

2. The system according to claim 1 which includes a plurality of telephone message registers controlled by said computing means for counting the number of computed deviations substantially equal to one of a preselected group of equal steps of deviation above and below the specified predetermined loss for each of the two opposite directions of signaling transmission on each of said trunks.

3. The system according to claim 2 in which said computing means includes means for counting for each of said steps of computed deviation a computed deviation substantially equal to or falling within certain limits thereof.

4. The system according to claim 1 which includes means for identifying the terminal for each direction of signaling transmission on each of said trunks for the occurrence of noise in excess of a certain amount.

5. The system according to claim 1 which includes means for identifying the direction of signaling transmission on each of said trunks having transmission loss in excess of a certain amount.

6. The system according to claim 1 which includes means for measuring the total net loop transmission loss for both directions of signaling transmission on each of said trunks to check whether such measured net loop loss exceeds the total of the measured loss for each of the two opposite directions of signaling transmissions of each of said trunks, said last-mentioned means providing an indication when such check is unsuccessful.

7. The system according to claim 1 which includes a teletypewriter controlled by said computing means for identifying each of said trunks and printing a record of the amount and sign of the computed deviation for ecah of the two opposite directions of signaling transmission on each of said trunks.

8. The system according to claim 7 which includes means for identifying the terminal for each direction of a signaling transmission on each of said trunks having noise in excess of a certain amount, said last-mentioned means activating said computing means and teletypewriter to provide a printed record of each such identification.

9. The system according to claim 7 which includes means for identifying the direction of signaling transmission on each of said trunks having transmission loss in excess of a certain amount, said last-mentioned means activating said computing means and teletypewriter to provide a printed record of each such identification.

10. A system for measuring transmission loss on a group of two-way signaling trunks comprising means for specifying and holding a predetermined transmission loss for each direction of signaling transmission on each of said trunks, means for measuring the transmission loss for each direction of signaling transmission on each of said trunks and holding the measurements, and a bi-quinary computer, said specifying and measuring means setting up the specified and measured losses in said computer on a bi-quinary basis for each direction of signaling transmission on each of said trunks, said computer computing the amount and sign of the deviation of the measured loss from the specified predeterminad loss for each direction of signaling transmission on each of said trunks.

11. The system according to claim 10 which includes means for controlling said computer to compute the deviations initially in the same signaling direction on each of said trunks and then in the opposite signaling direction on each of said trunks.

12. The system according to claim 11 which includes a teletypewriter controlled by said computer for identifying each of said trunks and printing record of the amount and sign of the computed deviations initially in the same signaling direction on each of said trunks and then in the opposite signaling direction on each of said trunks.

13. A transmission loss measuring system for a group of signaling trunks comprising means for specifying and holding a predetermined loss for one direction of signaling transmission on each of said trunks, a resistance-pad circuit for representing and holding the actual transmission loss for the one signaling direction on each of said trunks, a digital computer connected to said specifying means and resistance-pad circuit, said computer comprising a bi-quinary adder for entering the specified predetermined loss and actual loss therein, and means for reading out the amount and sign of the deviation of the actual loss from the specified predetermined loss for the one signaling direction on each of said trunks.

14. The system according to claim 13 which includes a group of telephone message registers controlled by said computer for totalizing the number of computer deviations substantially equal to one of a preselected group of equal steps of deviation above and below the specified predetermined loss for the one signaling direction on each of said trunks.

No references cited.